(12) United States Patent
Azizi et al.

(10) Patent No.: US 11,647,463 B2
(45) Date of Patent: May 9, 2023

(54) METHODS AND ARRANGEMENTS TO ENABLE WAKE-UP RECEIVER FOR MODES OF OPERATION

(71) Applicant: INTEL CORPORATION, Santa Clara, CA (US)

(72) Inventors: Shahrnaz Azizi, Cupertino, CA (US); Thomas Kenney, Portland, OR (US); Po-Kai Huang, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/130,646

(22) Filed: Sep. 13, 2018

(65) Prior Publication Data
US 2019/0082390 A1    Mar. 14, 2019

Related U.S. Application Data

(60) Provisional application No. 62/575,352, filed on Oct. 20, 2017, provisional application No. 62/571,151, (Continued)

(51) Int. Cl.
*H04W 4/00*      (2018.01)
*H04W 52/02*      (2009.01)
(Continued)

(52) U.S. Cl.
CPC ....... *H04W 52/0229* (2013.01); *H04L 5/0007* (2013.01); *H04L 5/0053* (2013.01); *H04L 5/0091* (2013.01); *H04L 27/02* (2013.01)

(58) Field of Classification Search
CPC ............ H04W 52/0229; H04L 5/0007; H04L 5/0053; H04L 5/0091; H04L 27/02
(Continued)

(56) References Cited

U.S. PATENT DOCUMENTS 7,218,682 B2    5/2007    Mayor et al.
8,675,482 B1    3/2014    Lu et al.
(Continued)

FOREIGN PATENT DOCUMENTS

WO    2019010307 A1    1/2019
WO    2019027159 A1    2/2019
(Continued)

OTHER PUBLICATIONS

Marvel (WUR Legacy Preamble Design, 2017, IEEE 802.11-17/0647r1) (Year: 2017).*
(Continued)

*Primary Examiner* — Maharishi V Khirodhar
(74) *Attorney, Agent, or Firm* — KDW Firm PLLC

(57) ABSTRACT

Logic may generate a wake-up radio packet, wherein the wake-up radio packet comprises an on-off keying (OOK) signal, a sequence of a preamble of the wake-up radio packet to indicate a rate of transmission of one or more OOK orthogonal frequency-division multiplexing (OFDM) symbols of a medium access control (MAC) frame of the wake-up radio packet, wherein a duration of transmission of the preamble is 128 microseconds for a low data rate and a duration of transmission of the preamble is 64 microseconds for a low data rate. Logic may communicate the wake-up radio packet to a physical layer device to transmit OFDM symbols of an IEEE 802.11 preamble on a channel followed by OOK OFDM symbols of the wake-up radio packet on a sub-band of the channel. And logic may generate at least a second wake-up radio packet to transmit on a contiguous channel bandwidth with OOK OFDM symbols.

30 Claims, 21 Drawing Sheets

WUR REQUEST/RESPONSE FRAME

| MAC HEADER | ACTION ID 2162 | ACTION 2164 | WUR MODE PARAMETER FIELD(S) 2166 | DEFAULT STATE FIELD 2168 | WURX DUTY CYCLE FIELD 2170 | WUR MODE SUSPENSION STATE FIELD 2172 | FCS |

Related U.S. Application Data filed on Oct. 11, 2017, provisional application No. 62/570,351, filed on Oct. 10, 2017, provisional application No. 62/566,061, filed on Sep. 29, 2017, provisional application No. 62/557,810, filed on Sep. 13, 2017.

(51) Int. Cl.
*H04L 5/00* (2006.01)
*H04L 27/02* (2006.01)

(58) Field of Classification Search
USPC .......................................................... 370/311
See application file for complete search history.

(56) References Cited

U.S. PATENT DOCUMENTS

| | | |
|---|---|---|
| 9,485,733 B1 | 11/2016 | Park et al. |
| 9,634,757 B2 | 4/2017 | Huang et al. |
| 9,749,958 B1 | 8/2017 | Segev et al. |
| 10,091,728 B2 | 10/2018 | Yang |
| 10,129,064 B1 | 11/2018 | Lee et al. |
| 10,321,402 B2 | 6/2019 | Park et al. |
| 10,341,149 B2 | 7/2019 | Park et al. |
| 10,362,538 B2 | 7/2019 | Gao et al. |
| 2004/0224728 A1 | 11/2004 | Dacosta et al. |
| 2009/0046682 A1* | 2/2009 | Kim ...................... H04W 28/06 370/338 |
| 2011/0074552 A1 | 3/2011 | Norair et al. |
| 2014/0185501 A1* | 7/2014 | Park ...................... H04W 52/287 370/311 |
| 2016/0373237 A1 | 12/2016 | Shellhammer et al. |
| 2017/0094600 A1 | 3/2017 | Min et al. |
| 2017/0111858 A1 | 4/2017 | Azizi et al. |
| 2018/0007629 A1 | 1/2018 | Dorrance et al. |
| 2018/0077641 A1* | 3/2018 | Yang ................. H04W 52/0229 |
| 2018/0084501 A1 | 3/2018 | Mu et al. |
| 2018/0176053 A1 | 6/2018 | Park et al. |
| 2018/0184378 A1 | 6/2018 | Fang et al. |
| 2018/0184379 A1* | 6/2018 | Liu ................... H04W 52/0219 |
| 2018/0187379 A1* | 7/2018 | Sundblad .................. D21J 7/00 |
| 2018/0206193 A1 | 7/2018 | Adachi et al. |
| 2018/0242249 A1 | 8/2018 | Yang et al. |
| 2018/0279224 A1 | 9/2018 | Yang |
| 2018/0288703 A1 | 10/2018 | Sun et al. |
| 2018/0302901 A1* | 10/2018 | Suh ......................... H04L 5/001 |
| 2018/0376370 A1 | 12/2018 | Shellhammer et al. |
| 2019/0007904 A1 | 1/2019 | Asterjadhi et al. |
| 2019/0069231 A1* | 2/2019 | Kneckt ............... H04W 28/065 |
| 2019/0082385 A1* | 3/2019 | Shellhammer ...... H04L 27/2666 |
| 2019/0124596 A1 | 4/2019 | Cao et al. |
| 2019/0208470 A1 | 7/2019 | Asterjadhi et al. |
| 2019/0246356 A1 | 8/2019 | Kim et al. |
| 2019/0260624 A1 | 8/2019 | Park et al. |
| 2019/0268192 A1 | 8/2019 | Lim et al. |
| 2019/0281549 A1 | 9/2019 | Gan et al. |
| 2019/0289549 A1 | 9/2019 | Lim et al. |
| 2019/0394726 A1 | 12/2019 | Gan et al. |
| 2020/0029276 A1 | 1/2020 | Kim et al. |
| 2020/0037251 A1* | 1/2020 | Du .................... H04W 52/0235 |
| 2020/0045635 A1 | 2/2020 | Lin et al. |
| 2020/0053648 A1 | 2/2020 | Guo |
| 2020/0092811 A1* | 3/2020 | Park ........................ H04L 27/04 |
| 2020/0178178 A1* | 6/2020 | Huang ............. H04W 52/0235 |
| 2020/0245137 A1 | 7/2020 | Chitrakar et al. |
| 2020/0275373 A1 | 8/2020 | Hwang et al. |
| 2020/0288396 A1 | 9/2020 | Park et al. |
| 2020/0322889 A1 | 10/2020 | Chitrakar et al. |
| 2020/0359320 A1* | 11/2020 | Chun .................... H04W 52/52 |
| 2020/0367181 A1* | 11/2020 | Lim ................... H04L 27/2613 |
| 2021/0227471 A1 | 7/2021 | Chitrakar et al. |
| 2021/0258877 A1 | 8/2021 | Chitrakar et al. |
| 2022/0141770 A1 | 5/2022 | Ahn et al. |

FOREIGN PATENT DOCUMENTS

| | | |
|---|---|---|
| WO | 2019049576 A1 | 3/2019 |
| WO | 2019093811 A1 | 5/2019 |

OTHER PUBLICATIONS

Marvel (WUR preamble SYNC Field Design, 2017, IEEE 802.11-17/0983r0) (Year: 2017).*
Non-Final Rejection for the U.S. Appl. No. 16/157,149, dated Apr. 15, 2020, 14 pages.
Non-Final Rejection for the U.S. Appl. No. 16/157,149, dated Mar. 17, 2021, 11 pages.
Final Rejection for the U.S. Appl. No. 16/157,149, dated Aug. 3, 2021, 12 pages.
Non-Final Rejection for the U.S. Appl. No. 16/219,517, dated Mar. 31, 2020, 85 pages.
Final Rejection for the U.S. Appl. No. 16/219,517, dated Oct. 23, 2020, 66 pages.
Non-Final Rejection for the U.S. Appl. No. 16/219,517, dated Feb. 19, 2021, 58 pages.
Non-Final Rejection for the U.S. Appl. No. 16/219,517, dated Jul. 15, 2021, 64 pages.

* cited by examiner

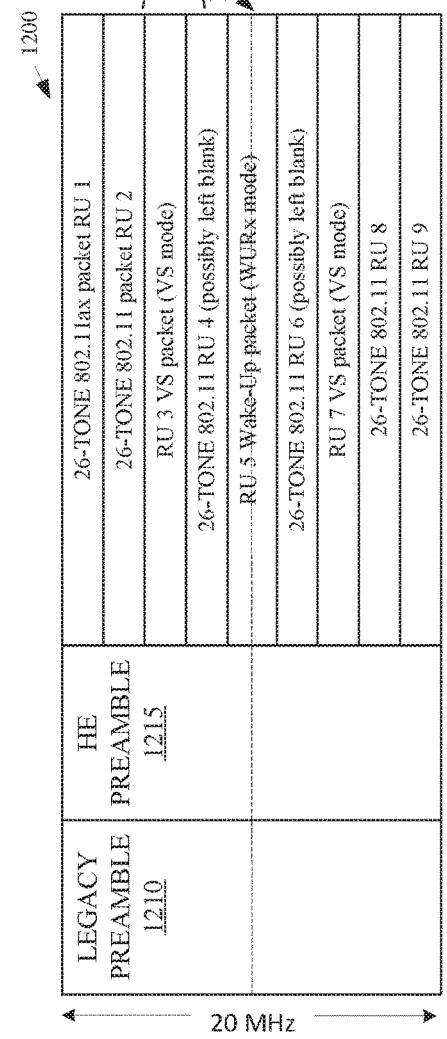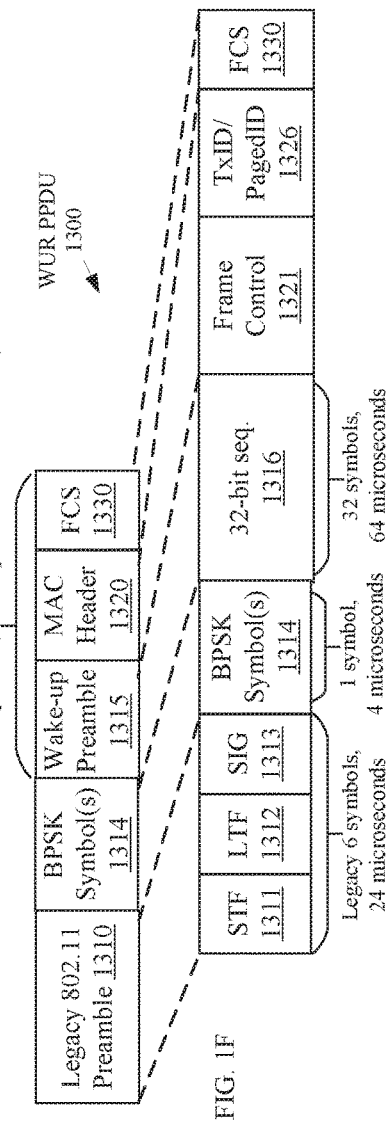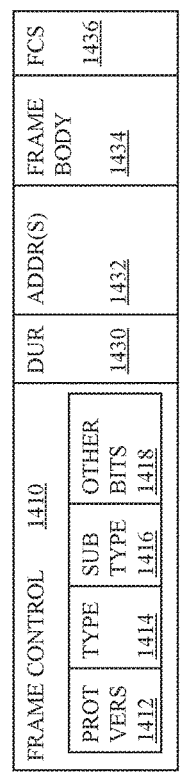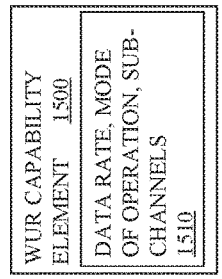

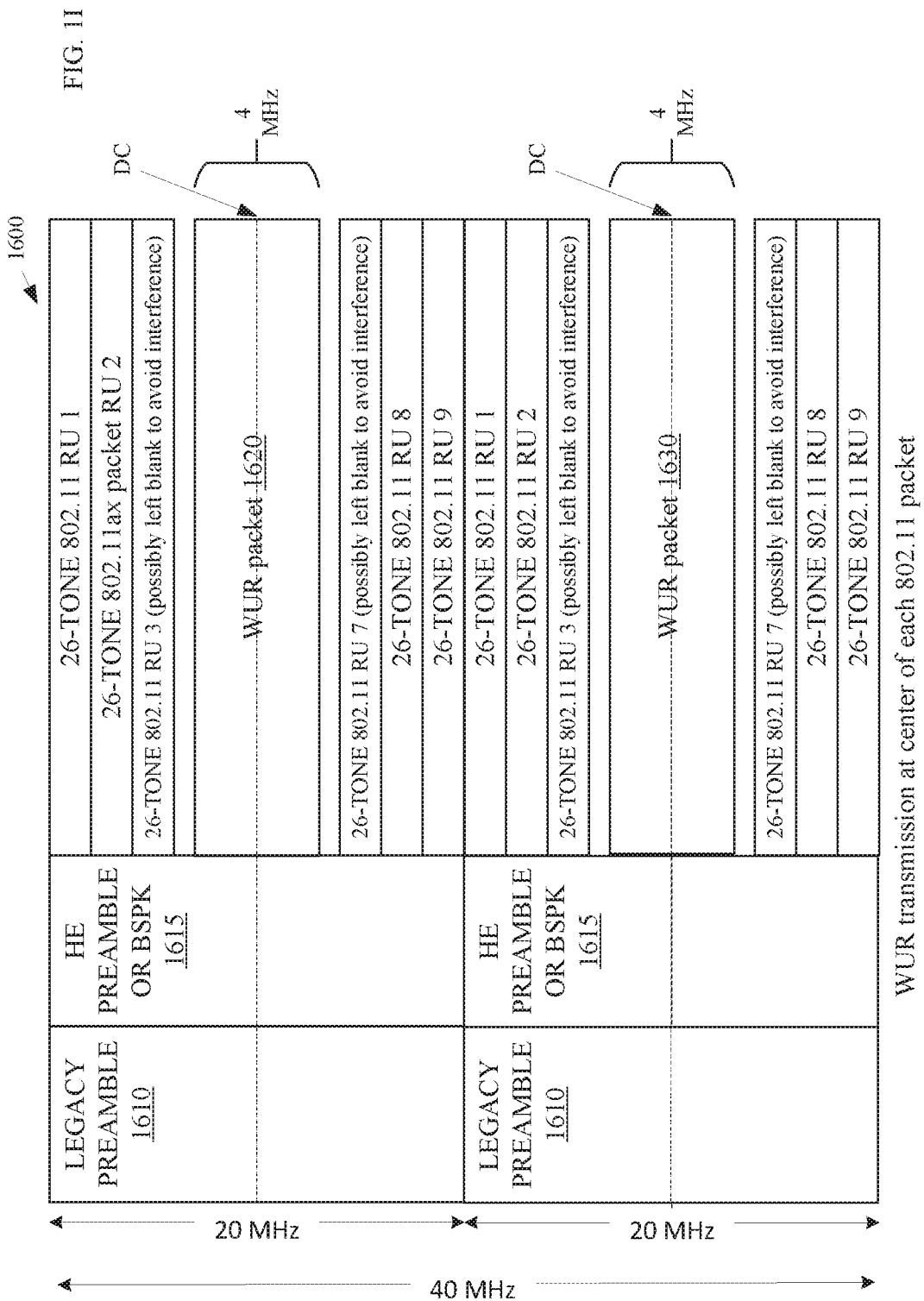

FIG. 2A

| Low Data Rate |
|---|
| Bit Sequence 128 microseconds (twice the number of symbols of the Low Data Rate Bit Sequence) |
| Wake-up radio preamble 2000 |

| High Data Rate |
|---|
| Bit Sequence 64 microseconds (half the number of symbols of the Low Data Rate Bit Sequence) |
| Wake-up radio preamble 2010 |

FIG. 2B

WUR PPDU 2020

| STF | LTF | SIG | WUR Mk | 0 | 15-bit pn seq. | 15-bit pn seq. | MAC Header | Payload | FCS |
|---|---|---|---|---|---|---|---|---|---|
| 802.11 preamble | | | | | Wake-up radio preamble 2025 | | MAC frame | | |

4 microseconds per symbol, 1 symbol per bit

Rate = 62.5 Kbps (32 bit Wake-up radio preamble – 128 microseconds)

| STF | LTF | SIG | WUR Mk | 0 | 15-bit pn seq. | 15-bit pn seq. | MAC Header | Payload | FCS |
|---|---|---|---|---|---|---|---|---|---|
| 802.11 preamble | | | | | Wake-up radio preamble 2035 | | MAC frame | | |

2 microseconds per symbol, 1 symbol per bit

Rate = 250 Kbps (32 bit Wake-up radio preamble – 64 microseconds)

| STF | LTF | SIG | WUR Mk | 0 | 31-bit pn seq. | MAC Header | Payload | FCS |
|---|---|---|---|---|---|---|---|---|
| 802.11 preamble | | | | | Wake-up radio preamble 2045 | MAC frame | | |

2 microseconds per symbol, 1 symbol per bit

Rate = 250 Kbps (32 bit Wake-up radio preamble – 64 microseconds)

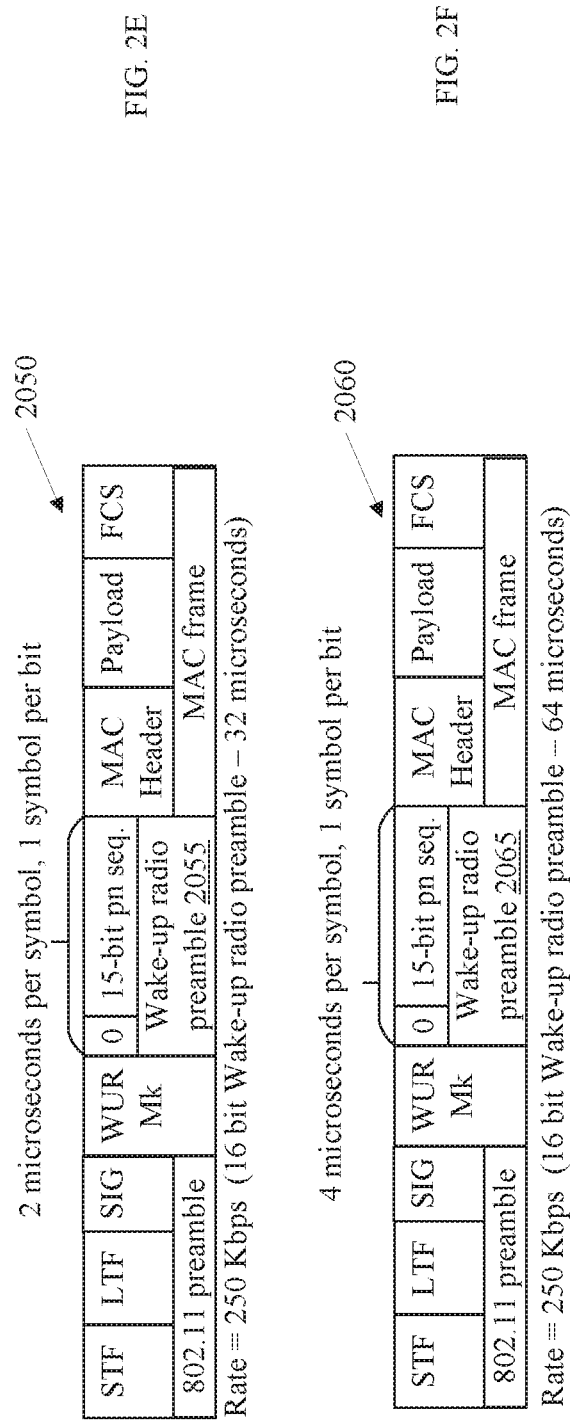
FIG. 2E
FIG. 2F
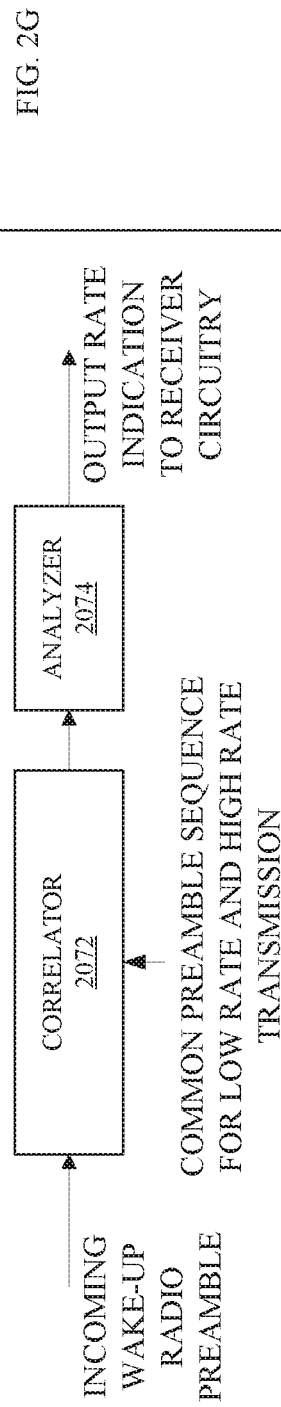
FIG. 2G

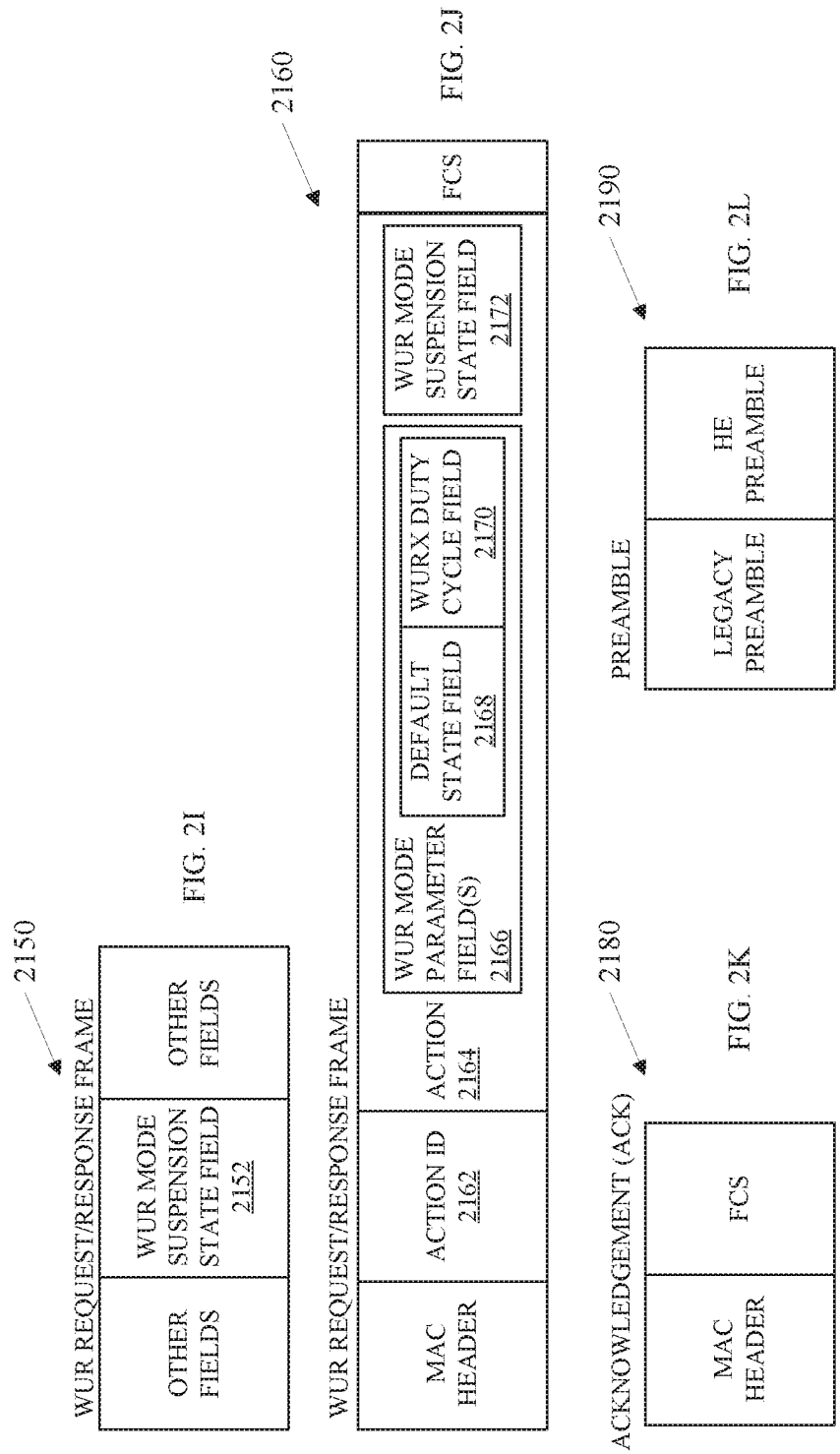

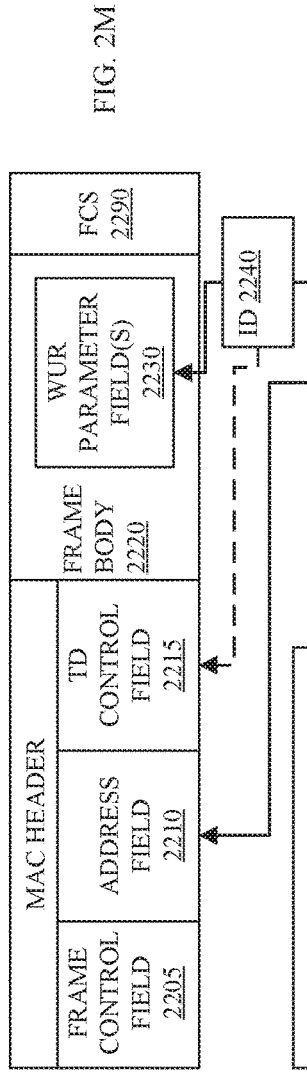
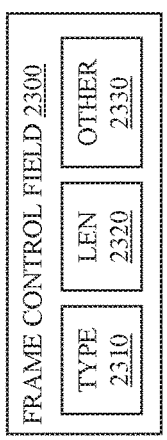
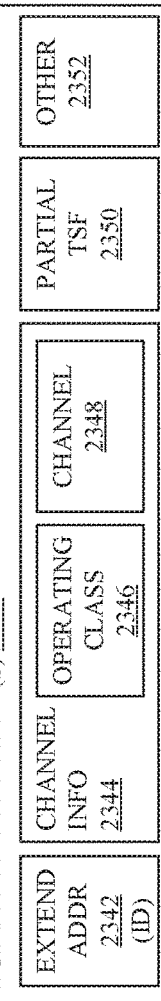
FIG. 2M
FIG. 2N
FIG. 2O
FIG. 2P

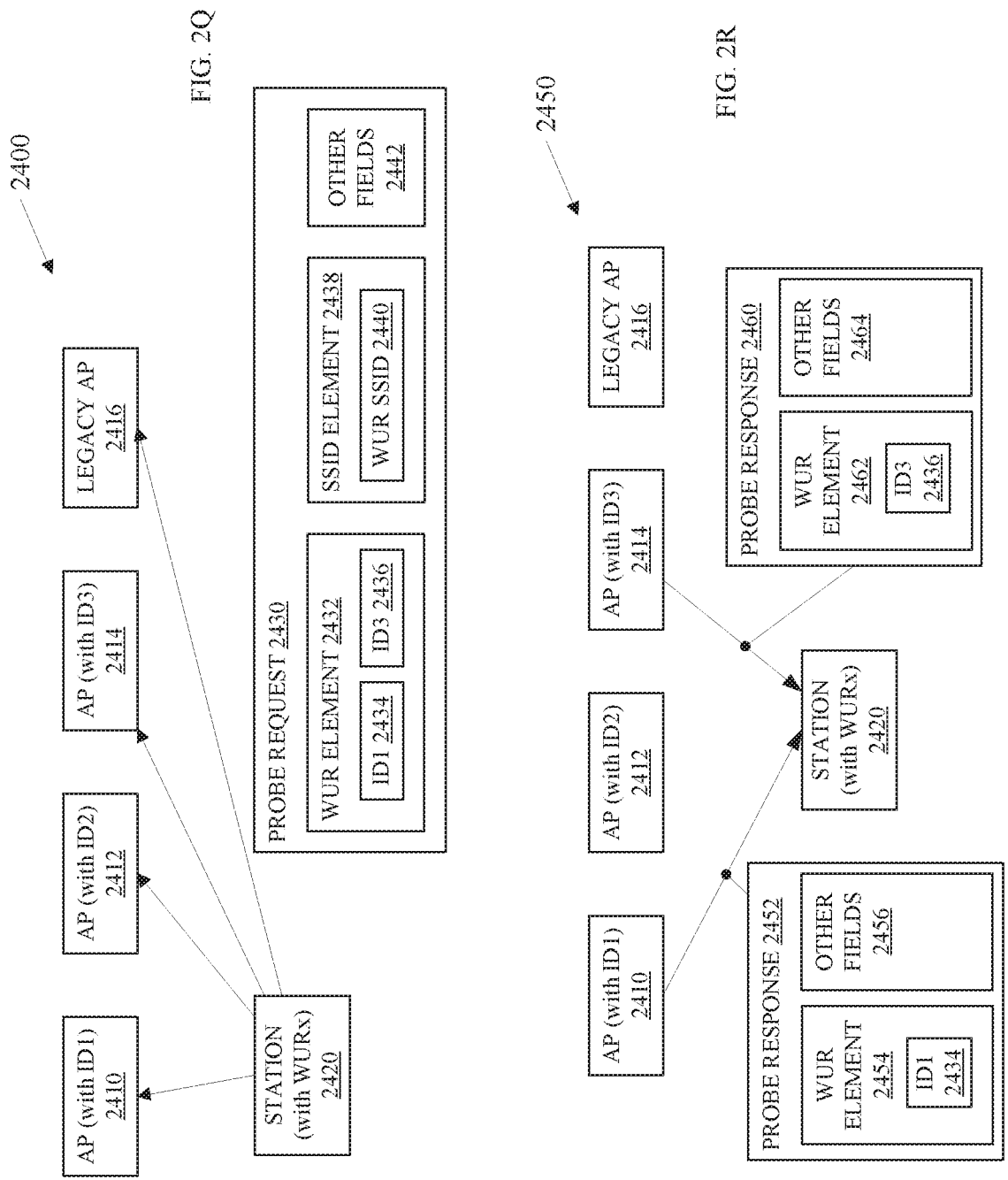

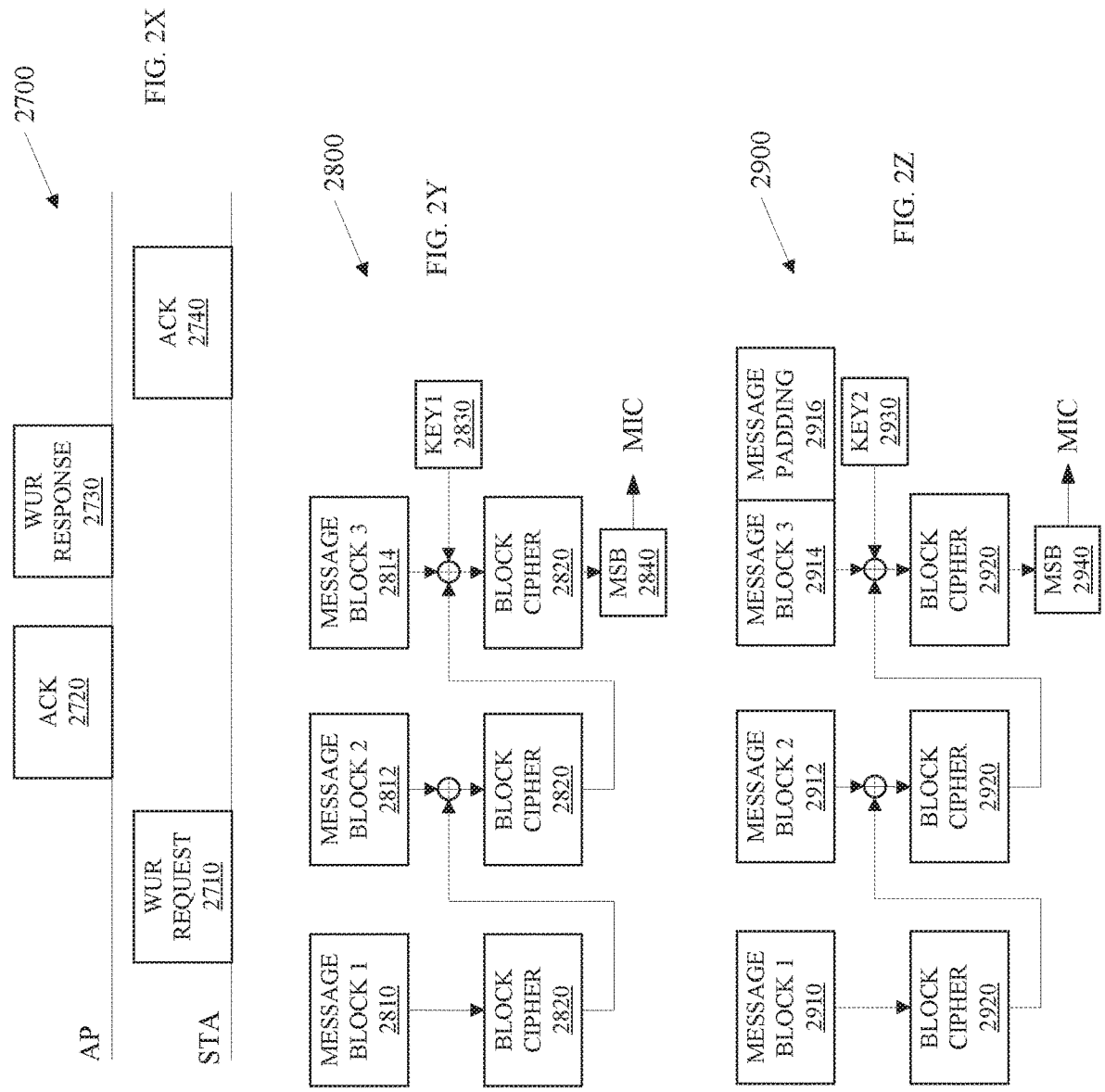

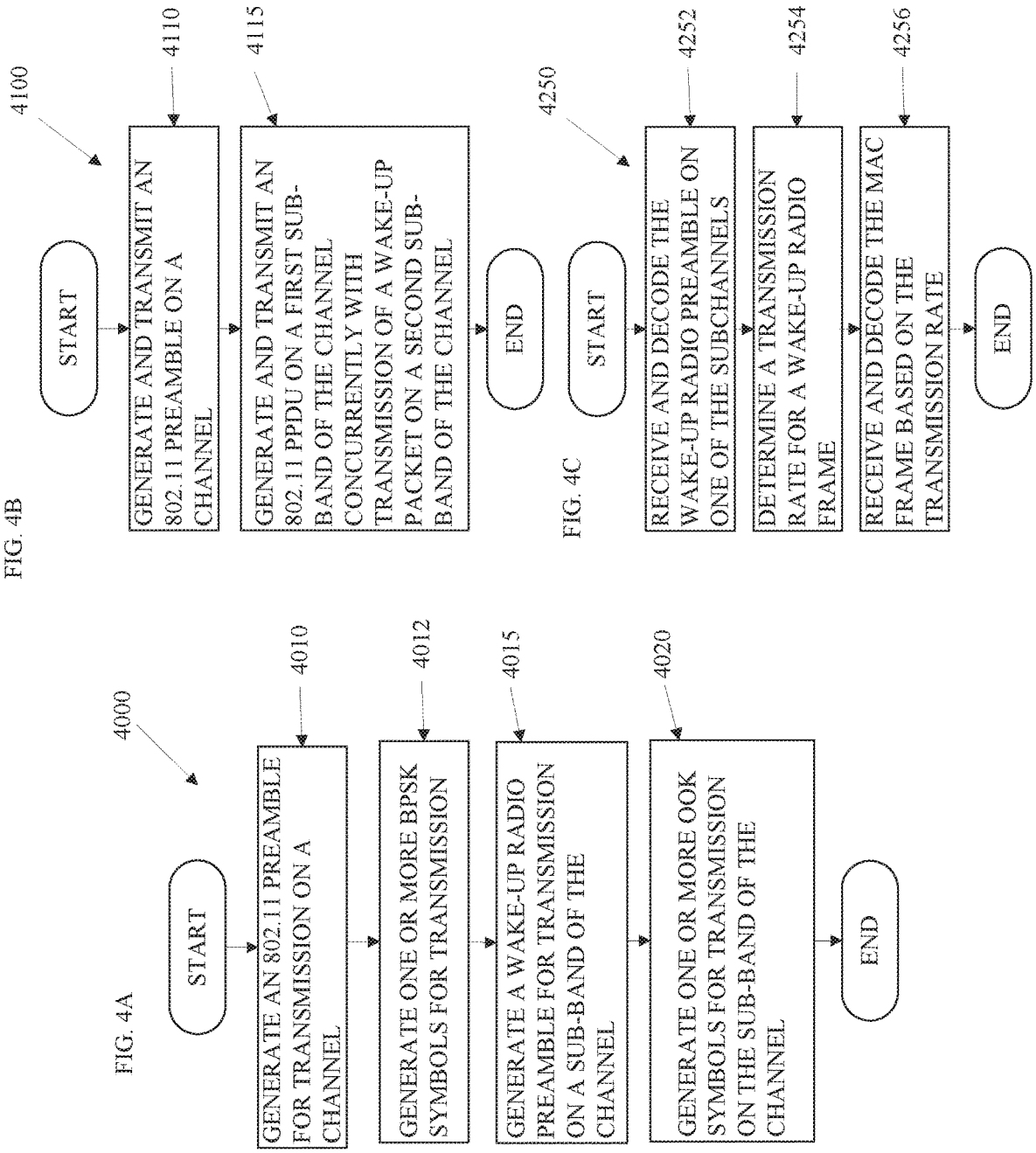

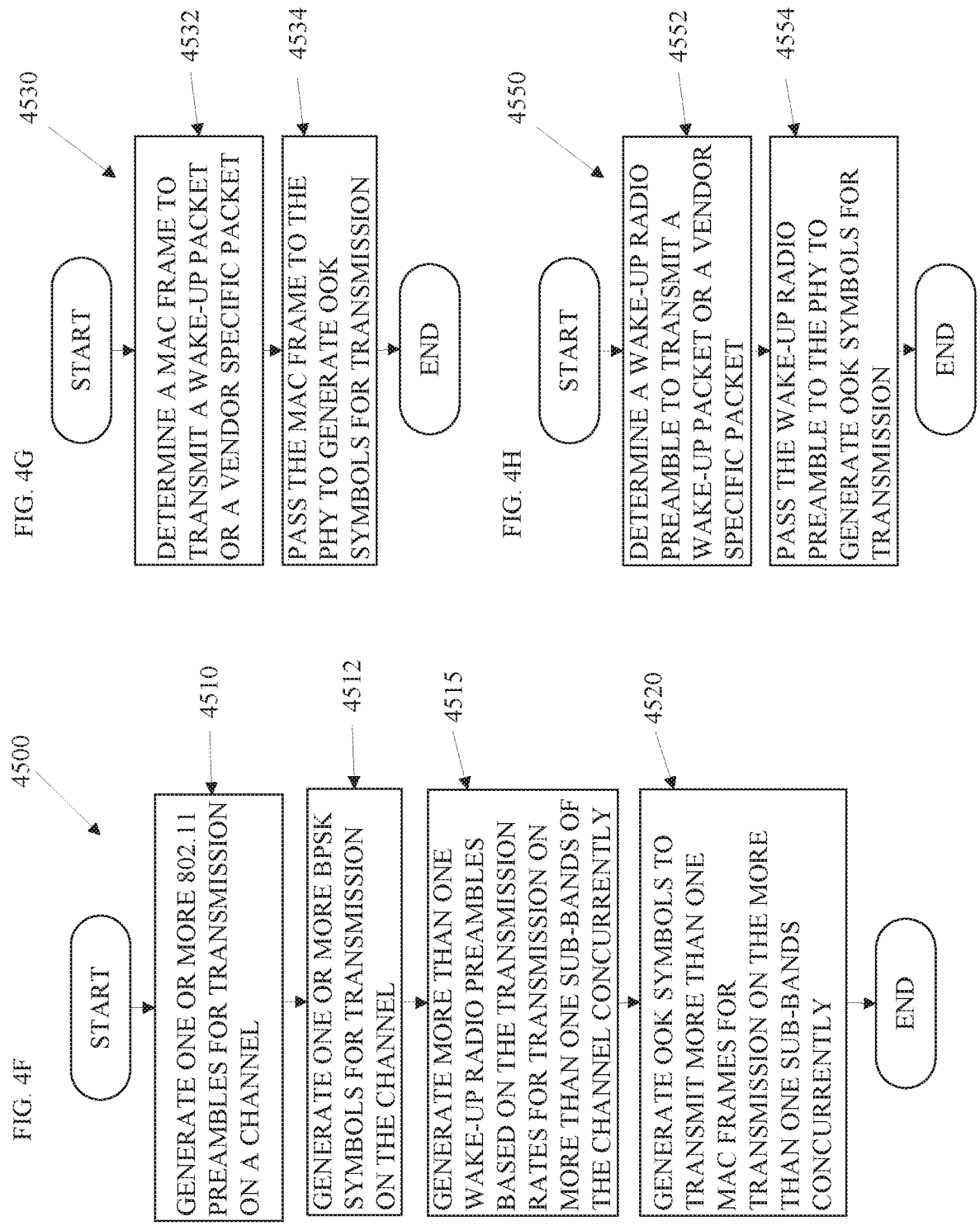

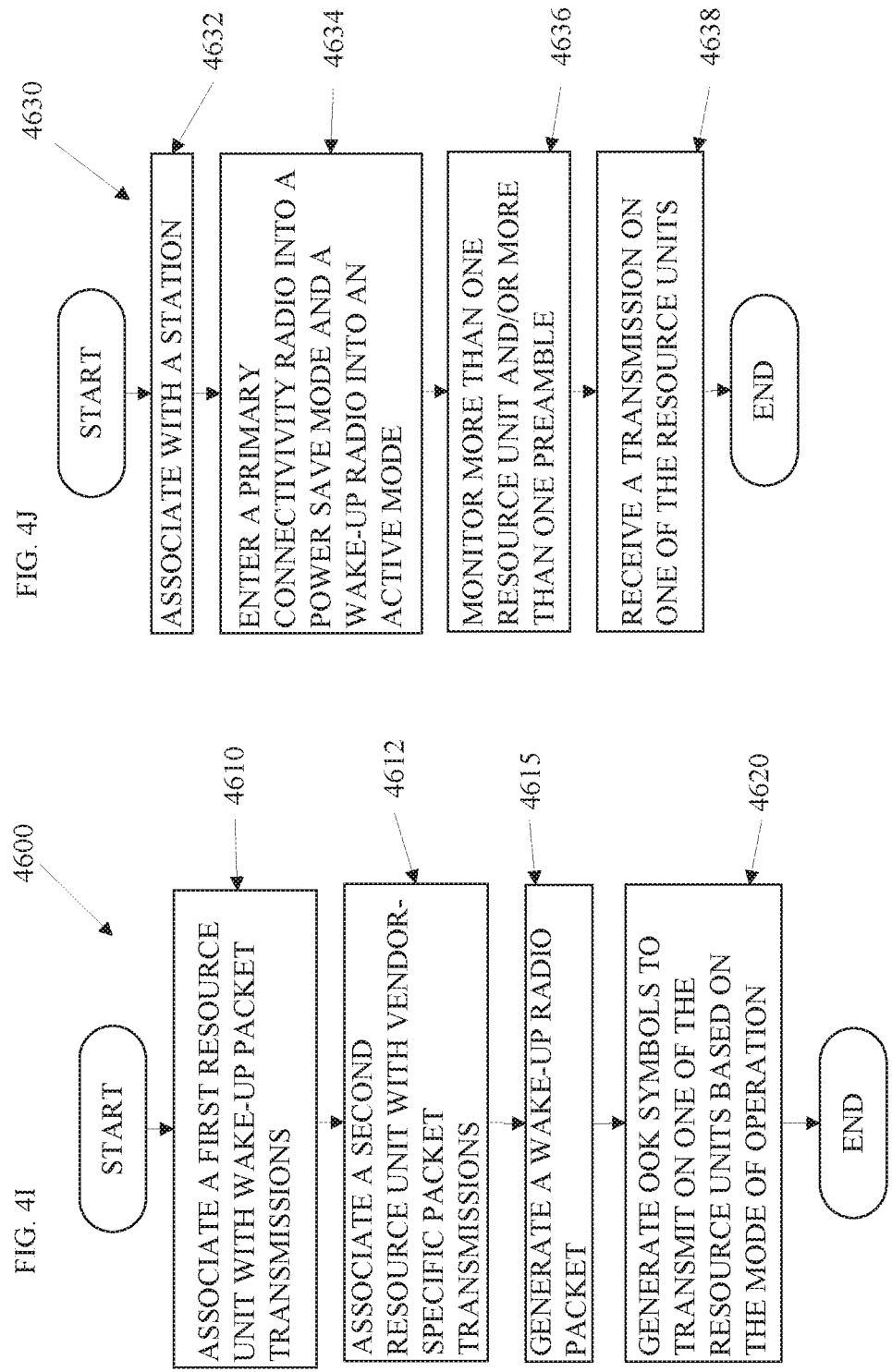

METHODS AND ARRANGEMENTS TO ENABLE WAKE-UP RECEIVER FOR MODES OF OPERATION

CROSS REFERENCE TO RELATED APPLICATIONS

This application claims priority under 35 USC § 119 from U.S. Provisional Application No. 62/557,810, entitled "Enabling Wake-up Receiver for Wake-up operation or Vendor Specific Operation", filed on Sep. 13, 2017, the subject matter of which is incorporated herein by reference. This application also claims priority under 35 USC § 119 from U.S. Provisional Application No. 62/566,061, entitled "Methods and Arrangements for Wake-Up Radio Operations", filed on Sep. 29, 2017, the subject matter of which is incorporated herein by reference. This application also claims priority under 35 USC § 119 from U.S. Provisional Application No. 62/570,351, entitled "Methods and Arrangements for Wake-Up Radio Operations", filed on Oct. 10, 2017, the subject matter of which is incorporated herein by reference. This application also claims priority under 35 USC § 119 from U.S. Provisional Application No. 62/571,151, entitled "Methods and Arrangements to Support Wake-Up Packet Transmission", filed on Oct. 11, 2017, the subject matter of which is incorporated herein by reference. Furthermore, this application also claims priority under 35 USC § 119 from U.S. Provisional Application No. 62/575,352, entitled "Methods and Arrangements for Wake-Up Radio Frame Authentication", filed on Oct. 20, 2017, the subject matter of which is incorporated herein by reference.

TECHNICAL FIELD

Embodiments are in the field of wireless communications. More particularly, embodiments may support enablement of a wake-up receiver for modes of operation such as a wake-up operation or a vendor specific operation in accordance with one or more Institute of Electrical and Electronics Engineers (IEEE) 802.11 standards.

BACKGROUND

The increase in interest in network and Internet connectivity and Internet of Things (IoT) drives design and production of new wireless products. Low power consumption is a design factor to facilitate greater usage of wireless devices such as mobile devices and wearable devices. Wireless communication interfaces can consume significant amounts of power so product designs strike a balance between connectivity and power consumption. Thus, a design goal is to lower the power consumption by the wireless communication interfaces to facilitate increased connectivity in terms of distance, speed, and duration of wireless communications.

BRIEF DESCRIPTION OF THE DRAWINGS

FIG. 1E depicts an embodiment of a wake-up radio (WUR) physical layer protocol data unit (PPDU);

FIG. 1F depicts an embodiment of a wake-up radio packet prepended by an IEEE 802.11 physical layer preamble;

FIG. 1G-J depicts an embodiment of a management frame, wake-up radio capability elements, and additional 802.11 OFDMA signals;

FIG. 2A depicts an embodiment of preambles for high data rate (HDR) and low data rate (LDR);

FIGS. 2B-F depicts an embodiment of a wake-up radio preamble to support a low transmission rate for wake-up radio packet transmission and wake-up radio preambles to support a high transmission rate for wake-up radio packet transmission;

FIG. 2G depicts an embodiment of wake-up receiver front end of WUR circuitry, such as the WUR circuitry illustrated in FIG. 1A, that includes a correlator and an analyzer to detect a data rate for a data portion of a WUR frame (aka WUR packet);

FIGS. 2H-L depict embodiments of a wake-up radio (WUR) request/response frame format, another WUR request/response frame format, an acknowledgement frame format, and a physical layer preamble for WUR operations and an embodiment of a WUR state diagram for entering and exiting WUR states;

FIGS. 2M-P depict embodiments of a wake-up radio (WUR) discovery frame format, a frame control field format, WUR parameter field(s), and a table of length values and associated WUR parameter field(s);

FIGS. 2Q-R depict embodiments of primary connectivity radio (PCR) discovery procedures by a station (STA) and an access point (AP);

FIGS. 2X-Z depict embodiments of a primary connectivity radio (PCR) transmission to identify the extended message content, a procedure to generate a message integrity code (MIC), and an alternative procedure to generate a MIC;

FIGS. 4A-C depict embodiments of flowcharts to generate and transmit a wake-up radio frame, to generate and transmit a wake-up radio frame concurrently with another physical layer protocol data unit, and to receive and decode a wake-up radio frame.

FIGS. 4F-H depict embodiments of flowcharts to generate and transmit wake-up radio frames with wake-up packets or vendor specific packets for communications between wireless communication devices;

FIGS. 4I-J depict embodiments of flowcharts to generate and transmit wake-up radio frames with wake-up packets for communications between wireless communication devices.

DETAILED DESCRIPTION OF EMBODIMENTS

Figure 1A:
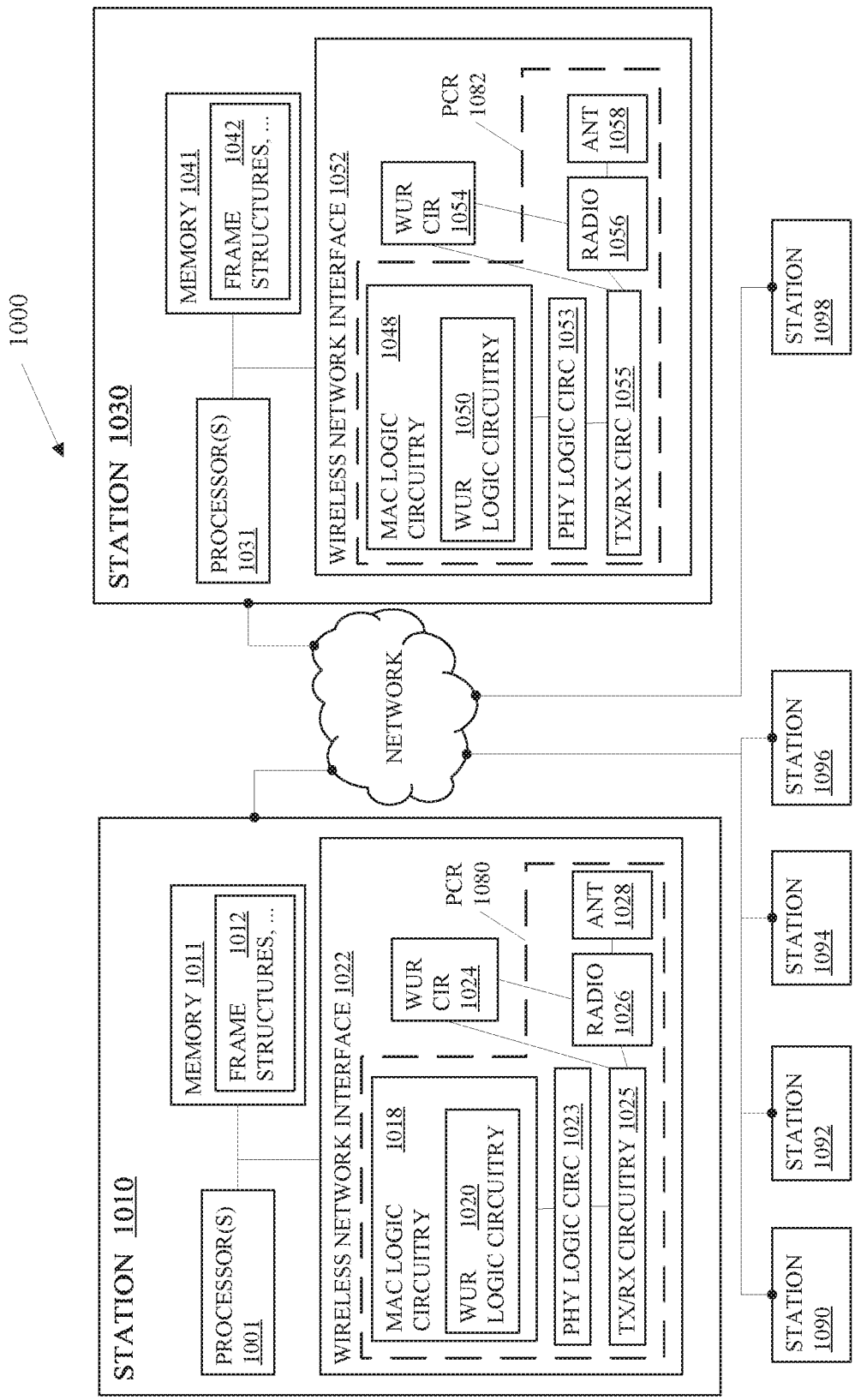
FIG. 1A depicts an embodiment of a wireless network to support compatible low rate for wake-up radio (WUR) packet transmission.

The following is a detailed description of embodiments depicted in the drawings. The detailed description covers all modifications, equivalents, and alternatives falling within the appended claims.

Embodiments may reduce power consumption in wireless communication interfaces by using a low-power wake-up receiver (LP-WURx or WURx) in conjunction with a main Wi-Fi radio, referred to as a primary connectivity radio (PCR). The WURx remains active while the PCR enters a power save mode or sleep mode to reduce power consumption. When communication with the PCR is requested or needed, a station such as a peer station or an access point (AP) may transmit a wake-up radio (WUR) physical layer protocol data unit (PPDU) with a wake-up packet (WUP) to instruct the WURx to wake the PCR.

Note that a WUR PPDU is a wide bandwidth OFDMA packet such as a 20 MHz bandwidth packet, a 40 MHz bandwidth packet, an 80 MHz bandwidth packet, or the like with multiple resources units (RUs) for transmission of narrow bandwidth or narrower bandwidth frames on sub-channels of the WUR PPDU transmission. The WUR PPDU includes one or more preambles that are the bandwidth of the WUR PPDU such as a legacy preamble and a WUR mark that is 20 MHz in a 20 MHz bandwidth WUR PPDU. A WUR frame, which may also be referred to as a WUR packet, is a 4 MHz bandwidth frame for transmission on a subchannel of the WUR PPDU transmission. A WUR preamble is a preamble within the WUR frame to sync with a WURx and has a 4 MHz bandwidth. A wake-up packet (WUP), which can also be referred to as a wake-up frame, is a 4 MHz bandwidth frame for transmission on a subchannel of the WUR PPDU transmission that may have a minimal frame construction to instruct a WUR of a receiving station to wake a primary connectivity radio (PCR) of the station. And a vendor-specific (VS) packet is a 4 MHz bandwidth frame for transmission on a subchannel of the WUR PPDU transmission that is a vendor designed frame for vendor-specific communications with a WUR of the receiving station.

A WURx and a wake-up radio transmitter are generally referred to as wake-up radios (WURs). The WURx may provide a low-power solution (e.g., ~100 µW in active state) for, e.g., very low latency Wi-Fi or Bluetooth connectivity of wearable, Internet of Things (IoT), devices and other emerging devices that will be densely deployed and used in the near future.

Some embodiments are particularly directed to improvements for wireless local area network (WLAN), such as a WLAN implementing one or more Institute of Electrical and Electronics Engineers (IEEE) 802.11 standards (sometimes collectively referred to as "Wi-Fi"). Such standards may include, for instance, the IEEE 802.11-2016, published Mar. 29, 2012, and the IEEE 802.11ax/D1.4, published August 2017. The embodiments are not limited to these standards.

To achieve the target of very low power consumption WUR, embodiments implement waveforms and techniques that allow extremely simple and low cost, low power hardware solutions. This is departure from previous versions of the Wi-Fi standard. One embodiment includes hardware that uses an inexpensive, very low power radio frequency (RF) section with a minimal baseband solution. Some embodiments include a wake-up receiver, WURx, and no corresponding wake-up transmitter. Some embodiments include a wake-up transmitter and no corresponding wake-up receiver. Some embodiments include both a wake-up transmitter and a corresponding wake-up receiver. Other embodiments implement techniques that are more complicated requiring more hardware/cost and power. Different embodiments may provide preferable performance in different deployments or in different scenarios at various price points and power consumption levels.

Some embodiments may transmit the wake-up radio packet signal with an amplitude-shift keying (ASK) modulation such as On-Off Keying (OOK) to achieve a low cost, low power solution. The use of OOK modulation significantly simplifies the hardware involved with the WUR and increases the sensitivity of the wireless communications interface (aka wireless network interface). Thus, some embodiments may leave the WUR powered on (in an active state) continuously. Further embodiments may employ cycling of the WUR to further reduce power consumption. For instance, one embodiment may turn on the WUR every second with, e.g., a 50% duty cycle, to reduce power consumption with a slight increase in nominal latency. Another embodiment may turn on the WUR every fourth cycle (25% duty cycle) or turn off the WUR every fourth cycle (75% duty cycle).

Embodiments may facilitate transmission of the WUR frame (aka WUR packet) in an Institute of Electrical and Electronics Engineers (IEEE) 802.11 multi-user, orthogonal frequency-division multiple access (OFDMA) packet format such as an IEEE 802.11ax OFDMA packet format. In some embodiments, the WUR may transmit a WUR frame without transmitting packets in other sub-bands of the channel. In several embodiments, the WUR may transmit WUR frames at transmission rates such as 62.5 kilobits per second (kbps) and/or 250 kbps, within a multi-user, OFDMA packet or as a standalone packet. An example is a physical layer (PHY) device that generates signals to transmit the WUR frame at the center of the band in a multi-user OFDMA transmission that multiplexes IEEE 802.11 transmissions in frequency within the same multi-user OFDMA packet. In other words, the PHY generates signals to transmit multiple different packets on different resource units or frequency sub-bands within the channel simultaneously. In other embodiments, the PHY device may generate signals to transmit the WUR frame at a sub-band that is not at the center of the band of the communication channel.

One embodiment may have only one data rate for transmission of WUR frame to meet the requirements of a WUR with very simple reduced hardware complexity with low cost. Other embodiments may enable two or more data rates for WUR frame transmissions. For instance, embodiments may enable two or more data rates such as (1) a low data rate (LDR), e.g., 62.5 kilobits per second (kbps), to meet the IEEE 802.11b/11ax-extended range mode link budget and range and (2) a higher data rate, such as 250 kbps to have shorter packet transmission times, to match (exceed) the link budget of repetition rates in previous Wi-Fi standards. Some embodiments may comprise two different packet and/or preamble formats for WUR frames for use as a signaling method for the data transmission rate of the WUR frame and/or a mode of operation of the WUR frame such as a WURx mode or a vendor-specific mode (VSM) of operation.

Other embodiments may transmit a wake-up radio preamble of the WUR frame to synchronize with a WUR of another device. In such embodiments, the wake-up radio preamble may also include a rate field or a signal field that includes a transmission rate for a medium access control (MAC) layer packet that follows the wake-up radio preamble. Still other embodiments may only be capable of receiving the WUR frame at one rate.

Embodiments may include a vendor specific (VS) mode in addition to a Wake-Up Receiver (WURx) mode operations. Vendor specific mode (VSM) operations may enable a special purpose use of the Wake-up technology. In other words, the WURx may be tasked with a specific purpose aside from just waking up the primary connectivity radio (PCR). For instance, a WURx may scan channels for use or activity, allowing the PCR to communicate during the scan. As another example, the WURx may identify system types on various channels. In many embodiments, the Vendor may have full control over the contents of the WUR frame's payload during VSM operations.

Embodiments create signaling that allows the WUR to be configured as either a device for the purpose of waking up the main radio (Wi-Fi, Bluetooth or other), as a Vendor specific receiver to be utilized as a special purpose receiver, or both. In such embodiments, the WUR can be programmed/configured via the PCR. Additionally, a design may consist of the WUR circuitry being configurable, like through power gating some parts of the hardware, to implement either the WUR or Vendor specific radio.

In some embodiments, an AP assigns one or more channels to a specific operation such as a first channel for WUP packets and a second channel for VS packets. Other embodiments implement multiple different wake-up radio preambles, or other signature of a WUR frame to identify the operational mode as WURx or VS. Thus, devices can advantageously be designed/optimized for a specific type of operation. Specifically, some embodiments can be optimized for WURx functionality only, having highly optimized hardware for that sole task. This then allows the key use case of ultra-low power operation. Additionally, when the PCR is on (in an active state), there are use cases for a vendor specific mode. In such embodiments, a device that implements both WURx mode and VSM, may be reprogrammed to receive VS packets.

In several embodiments, signaling between, e.g., an AP with a WUR and a station with a WUR may define fixed frequencies at which the WURx and VS modes of operation will be utilized. Basically, one set of channels is for WUR, another, disjoint set, is for VSM.

In other embodiments, two unique wake-up radio preambles may signal the modes of operation, one to indicate the WURx mode, and the other to indicate the VSM. In such embodiments, both may share the same channel(s). For embodiments that have capabilities to operate in WURx mode and VSM, such dual mode devices may monitor one channel for WURx mode operations and for VSM operations. In one embodiment, a dual mode device may switch between preambles before, after, or during a sleep cycle. For instance, a dual mode device may monitor the channel for a first preamble for WURx mode operations and then, when the dual mode device enters a sleep cycle, switch to a second preamble for VSM. Some embodiments implement a similar operation to monitor different channels for WURx mode operations and for VSM operations.

WUPs may comprise, e.g., a 20 MHz bandwidth packet. The 20 MHz bandwidth packet may include a 20 MHz preamble portion and a 4 MHz packet. The 20 MHz preamble portion may include a 20 MHz bandwidth legacy preamble such as a preamble for 802.11a/n/ac devices, a 20 MHz bandwidth WUR mark to indicate to the legacy devices that one or more packet transmissions will follow, and a 4 MHz portion of the WUP that can be included on one or more 4 MHz subchannels of the 20 MHz packet. If the WUP includes high-efficiency (HE) packets on resource units of the 20 MHz packet or other non-legacy packets, the WUP may include an HE preamble or non-legacy preamble in lieu of the WUR mark. In many embodiments, the WUR mark comprises one or more binary phase shift keying (BPSK)-modulated orthogonal frequency division multiplexing (OFDM) symbols.

After the BPSK symbol(s) or non-legacy preamble, the 4 MHz portion of the WUP may comprise at least one 4 MHz packet. The 4 MHz packet may comprise a fixed number of bits, no physical layer signal field, and a fixed length MAC frame (or MAC payload) in the WURx mode of operation. The VS packets may have a vendor-specific format that can have fixed or variable lengths and may include additional signaling. For instance, the VS packets may include the 20 MHz preamble portion and a 4 MHz portion comprising one or more 4 MHz packets with a packet type field and a length field. The packet type field that may comprise, e.g., 2 bits either in a PHY preamble or in the MAC frame and the length field may comprise, e.g., 8 bits.

In many embodiments, a station can signal the WURx mode or the VS mode by transmitting a wake-up radio preamble associated with the mode of operation or assigning different RUs or RUs in different 20 MHz channels to the WURx mode and the VS mode of operation.

In several embodiments, the communications devices may negotiate a sub-band or tone within which to transmit a WUR frame via the PCR. In other embodiments, the WUR may always transmit a WUR frame on the same sub-band of the channel.

Embodiments may increase spatial reuse (SR) of Wi-Fi communications with multiple different bandwidths at different frequency bands. Many embodiments focus on bands between 1 Gigahertz (GHz) and 6 GHz. Some embodiments focus on bandwidths such as 20 Megahertz (MHz), 40 MHz, 80 MHz, 160 MHz, and 80+80 MHz, while other embodiments focus on other bandwidths in the same or other frequency bands. However, the embodiments are not limited to the bandwidths and frequency bands described herein.

Various embodiments may be designed to address different technical problems associated with generating and encoding and receiving and interpreting a wake-up radio packet; generating and transmitting a wake-up radio packet with a wake-up receiver mode of operation or a vendor-specific mode of operation; identifying a wake-up radio packet for a wake-up receiver mode of operation or a vendor-specific mode of operation; generating and transmitting signaling to identify a data rate for a MAC frame in a wake-up radio packet without impacting the size or duration of the wake-up radio packet; generating and transmitting a signaling to identify a mode of operation of wake-up radio packet without impacting the size or duration of the wake-up radio packet; and/or the like.

Different technical problems such as those discussed above may be addressed by one or more different embodiments. Embodiments may address one or more of these problems associated with generation and transmission receipt and interpretation of a wake-up radio packet. For instance, some embodiments that address problems associated with generation and transmission receipt and interpretation of a wake-up radio packet may do so by one or more different technical means, such as, generating, by medium access control (MAC) logic circuitry, a wake-up radio packet, wherein the wake-up radio packet comprises an on-off keying (OOK) signal, a sequence of a preamble of the wake-up radio packet to indicate a rate of transmission of one or more OOK orthogonal frequency-division multiplexing (OFDM) symbols of a medium access control (MAC) frame of the wake-up radio packet, wherein a duration of transmission of the preamble is 128 microseconds for a low data rate and a duration of transmission of the preamble is 64 microseconds for a low data rate; and communicating the wake-up radio packet to a physical layer device coupled with the MAC logic circuitry to transmit OFDM symbols of an IEEE 802.11 preamble on a channel followed by OOK OFDM symbols of the wake-up radio packet on a sub-band of the channel; wherein the wake-up radio packet comprises one or more resource units at a center of a multi-user, orthogonal frequency-division multiple access (OFDMA) modulated signal, at least a second wake-up radio packet to transmit on a contiguous channel bandwidth with OOK OFDM symbols on a sub-band of the contiguous channel bandwidth; wherein the rate of transmission of one OOK OFDM symbol of the MAC frame of the wake-up radio packet is set to the rate of transmission of 62.5 kilobits per second for the low data rate; wherein the rate of transmission of one OOK OFDM symbol of the MAC frame of the wake-up radio packet is set to the rate of transmission of 250 kilobits per second for the high data rate; assigning a first wake-up radio preamble to a vendor-specific mode of operation and a second wake-up radio preamble to a wake-up receiver mode of operation; assigning the first wake-up radio preamble to a low data rate and the second wake-up radio preamble to a high data rate; assigning a first resource unit to a vendor-specific mode of operation and a second resource unit to a wake-up receiver mode of operation; decoding, by a physical layer device, an on-off keying (OOK) OOK orthogonal frequency-division multiplexing (OFDM) symbols of the wake-up radio packet on a sub-band of the channel, a sequence of a preamble of the wake-up radio packet to indicate a rate of transmission of one or more OOK OFDM symbols of a medium access control (MAC) frame of the wake-up radio packet, wherein a duration of transmission of the preamble is 128 microseconds for a low data rate and a duration of transmission of the preamble is 64 microseconds for a low data rate; and parsing, by a medium access control (MAC) logic circuitry coupled with the physical layer device, the MAC frame to interpret the MAC frame; monitoring for a first wake-up radio preamble associated with a vendor-specific mode of operation and a second wake-up radio preamble associated with a wake-up receiver mode of operation; monitoring a first resource unit for a vendor-specific mode of operation and a second resource unit for a wake-up receiver mode of operation; and/or the like.

Several embodiments comprise central servers, access points (APs), and/or stations (STAs) such as modems, routers, switches, servers, workstations, netbooks, mobile devices (Laptop, Smart Phone, Tablet, and the like), sensors, meters, controls, instruments, monitors, home or office appliances, Internet of Things (IoT) gear (watches, glasses, headphones, and the like), and the like. Some embodiments may provide, e.g., indoor and/or outdoor "smart" grid and sensor services. In various embodiments, these devices relate to specific applications such as healthcare, home, commercial office and retail, security, and industrial automation and monitoring applications, as well as vehicle applications (automobiles, self-driving vehicles, airplanes, and the like), and the like.

Embodiments may facilitate wireless communications in accordance with multiple standards. Some embodiments may comprise low power wireless communications like Bluetooth®, cellular communications, and messaging systems. Furthermore, some wireless embodiments may incorporate a single antenna while other embodiments may employ multiple antennas or antenna elements.

While some of the specific embodiments described below will reference the embodiments with specific configurations, those of skill in the art will realize that embodiments of the present disclosure may advantageously be implemented with other configurations with similar issues or problems.

Turning now to FIG. 1A, there is shown an embodiment of a system 1000 to transmit or receive a WUR frame (also referred to as a WUR packet) as well as to generate, transmit, receive, decode, and interpret simultaneous transmissions between an access point (AP) or peer station and multiple stations (STAs) associated with the AP or peer station. The plurality of communications devices comprises STAs 1010 and 1030, and STAs 1090, 1092, 1094, 1096, and 1098. The STA 1010 may be wired and wirelessly connected to each of the STAs 1030, 1090, 1092, 1094, 1096, and 1098 and may comprise the AP or peer station.

Each STA 1030, 1090, 1092, 1094, 1096, and 1098 may associate with the STA 1010. For instance, STA 1030 may transmit an association request frame or a reassociation request frame to the STA 1010 via a primary connectivity radio (PCR) 1082 of the STA 1030 and the PCR 1080 of the STA 1010. Within the request, the STA 1030 may include information about the capabilities of the STA 1030 including capabilities about a wake-up radio (WUR) (including WUR logic circuitry 1050 and/or WUR circuitry 1054).

The WUR logic circuitry 1050 and/or WUR circuitry 1054 may provide a capability for the STA 1030 to reduce power consumption while retaining the capability of receiving communications from the STA 1010. The WUR logic circuitry 1050 (and WUR logic circuitry 1020) may comprise circuitry and/or a combination of processing circuitry of a baseband processor and code to perform operations or functionality associated with a WUR. The WUR circuitry 1054 (and WUR circuitry 1024) may comprise circuitry such as PHY logic and/or code executed on processing circuitry such as the baseband processor. The WUR circuitry 1054 (and WUR circuitry 1024) may perform a receiver function to receive wake-up radio (WUR) frames while the PCR 1082 (and PCR 1080) is in a low power consumption mode such as a sleep mode or a transmitter function to transmit WUR PPDUs with WUR frames such as a wake-up packet (WUP) or a vendor-specific (VS) packet.

In some embodiments, the WUR circuitry 1024 and WUR circuitry 1054 may include a separate radio and/or a separate antenna (or antenna array) from the PCRs. In other embodiments, the WUR circuitry 1024 may couple with the radio 1026 and the antenna array 1028 of the PCR 1080 for receiving and/or transmitting WUR packets. In still other embodiments, the STA 1010 and/or other STAs may include wake-up receivers but may not include a corresponding wake-up transmitter. For instance, the STA 1010 may comprise AP functionality and may include a wake-up transmitter to transmit WUR packets. The rest of the STAs that do not include AP functionality may include wake-up receivers (WURx's) to receive a WUR packet and may or may not include wake-up transmitters.

During association, the STA 1010 may select a WUR capability based on the WUR capabilities that the STA 1030 communicates to the STA 1010. In some embodiments, the STA 1030 may transmit a WUR capability element such as an information element in the association frame or reassociation frame to the STA 1010.

After associating with the STA 1010, each STA 1030, 1090, 1092, 1094, 1096, and 1098 may receive a channel sounding packet for beamforming at their respective PCRs. In many embodiments, the channel sounding packet may comprise a physical layer (PHY) null data packet (NDP). For instance, the channel sounding packet may include a very high throughput (VHT) NDP or a high efficiency (HE) NDP. In some embodiments, the MAC logic circuitry 1018 of the STA 1010 may control the timing of transmission of the channel sounding packet.

The beamforming may facilitate directional transmissions from the STA 1010 to the other STAs 1030, 1090, 1092, 1094, 1096, and 1098. In some embodiments, the PCR receivers of the STAs 1030, 1090, 1092, 1094, 1096, and 1098 may be capable of directional receipt of the transmissions from the STA 1010. Furthermore, one or more of the STAs 1030, 1090, 1092, 1094, 1096, and 1098 may also transmit sounding packets to the STA 1010 to beamform transmissions to the STA 1010 and may perform such beamforming.

In several embodiments, the PCR 1080 of the STA 1010 may negotiate a transmission rate for transmission of WUR packets with the PCRs of other STAs such as STA 1030. The negotiation may involve selection by the STA 1010 of a transmission rate from one or more transmission rates in the capabilities of received from the STA 1030. In some embodiments, the STA 1030 may only include one transmission rate such as 62.5 kbps. In other embodiments, the STA 1030 may include more than one transmission rates such as 62.5 kbps and 250 kbps.

In further embodiments, the PCR 1080 of the STA 1010 may negotiate a transmission rate for transmission of WUR packets with the PCR 1082 of the STA 1030 by selection of the highest transmission rate at which, the WUR circuitry 1054 is capable of receiving a WUR packet. In some embodiments, the PCR 1082 of the STA 1030 may indicate a preference for or request a lower transmission rate or the lowest transmission rate at which the WUR circuitry 1054 is capable of receiving the WUR packet.

In some embodiments, the STA 1010 may negotiate and/or assign resource units within one or more 20 MHz channels assigned to WURx mode and VS mode operations. For instance, the STA 1010 may assign the center RU such as RU 5 of a 20 MHz channel as an RU for a WUP and RUs 3 and 7 as RUs for VS packets. In further embodiments, the STA 1010 may assign RUs in more than one channel for WUPs and VS packets.

The STA 1010 may negotiate and/or assign resource units within one or more 20 MHz channels assigned to WURx mode and VS mode operations based on capabilities indicated by the STAs 1030, 1090, 1092, 1094, 1096, and 1098 and/or based on other criteria. For instance, the STAs 1030, 1090, 1092, 1094, 1096, and 1098 may include in the capabilities information element, a capability to operate on specific frequencies or channels and a capability to operate in a WURx mode only, a capability to operate in a VS mode only, a capability to operate in both the WURx mode and the VS mode alternatively, or a capability to operate in both the WURx mode and the VS mode concurrently.

In some embodiments, the STA 1010 may assign RUs in one or more channels to WURx mode or VS mode based on the capabilities of the STAs 1030, 1090, 1092, 1094, 1096, and 1098. In other embodiments, the STA 1010 may assign RUs in one or more channels to WURx mode or VS mode based on a required basic operation of the STAs 1030, 1090, 1092, 1094, 1096, and 1098 in accordance with a standard or protocol. In further embodiments, the STA 1010 may also assign one or more STAs to one or more specific RUs within one or more different channels based on the capabilities of the STAs 1030, 1090, 1092, 1094, 1096, and 1098 to operate on the different frequencies. In several embodiments, the STA 1010 may also negotiate a schedule and/or duty cycle for one or more of the STAs 1030, 1090, 1092, 1094, 1096, and 1098.

After negotiating parameters related to the WUR, the STA 1030 may place the PCR 1082 into a sleep mode during which the PCR 1082 is unable to receive packets. The STA 1010 may determine to wake the PCR 1082 of STA 1030 to transmit an 802.11 packet and may, in response to the determination, transmit a WUP on an RU within a channel assigned for a WUP and, in some embodiments, on an RU within a channel assigned for a WUP to the STA 1030.

The PCR 1080 of the STA 1010 may be capable of transmitting the WUR packet within a sub-band of a channel within which the STA 1010 transmits a WUR PPDU with 802.11 packets. In some embodiments, the WUR logic circuitry 1020 of the MAC logic circuitry 1018 may generate the WUR packet, transmit/receive (TX/RX) circuitry 1025 of the PCR 1080 may generate symbols to transmit the WUR packet, the radio 1026 may generate radio frequency signals based on the symbols, and the antenna array 1028 may transmit the radio frequency signals that represent the WUR packet to the STA 1030.

The WUR of the STA 1030 such as the WUR circuitry 1054 may monitor one or more RUs of one or more channels assigned by the STA 1010 for the WUP. In some embodiments, the STA 1030 may switch between different RUs of one or more different channels to monitor the RUs for a WUP. In further embodiments, the STA 1030 may have a dual mode capability and thus, be capable of receiving WUPs and VS packets. In such embodiments, the WUR circuitry 1054 may also switch between monitoring for WUPs on RUs assigned to WUPs and monitoring for VS packets on RUs assigned to VS packets.

In some embodiments, the antenna array 1058 of STA 1030 may receive the radio signals that represent the WUR packet, the radio 1056 may convert the signals to symbols, and the WUR circuitry 1054 may convert the symbols into a WUR packet. In response to identifying the wake-up radio preamble, the STA 1030 may determine the data rate for a MAC frame included in the WUP. For instance, a first preamble may associate the MAC frame transmission with a low data rate (LDR) such as 62.5 kbps and a second preamble may associate the MAC frame transmission with a high data rate (HDR) such as 250 kbps.

Upon detection of the first preamble, the STA 1030 may receive the MAC frame of the WUP at the low data rate. In response to receipt of the WUR packet, the WUR circuitry 1054 may determine if the WUR packet is addressed to the STA 1030 and, in response to determining that the WUR packet is addressed to the STA 1030, the WUR circuitry 1054 may wake the PCR 1082.

In other embodiments, rather than assigning the WURx mode and VS mode to different RUs in one or more different channels, the STA 1010 may assign different wake-up radio preambles to different modes of operation. For instance, if all STAs capable of WURx mode operations are capable of receiving the WUP at 62.5 kbps and if all STAs capable of VSM operations are capable of receiving the VS packets at 250 kbps, the STA 1010 may assign a first wake-up radio preamble to signal 62.5 kbps as well as the WURx mode and a second wake-up radio preamble to 250 kbps as well as the VSM. In other embodiments, the STA 1010 may assign a first wake-up radio preamble to 62.5 kbps and WURx mode, a second wake-up radio preamble to 62.5 kbps and VSM, a third wake-up radio preamble to 250 kbps and WURx mode, and a fourth wake-up radio preamble to 250 kbps and VSM. In still other embodiments, the STA 1010 may assign, based on the capabilities of the STAs 1030, 1090, 1092, 1094, 1096, and 1098, a first wake-up radio preamble to 62.5 kbps and WURx mode, a second wake-up radio preamble to 62.5 kbps and VSM, a third wake-up radio preamble to 250 kbps and WURx mode, and/or a fourth wake-up radio preamble to 250 kbps and VSM.

In embodiments that assign different wake-up radio preambles to different modes of operation, the STAs 1030, 1090, 1092, 1094, 1096, and 1098 that are capable of more than one mode of operation and/or more than one data rate may switch between monitoring or correlating to identify one of the preambles to monitoring or correlating to identify a different one of the preambles. For instance, the STA 1030 may be capable of be capable of receiving a WUP at 62.5 kbps and a VS packet at 250 kbps. The STA 1030, while the PCR 1082 is in a power save mode, may monitor one or more RUs in one or more channels to detect a first wake-up radio preamble associated with a WUP at 62.5 kbps or a second wake-up radio preamble a VS packet at 250 kbps. In particular, the STA 1030 may switch, periodically, between monitoring for the first wake-up radio preamble to monitoring for the second wake-up radio preamble, and vice versa. In other embodiments, the STA 1030 may be capable of monitoring for both simultaneously.

In one embodiment, the STA 1030 may use energy detection in the WUR circuitry 1054 to detect a possible signal and then attempt to identify the preamble by comparing or correlating patterns of bits detected via the energy detection against the first or the second wake-up radio preamble.

The STAs 1010 and 1030 comprise processor(s) 1001 and 1031, and memory 1011, and 1041, respectively. The processor(s) 1001 and 1031 may comprise any data processing device such as a microprocessor, a microcontroller, a state machine, and/or the like, and may execute instructions or code in the memory 1011 and 1041. The memory 1011 and 1041 may comprise a storage medium such as Dynamic Random-Access Memory (DRAM), read only memory (ROM), buffers, registers, cache, flash memory, hard disk drives, solid-state drives, or the like. The memory 1011 and 1041 may store the frames, frame structures, frame headers, or the like 1012 and 1042, respectively, and may also comprise WUR logic as code for execution by processing circuitry of a processor such as the processors 1001 and 1031 and/or the baseband processors of the MAC logic circuitry 1018 and 1048.

The STAs 1010 and 1030 comprise wireless network interfaces 1022 and 1052, respectively. The wireless network interfaces 1022 and 1052 may support one or more types and formats of wireless communications such as 802.11 communications, cellular data communications, and/or the like. The wireless network interfaces 1022 and 1052 may comprise one or more main radios such as the PCR 1080 and PCR 1082, respectively, and one or more WURs such as the WUR logic circuitry 1020 and 1024, and WUR circuitry 1050 and 1054.

Each PCR 1080 and 1082 may include baseband circuitry such as MAC logic circuitry 1018 and 1048, respectively, receiver/transmitter (RX/TX) circuitry 1025 and 1055, respectively, radios 1026 and 1056, respectively, and antenna arrays 1028 and 1058, respectively. The MAC logic circuitry 1018 and 1048 may comprise one or more circuits to implement MAC layer functionality and management service interfaces through which MAC layer management functions may be invoked. The MAC logic circuitry 1018 and 1048 may comprise one or more processors such as baseband processors to execute MAC layer code stored in the memory 1011 and 1041, respectively. In other embodiments, the MAC logic circuitry 1018 and 1048 may comprise interface circuitry to execute code on the one or more processor(s) 1001 and 1031, respectively.

The MAC logic circuitry 1018 and 1048 may communicate with the physical layer (PHY) logic circuitry of wireless network interfaces 1022 and 1052, respectively, to generate signals to transmit a PHY frame such as a channel sounding packet or may provide a MAC frame to the PHY logic circuitry to transmit to the STA 1030 and the STA 1010, respectively. The MAC logic circuitry 1018 and 1048 may generate frames such as management, data, control frames, extended frames, and/or the like.

The PHY logic circuitry 1023 and 1053 of wireless network interfaces 1022 and 1052, respectively, may include logic implemented in circuitry may also include logic implemented as code to execute on the baseband processor of the MAC logic circuitry 1018 and 1048, respectively. The PHY logic circuitry 1023 and 1053 may prepare the MAC frame for transmission by, e.g., determining a preamble to prepend to a MAC frame to create a PHY frame. The preamble may include one or more short training field (STF) values, long training field (LTF) values, and signal (SIG) field values. The RX/TX circuitry 1025 and 1055 may be PHY layer devices including a transmitter and a receiver and the transmitter may process the PHY frame for transmission via the radios 1026 and 1056, respectively and the antenna arrays 1028 and 1058, respectively.

After processing the PHY frame, the radios 1026 and 1056, may impress digital data onto subcarriers of RF frequencies for transmission by electromagnetic radiation via elements of an antenna arrays 1028 and 1058, respectively. The antenna arrays 1028 and 1058 may each comprise one or more antennas and/or one or more antenna elements such as antenna elements on an integrated circuit. The RF receiver receives electromagnetic energy, extracts the digital data, and decodes the frame.

Figure 1B:
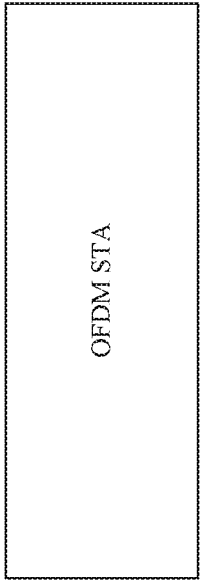
FIGS. 1B-D depicts an embodiment of transmissions between stations and an AP, resource units in a 20 Megahertz (MHz) bandwidth, an Institute of Electrical and Electronics Engineers (IEEE) 802.11 orthogonal frequency-division multiple access (OFDMA) modulated signal with a compatible wake-up radio signal at the center resource unit.
Figure 1C:
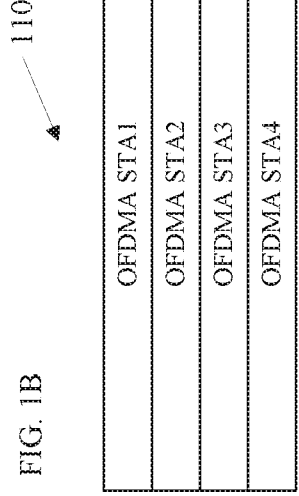
Figure 1D:
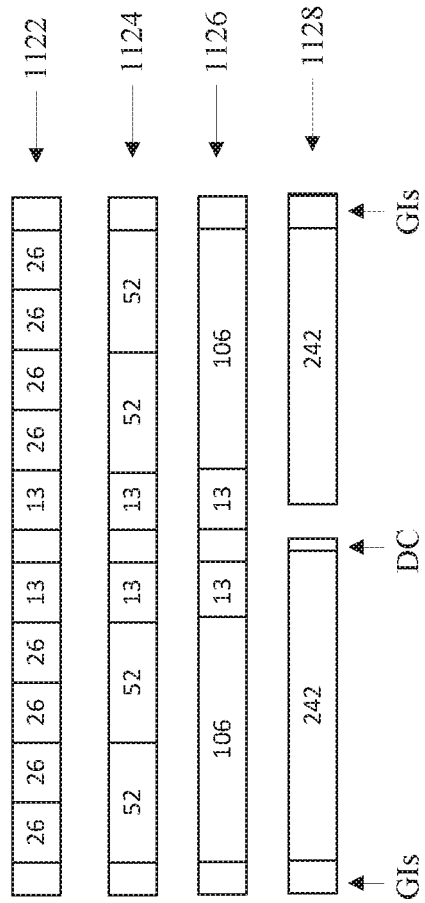

FIGS. 1B-1D illustrate embodiments of channels and subchannels, also referred to as sub-bands or resource units, that can facilitate multiple transmissions simultaneously or concurrently along with transmission of a WUR packet. FIG. 1B illustrates an embodiment of transmissions 1100 between four stations and an AP on four different subchannels of a channel via OFDMA. Grouping subcarriers into groups of resource units is referred to as subchannelization. Subchannelization defines subchannels that can be allocated to stations depending on their channel conditions and service requirements. An OFDMA system may also allocate different transmit powers to different subchannels.

In the present embodiment, the OFDMA STA1, OFDMA STA2, OFDMA STA3, and OFDMA STA4 may represent transmissions on a four different subchannels of the channel. As a comparison, FIG. 1C illustrates an embodiment of an OFDM transmission 1115 for the same channel as FIG. 1B. The OFDM transmission 1115 may use the entire channel bandwidth.

FIG. 1D illustrates an embodiment of a 20 Megahertz (MHz) bandwidth 1120 on a channel that illustrates different resource unit (RU) configurations 1122, 1124, 1126, and 1128. In OFDMA, for instance, an OFDM symbol is constructed of subcarriers, the number of which is a function of the physical layer protocol data unit (PPDU) (also referred to as the PHY frame) bandwidth. There are several subcarrier types: 1) Data subcarriers which are used for data transmission; 2) Pilot subcarriers which are utilized for phase information and parameter tracking; and 3) unused subcarriers which are not used for data/pilot transmission. The unused subcarriers are the direct-current (DC) subcarrier, the Guard band subcarriers at the band edges, and the Null subcarriers.

The RU configuration 1122 illustrates an embodiment of nine RUs that each include 26 subcarriers for data transmission including the two sets of 13 subcarriers on either side of the DC. The RU configuration 1124 illustrates the same bandwidth divided into 5 RUs including four RUs with 52 subcarriers and one RU with 26 subcarriers about the DC for data transmission. The RU configuration 1126 illustrates the same bandwidth divided into 3 RUs including two RUs with 106 subcarriers and one RU with 26 subcarriers about the DC for data transmission. And the RU configuration 1128 illustrates the same bandwidth divided into 2 RUs including two RUs with 242 subcarriers about the DC for data transmission. Embodiments may be capable of additional or alternative bandwidths such as such as 40 MHz, 80 MHz, 160 MHz and 80+80 MHz.

FIG. 1E depicts an embodiment of a wake-up radio (WUR) physical layer protocol data unit (PPDU) 1200. The WUR PPDU 1200 may comprise an IEEE 802.11 orthogonal frequency-division multiple access (OFDMA) modulated signal with wake-up radio (WUR) packets at RU 3, RU 5 at the center resource unit of a channel or a WUR PPDU, and at RU 7. The WUR packets at the RU 3 and RU 7 are VS packets for VSM operation by the receiving station(s). In some embodiments, the STA 1010 may assign the RUs 3 and 7 to the VS mode of operation and the RU 5 to the WURx mode of operation. In other embodiments, the STA 1010 may assign the three RUs to WUR packets and the VS packets on RUs 3 and 7 may include a preamble that identifies or indicates that these packets are VS packets. Similarly, the wake-up packet (WUP) on RU 5 may include a preamble that identifies or indicates that the WUR packet on RU 5 is a WUP.

In this embodiment, the channel bandwidth is 20 megahertz (MHz) and each WUR packet transmission is on a 4 MHz sub-band of the 20 MHz channel. A physical layer device, such as the PCR 1080 shown in FIG. 1A, generates a legacy preamble 1210 and a high-efficiency preamble 1215. The legacy preamble 1210 may include a network allocation vector (NAV) to inform 802.11 legacy devices that the channel is busy for a duration of time. The high-efficiency preamble 1215 may include training symbols such as short training symbols, long training symbols, one or more signal fields, possibly other data, and the like. A physical PHY layer device generates signals to transmit the WUR packets on RUs 3, 5, and 7 in a multi-user OFDMA transmission of a WUR PPDU. The physical PHY layer device multiplexes IEEE 802.11 transmissions in frequency within the same multi-user OFDMA packet. In other words, the PHY device generates signals to transmit multiple different packets on different resource units (RUs) or frequency sub-bands within the channel simultaneously via antenna elements of an antenna array such as the antenna array 1028 in FIG. 1A. Furthermore, the PHY device may beamform the transmissions on each RU independently with different subsets of the antenna elements. In other embodiments, the PHY device may generate signals to transmit the WUP at a sub-band that is not at the center of the band of the communication channel.

The RU 1, RU 2, RU 8, and RU 9 may each include a remaining portion of a physical layer data unit (PPDU) that follows the legacy and HE preambles. The RU 4 and RU 6 may be the RUs that are immediately adjacent to the WUR packets. In some embodiments, these RUs include no signals or include signals that minimize interference between the WUR packet transmissions. In further embodiments, the RUs 2 and 8 may also include no signals or include signals that minimize interference between the WUR packet transmissions and transmissions on RUs 1 and 9.

In the present embodiment, each RU includes a 2 MHz bandwidth with 26 subcarriers and the WUR packets reside on RUs 3, 5, and 7. The WUR packets transmit on 4 MHz bandwidths within these three RUs. In other embodiments, the bandwidths may vary such as the different RUs 1122 through 1128 shown in FIG. 1D for a 20 MHz bandwidth. In still other embodiments, the channel for transmission may be greater than 20 MHz such as 40 MHz, 60 MHz, 80 MHz, 160 MHz, and the like. In further embodiments, the WUR packets may transmit on two RUs that have 4 MHz and 52 subcarriers.

FIG. 1F illustrates an embodiment of a WUR physical layer protocol data unit (PPDU) 1300. FIG. 1F illustrates a legacy 802.11 preamble 1310 that comprises a single STF field 1311, a single LTF field 1312, and a single SIG field 1313 followed by BPSK symbol(s) 1314. The legacy 802.11 preamble 1310 fields represent a legacy IEEE 802.11 preamble with 6 symbols that has a duration of 24 microseconds such as an IEEE 802.11a preamble, an IEEE 802.11n preamble, or an IEEE 802.11ac preamble. The BPSK symbol(s) 1314 mark the start of a WUR packet for legacy devices that operate in accordance with, e.g., IEEE 802.11a, IEEE 802.11n, or IEEE 802.11ac, and may comprise one symbol that transmits with a duration of 4 microseconds. For IEEE 802.11ax, the preamble may include a legacy IEEE 802.11 preamble 1310 followed by a high efficiency (HE) preamble 1212 rather than the BPSK symbol(s) 1314. Other embodiments of the 802.11 preamble may include one or more preambles for one or more 802.11 standards.

After the BPSK symbol(s) 1314, which may be transmitted across the entire bandwidth of the channel such as the entire 20 MHz channel bandwidth, the WUR PPDU 1300 comprises a wake-up radio preamble 1315, a MAC header 1320, and a frame check sequence (FCS) 1330 field. The wake-up radio preamble 1315 may include, e.g., a 32-bit sequence 1316 that includes 32 symbols and transmits with a duration of 64 microseconds. Some embodiments may include repetitions of the preamble sequence. Some embodiments may include more or less bits in the sequence and some embodiments may include different sequences of bits in the wake-up radio preamble. In further embodiments, different wake-up radio preamble sequences and/or sequence repetitions may indicate different data rates such as 62.5 kbps and 250 kbps or different modes of operation such as WURx mode or VSM.

The MAC header 1320 may include a frame control field and a transmitter/paged identifier (Tx/PagedID) 1326 that is or indicates the receiver address or other ID. The receiver ID may comprise a partial MAC address for an intended receiving station. In other embodiments, the receiver ID may comprise a full MAC address for the intended receiving station. In some embodiments, the MAC header may include more fields.

After the MAC header 1320, the WUR PPDU 1300 includes a frame check sequence (FCS) 1330 to verify the packet. In other embodiments, the WUR PPDU 1300 may include an encryption hash such as a MIC, or a cyclic redundancy check (CRC) in addition to or in lieu of the FCS 1330.

FIG. 1G depicts an embodiment of a management frame 1400 for transmission and receipt by PCRs of STAs such as the PCRs 1080 and 1082 of the STAs 1010 and 1030, respectively, as shown in FIG. 1A. The WUR capable STAs 1030 and 1010 may exchange the capability for supported rate, modes of operation, and sub-channels for operation, and negotiate the supported rates (for embodiments in which the support of one or more rate is optional), modes of operations such as WURx mode and VS mode, and/or supported sub-channels (or tone, sub-band, or RU(s)) within the channel via PCRs 1080 and 1082, when setting up the WUR operation. For instance, the STA 1010 may advertise capabilities in a management frame 1400 such as a beacon frame, an association response frame, or a reassociation response frame to indicate support of transmitting a WUR packet at one or more data rates. The STA 1030 may indicate support of receiving a WUR packet at one or more data rates, in a management frame 1400 such as an association request frame or reassociation request frame.

The above capability indications for supported rate, modes of operation, and sub-channels for operation 1510 can be included in a WUR capability element such as the WUR capability element 1500 illustrated in FIG. 1H. In some embodiments, the WUR capability element 1500 illustrated in FIG. 1H may be included in a frame body 1434 of a frame such as the management frame 1400 illustrated in FIG. 1G. In such embodiments, the WUR capability element 1500 may be in another field of the management frame 1400 such as in the frame control field 1410.

In several embodiments, the STA 1010 and the STA 1030 can negotiate the tone location of the WUR packet such as an RU about the center of the channel as shown in FIG. 1E, a different RU within the channel shown in FIG. 1E, or at an RU of a different bandwidth in the channel or an RU in a channel with a different bandwidth.

The management frame 1400 is one embodiment of a frame that can transmit the WUR capability element 1500 illustrated in FIG. 1H to negotiate one or more WUR packet parameters. The choice of fields for communicating information may be application specific. In other embodiments, for example, the management frame 1400 may have more or less fields, different fields, and/or fields with different field lengths.

The management frame 1400 may comprise a MAC header with a frame control field 1410, a duration field 1430, address(es) field(s) 1432, a frame body 1434, and a frame check sequence (FCS) field 1436. The frame control field 1410 may comprise a protocol version field 1412, a type field 1414, a subtype field 1416, and other frame control bits 1418. The protocol version field 1412 may represent the revision of the corresponding standard that the frame represents. The type field 1414 may identify the type of frame 1414 as, e.g., a control frame. The subtype field 1416 may identify the subtype of the frame as, e.g., a particular type of control frame such as an association frame. The other frame control bits 1418 may represent additional fields that may be present in the frame control field such as a more fragments field, a retry field, a power management field, a more data field, or the like.

The duration field 1430 may include a duration of a network allocation vector (NAV) reminder in microseconds. The ADDR(s) field(s) 1432 may include a broadcast address to broadcast to each station associated with the STA 1010 and an address of a specific STA. The ADDR(s) field(s) 1432 may include a full or partial address or a compressed address such as a MAC address of a STA.

FIG. 1I depicts an embodiment of a WUR PPDU 1600. The WUR PPDU may comprise an IEEE 802.11 orthogonal frequency-division multiple access (OFDMA) modulated signal with a wake-up radio (WUR) packet 1620 and 1630 signal at the center resource unit of each 20 MHz packet of a contiguous 40 MHz bandwidth channel. In this embodiment, the WUR packet transmission is on a 4 MHz sub-band of the 20 MHz channel.

The RU 1, RU 2, RU 8, and RU 9 may each include a remaining portion of a physical layer data unit (PPDU) that follows the legacy and HE preambles (or BPSK symbols) 1610 and 1615, respectively. The RU 3 and RU 7 may be the RUs that are immediately adjacent to the WUR packet 1620. In some embodiments, these RUs include no signals or include signals that minimize interference between the WUR transmission and the transmissions on RU 2 and RU 8.

In the present embodiment, each RU includes a 2 MHz bandwidth with 26 subcarriers and the WUR packet resides on RUs 4, 5, and 6. The WUR packet transmits on a 4 MHz bandwidth within these three RUs. In other embodiments, the 20 MHz packets may include more than one WUR packet 1620 and 1630 on different RUs selected or negotiated by a station such as the STA 1010.

Figure 1J:
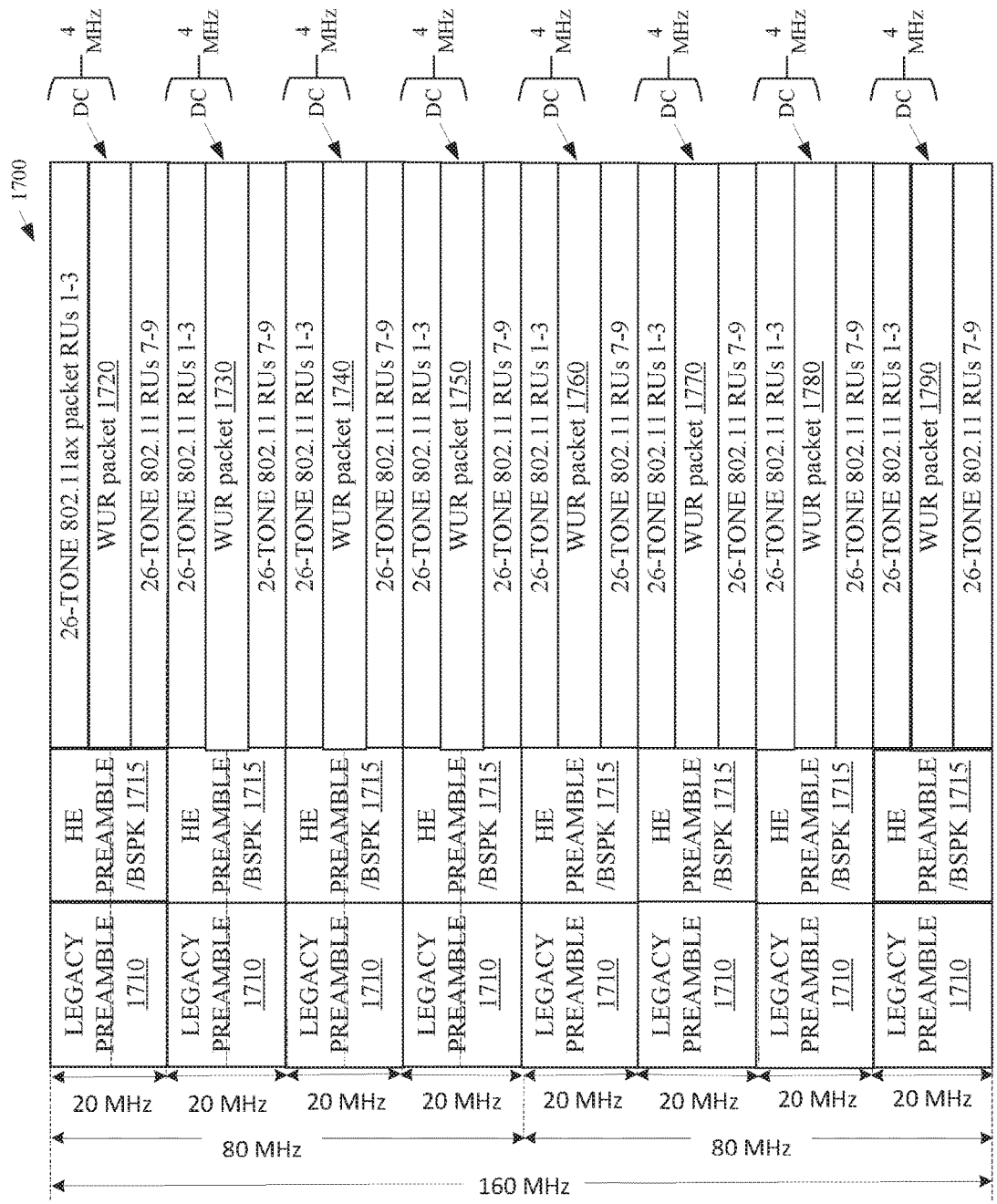

FIG. 1J depicts another embodiment 1700 of an IEEE 802.11 orthogonal frequency-division multiple access (OFDMA) modulated signal with a wake-up radio (WUR) packets 1720 through 1790 at the center resource unit of each 20 MHz packet of a contiguous 160 MHz bandwidth channel. In this embodiment, the WUR packet transmission is on a 4 MHz sub-band of the 20 MHz channel.

The RU 1, RU 2, RU 8, and RU 9 may each include a remaining portion of a physical layer data unit (PPDU) that follows the legacy and HE preambles (or BPSK symbols) 1710 and 1715, respectively. The RU 3 and RU 7 may be the RUs that are immediately adjacent to the WUR packet 1720. In some embodiments, these RUs include no signals or include signals that minimize interference between the WUR transmission and the transmissions on RU 2 and RU 8.

In the present embodiment, each RU includes a 2 MHz bandwidth with 26 subcarriers and the WUR packet resides on RUs 4, 5, and 6. The WUR packet transmits on a 4 MHz bandwidth within these three RUs. In other embodiments, each of the 20 MHz packets may include more than one WUR packet on different RUs selected or negotiated by a station such as the STA 1010. Note that this embodiment 1700 also shows two 80 MHz channels. In other embodiments, the WUR packets may transmit within packets of greater bandwidth than 20 MHz.

FIG. 2A depict embodiments of wake-up radio preambles 2000 and 2010 to distinguish a low data rate (LDR) and a high data rate (HDR), respectively. In this embodiment, the channel bandwidth is 20 megahertz (MHz) and the WUR packet transmission is on a 4 MHz sub-band of the 20 MHz channel.

FIGS. 2B-2G illustrate embodiments of wake-up radio preambles to signal low and high data rates for 62.5 Kbps and 250 Kbps for the data portion of a WUR packet. Some embodiments may implement different transmission rates for inclusion in a multi-user, transmission. For instance, some embodiments may transmit WUR packets with packets associated with other standards such as IEEE 802.11ax, 802.11an, or 802.11ac.

Embodiments may transmit the WUR packets with OOK modulation. To accomplish the OOK modulation, the STA 1010 transmits the OFDM symbol for a duration to indicate a logical one bit, such as two microseconds or four microseconds, and does not transmit the symbol for a duration, such as two microseconds or four microseconds, respectively, to indicate a logical zero bit. The STA 1010 may use the OFDM symbols to perform the OOK modulation, advantageously, to reuse an 802.11 Wi-Fi transmitter, to transmit the WUR packets. The STA 1010 may first generate a signal using OFDM with x subcarriers populated with data, where the number x depends on the bandwidth. Next the STA 1010 may perform an Inverse Fast Fourier Transform (IFFT) (like a normal OFDM transmission) to create a time-domain waveform based on the OFDM symbols. Then the STA 1010 may overlay a bit sequence of logical ones and zeros. The STA 1010 may overlay the signal by multiplying the bit sequence by the time-domain signal derived from the OFDM symbols. The STA 1010 does not transmit a signal for the parts of the time domain signal where the overlay bit sequence is zero and does transmit a signal for the parts of the time domain signal where the overlay is 1. This process creates the OOK modulated signals since the signal is either transmitted or not transmitted based on the bit sequences of the WUR packet.

A preamble duration of more than 64 us may not be desirable for many high rate applications. Instead, some embodiments may use a 32-bit sequence with a bit duration of two microseconds or a 16-bit sequence with a bit duration of two microseconds or four microseconds. A bit duration of two microseconds means the STA 1010 transmits the signal for two microseconds for a logical 1 bit and does not transmit for two microseconds to communicate a logical zero bit. This higher length sequence (32-bit) can potentially have a smaller sidelobe levels than a 16-bit sequence and hence, advantageously, better detection capability in presence of interference and noise FIG. 2B illustrates an embodiment of a WUR PPDU 2020 with a wake-up radio preamble 2025 signaling a low data rate transmission of 62.5 Kbps for the data portion of the WUR packet. The WUR PPDU 2020 may comprise a WUR packet such as a wake-up packet, a WUR beacon, a WUR discovery frame, or the like. In some embodiments, the WUR packet is included in resource units (RUs) of a transmission with communications to other devices such as other WURx's and/or 802.11ax devices in other RUs.

The WUR PPDU 2020 comprises an 802.11 preamble, a WUR mark, a wake-up radio preamble 2025 and a MAC frame. The 802.11 preamble as illustrated, comprises a short training field (STF), a long training field (LTF), and a signal field (SIG). Some embodiments may employ more than one STF, more than one LTF, and/or more than one SIG. For instance, embodiments that transmit 802.11ax frames in other resource units of the WUR PPDU may include a legacy preamble similar to that shown as well as a high efficiency (HE) preamble as illustrated in FIG. 2D. For packets that are transmitted to one or more WURx's, the WUR PPDU 2020 may only include a legacy preamble to communicate a network allocation vector (NAV) to legacy devices and legacy compatible devices in the basic service set (BSS).

The WUR mark may include pulse or symbol to identify the forthcoming WUR packet to other devices. For instance, the WUR mark may include a Binary Phase-shift keying (BPSK)-modulated OFDM symbol to cause 802.11n devices to identify the WUR PPDU 2020 as a legacy 802.11a/g packet to prevent any coexistence issues. In such embodiments, transmission of the WUR Mark prior to the wake-up radio preamble 2025 may avoid a false detection of the WUR PPDU 2020 by an 802.11n auto detection mechanism as an 802.11n packet with a higher probability. For situations of false detection, once a high throughput signal cyclic redundancy check (HT-SIG CRC) fails, the 802.11n devices drop the clear channel assessment (CCA) threshold to −62 dbm (decibel-milliwatts) of energy detect as opposed to −82 dbm of preamble detect. This is problematic and can cause collision and coexistence issues. The WUR mark may help 802.11 device to correctly set the CCA threshold setting. In other embodiments, the STA 1010 may implement the WUR mark with a different modulation and coding scheme.

In many embodiments, the STA 1010 may transmit the 802.11 preamble and the WUR mark at a 20 MHz bandwidth. In other embodiments, the STA 1010 may transmit the WUR mark at a different bandwidth than the 802.11 preamble. For instance, the STA 1010 may transmit the WUR mark at the same bandwidth as the transmission of the wake-up radio preamble 2025.

After transmitting the WUR mark, the STA 1010 may transmit the wake-up radio preamble 2025. The STA 1010 may transmit the wake-up radio preamble 2025 with an OOK modulation and, in some embodiments, may apply Manchester coding.

The wake-up radio preamble 2025 may comprise a 32-bit bit sequence comprising a zero-bit followed by a first 15-bit (pseudo-random number) PN sequence, a second 15-bit PN sequence, and a zero-bit. The STA 1010 may transmit the wake-up radio preamble 2025 at one bit every four microseconds so the total transmission time for the wake-up radio preamble 2025 may be 128 microseconds.

In many embodiments, the first and second 15-bit sequence are two repetitions of the same 15-bit PN sequence. In other embodiments, the 15-bit PN sequences are different. In still other embodiments, the 15-bit sequences are not PN sequences.

After transmitting the wake-up radio preamble 2025, the STA 1010 may transmit the MAC frame at a rate of 62.5 Kbps. To illustrate, some embodiments may transmit the MAC frame with one OOK chip transmission during a 4× symbol duration. The chip may represent a (1,0) for a logical one and a (0,1) for a logical zero with Manchester coding. Assuming that the OFDM 4× symbol duration is 12.8 microseconds and the cyclic prefix is nominally 3.2 microseconds, such embodiments transmit a chip every 16 microseconds and the transmission rate for the wake-up radio packet is 62.5 Kbps. In many embodiments, the PHY transmits the chip of (1,0) by transmitting the signal for 8 microseconds and not transmitting the signal for 8 microseconds. Similarly, the PHY transmits the chip of (0,1) by not transmitting the signal for 8 microseconds and transmitting the signal for 8 microseconds.

The MAC frame may be any type of WUR frame such as a beacon, a wake-up frame, or the like. In some embodiments, the MAC frame may comprise an action frame such as the wake-up frame illustrated in and discussed in conjunction with FIG. 2E.

After transmission of the WUR PPDU 2020, the WUR circuitry of the PHY of the receiving device, which is the STA 1030 in this embodiment, may detect the preamble, decode the rate of transmission (if capable of multiple rates), and decode the receiver address. In the present embodiment, the rate of transmission for the MAC frame is associated with the format of the wake-up radio preamble 2025. In some embodiments, the rate of the transmission of the wake-up radio preamble 2025 is constant regardless of the rate of transmission negotiated for the WUR packet but the PHY transmits the MAC frame at the negotiated transmission rate.

Once the WUR circuitry decodes the receiver address, the MAC layer circuitry 1048 may determine if the receiver address is addressed to the STA 1030. The receiver address may be a MAC address, a WUR address, an association identifier (AID), a broadcast address that identifies a group of receiving devices, or other address. The WUR packet may include a full address, a partial address, or a compressed address (such as a hash of the full or partial address).

FIGS. 2C-D illustrate alternative embodiments of WUR PPDUs 2030, 2040, 2050, and 2060 with wake-up radio preambles 2035, 2045, 2055, and 2065, respectively, for high data rate transmissions such as 250 Kbps. The STA 1010 may implement each of the with wake-up radio preambles 2035, 2045, 2055, and 2065, or one or more of these preambles. Each WUR PPDU 2030, 2040, 2050, and 2060 comprises an 802.11 preamble, a WUR mark, and a MAC frame. Similar to the discussions with respect to FIG. 1B, the 802.11 preamble as illustrated, comprises a short training field (STF), a long training field (LTF), and a signal field (SIG) but some embodiments may employ more than one STF, more than one LTF, and/or more than one SIG. Furthermore, some embodiments may transmit other 802.11 frames in other resource units of the transmission and may include a legacy preamble similar to that shown as well as a high efficiency (HE) preamble, a high throughput (HT) preamble, a very high throughput (VHT) preamble, a very high efficiency (VHE) preamble, or the like. For packets that are only transmitted to one or more WURx's, the WUR PPDUs 2030, 2040, 2050, and 2060 may only include a legacy preamble to communicate a network allocation vector (NAV) to legacy devices and legacy compatible devices in the BSS.

FIG. 2C illustrates a WUR PPDU 2030 with a wake-up radio preamble 2035. The wake-up radio preamble 2035 may signal a high data rate for the WUR data portion. In many embodiments, the wake-up radio preamble 2035 signals a high data rate of 250 Kbps for the MAC portion of the WUR packet.

After transmitting the WUR mark, the STA 1010 may transmit the wake-up radio preamble 2035. The STA 1010 may transmit the wake-up radio preamble 2035 with an OOK modulation and, in some embodiments, may apply Manchester coding. To illustrate, some embodiments may transmit the wake-up radio preamble 2035 with one OOK chip transmission during a 1× symbol duration. The chip may represent a (1,0) for a logical one and a (0,1) for a logical zero with Manchester coding. In many embodiments, the STA 1010 may transmit each bit with a two-microsecond pulse. In several embodiments, the STA 1010 may generate the two-microsecond pulse with a 32-bit Fast Fourier Transform (FFT) in a 20 MHz bandwidth with a subcarrier spacing of 625 kilohertz (KHz). The STA 1010 may generate the two-microsecond pulse with a four MHz bandwidth, which involves six subcarriers. This will advantageously save transmit energy over time-domain masking of a four-microsecond pulse and potentially reduce the frequency domain support of the pulse beyond 4 MHz over time-domain masking of a four-microsecond pulse.

In other embodiments, the two-microsecond pulse may be a four-microsecond pulse that is masked. For instance, the STA 1010 may apply a time-domain mask to block half of the four-microsecond pulse to produce the two-microsecond pulse. In such embodiments, the four-microsecond pulse uses a 64-point Fast Fourier Transform (FFT) in a 20 MHz bandwidth with a subcarrier spacing of 312.5 KHz.

The wake-up radio preamble 2035 may comprise a 32-bit bit sequence comprising a zero-bit followed by a first 15-bit PN sequence, a second 15-bit PN sequence, and a zero-bit. The STA 1010 may transmit the wake-up radio preamble 2035 at one bit every two microseconds so the total transmission time for the wake-up radio preamble 2035 may be 64 microseconds. In many embodiments, the preamble sequence, such as the 32-bit sequence, is chosen based on a specific metric such as small sidelobe levels in the auto-correlation function of the sequence or a sequence with a small peak-to-average power ratio (PAPR).

In many embodiments, the first and second 15-bit sequence are two repetitions of the same 15 bit PN sequence. In other embodiments, the 15-bit PN sequences are different. In still other embodiments, the 15-bit sequences are not PN sequences.

After transmitting the wake-up radio preamble 2035, the STA 1010 may transmit the MAC frame. The MAC frame may be any type of WUR frame such as a beacon, a wake-up frame, or the like. In some embodiments, the MAC frame may comprise an action frame such as the wake-up frame illustrated in and discussed in conjunction with FIG. 2E.

In several embodiments, the STA 1010 transmits the MAC frame at a different data rate than the wake-up radio preamble 2035. In other embodiments, the STA 1010 transmits the MAC frame at the same data rate as the wake-up radio preamble 2035.

After transmission of the WUR packet, the WUR circuitry of the PHY of the receiving device, which is the STA 1030 in this embodiment, may detect the preamble, decode the rate of transmission (if capable of multiple rates), and decode the receiver address.

FIG. 2D illustrates a WUR PPDU 2040 with a wake-up radio preamble 2045. The wake-up radio preamble 2045 may signal a high data rate for the WUR data portion. In many embodiments, the wake-up radio preamble 2045 signals a high data rate of 250 Kbps for the MAC portion of the WUR packet.

After transmitting the WUR mark, the STA 1010 may transmit the wake-up radio preamble 2045. The STA 1010 may transmit the wake-up radio preamble 2045 with an OOK modulation and, in some embodiments, may apply Manchester coding. To illustrate, some embodiments may transmit the wake-up radio preamble 2045 with one OOK chip transmission during a 1× symbol duration. In many embodiments, the STA 1010 may transmit each bit with a two-microsecond pulse. In several embodiments, the STA 1010 may generate the two-microsecond pulse with a 32-bit Fast Fourier Transform (FFT) in a 20 MHz bandwidth with a subcarrier spacing of 625 KHz. The STA 1010 may generate the two-microsecond pulse with a four MHz bandwidth, which involves six subcarriers.

In other embodiments, the two-microsecond pulse may be a four-microsecond pulse that the STA 1010 masks in the time domain to block half of the pulse to produce the two-microsecond pulse. In such embodiments, the four-microsecond pulse uses a 64-point Fast Fourier Transform (FFT) in a 20 MHz bandwidth with a subcarrier spacing of 312.5 KHz.

The wake-up radio preamble 2045 may comprise a 32-bit bit sequence comprising a zero-bit followed by a 31-bit PN sequence. The STA 1010 may transmit the wake-up radio preamble 2045 at a transmission rate of one bit every two microseconds so the total transmission time for the wake-up radio preamble 2045 may be 64 microseconds. In other embodiments, the 31-bit sequence is not a PN sequence. In many embodiments, the PHY transmits the logical one bit by transmitting the OOK symbol signal for two microseconds and the logical zero bit by not transmitting the OOK symbol signal for two microseconds.

After transmitting the wake-up radio preamble 2045, the STA 1010 may transmit the MAC frame. The MAC frame may be any type of WUR frame such as a beacon, a wake-up frame, or the like. In some embodiments, the MAC frame may comprise an action frame such as the wake-up frame illustrated in and discussed in conjunction with FIG. 2E.

After transmission of the WUR packet, the WUR circuitry of the PHY of the receiving device, which is the STA 1030 in this embodiment, may detect the preamble, decode the rate of transmission (if capable of multiple rates), and decode the receiver address.

FIG. 2E illustrates a WUR PPDU 2050 with a wake-up radio preamble 2055. The wake-up radio preamble 2055 may signal a high data rate for the WUR data portion. In many embodiments, the WUR preamble 2055 signals a high data rate of 250 Kbps for the MAC portion of the WUR packet.

After transmitting the WUR mark, the STA 1010 may transmit the wake-up radio preamble 2055. The STA 1010 may transmit the wake-up radio preamble 2055 with an OOK modulation and, in some embodiments, may apply Manchester coding. To illustrate, some embodiments may transmit the wake-up radio preamble 2055 with one OOK chip transmission during a 1× symbol duration. In many embodiments, the STA 1010 may transmit each bit with a two-microsecond pulse. In several embodiments, the STA 1010 may generate the two-microsecond pulse with a 32-bit Fast Fourier Transform (FFT) in a 20 MHz bandwidth with a subcarrier spacing of 625 KHz. The STA 1010 may generate the two-microsecond pulse with a four MHz bandwidth, which involves six subcarriers.

In other embodiments, the two-microsecond pulse may be a four-microsecond pulse that the STA 1010 masks in the time domain to block half of the pulse to produce the two-microsecond pulse. In such embodiments, the four-microsecond pulse uses a 64-point Fast Fourier Transform (FFT) in a 20 MHz bandwidth with a subcarrier spacing of 312.5 KHz.

The wake-up radio preamble 2055 may comprise a 16-bit bit sequence comprising a zero-bit followed by a 15-bit PN sequence. The STA 1010 may transmit the wake-up radio preamble 2055 at a one bit every two microseconds so the total transmission time for the wake-up radio preamble 2055 may be 32 microseconds. In other embodiments, the 15-bit sequence is not a PN sequence. In many embodiments, the PHY transmits the logical one bit by transmitting the OOK symbol signal for two microseconds and the logical zero bit by not transmitting the OOK symbol signal for two microseconds.

After transmitting the wake-up radio preamble 2055, the STA 1010 may transmit the MAC frame. The MAC frame may be any type of WUR frame such as a beacon, a wake-up frame, or the like. In some embodiments, the MAC frame may comprise an action frame such as the wake-up frame illustrated in and discussed in conjunction with FIG. 2E.

In several embodiments, the STA 1010 transmits the MAC frame at a different data rate than the wake-up radio preamble 2055. In other embodiments, the STA 1010 transmits the MAC frame at the same data rate as the wake-up radio preamble 2055.

After transmission of the WUR packet, the WUR circuitry of the PHY of the receiving device, which is the STA 1030 in this embodiment, may detect the preamble, decode the rate of transmission (if capable of multiple rates), and decode the receiver address.

FIG. 2F illustrates a WUR PPDU 2060 with a wake-up radio preamble 2065. The wake-up radio preamble 2065 may signal a high data rate for the WUR data portion. In many embodiments, the WUR preamble 2065 signals a high data rate of 250 Kbps for the MAC portion of the WUR packet.

After transmitting the WUR mark, the STA 1010 may transmit the wake-up radio preamble 2065. The STA 1010 may transmit the wake-up radio preamble 2065 with an OOK modulation and, in some embodiments, may apply Manchester coding. To illustrate, some embodiments may transmit the wake-up radio preamble 2065 with one OOK symbol transmission during a 1× symbol duration for OFDM. In many embodiments, the STA 1010 may transmit each bit of the wake-up radio preamble 2065 with a four-microsecond pulse. In several embodiments, the STA 1010 may generate the four-microsecond pulse with a 64-bit Fast Fourier Transform (FFT) in a 20 MHz bandwidth with a subcarrier spacing of 312.5 KHz. The STA 1010 may generate the four-microsecond pulse with a four MHz bandwidth, which involves 13 subcarriers.

In many embodiments, the STA 1010 transmits a bit of the wake-up radio preamble 2065 every four-microseconds. The STA 1010 may transmit the data portion of the WUR PPDU 2060, which may be the MAC frame, at 250 Kbps. In many embodiments, the PHY transmits the logical one bit of the wake-up radio preamble 2065 of the WUR PPDU 2060 by transmitting the OOK symbol signal for 4 microseconds and the logical zero bit by not transmitting the OOK symbol signal for 4 microseconds.

The wake-up radio preamble 2065 may comprise a 16-bit bit sequence comprising a zero-bit followed by a 15-bit PN sequence. The STA 1010 may transmit the wake-up radio preamble 2065 at a transmission rate of one bit every four microseconds so the total transmission time for the wake-up radio preamble 2065 may be 64 microseconds. In other embodiments, the 15-bit sequence is not a PN sequence.

After transmitting the wake-up radio preamble 2065, the STA 1010 may transmit the MAC frame. The MAC frame may be any type of WUR frame such as a beacon, a wake-up frame, or the like. In some embodiments, the MAC frame may comprise an action frame such as the wake-up frame illustrated in and discussed in conjunction with FIG. 2E.

In several embodiments, the STA 1010 transmits the MAC frame at a higher data rate than the wake-up radio preamble 2065. For instance, the STA 1010 may transmit the MAC frame at 250 Kbps in this embodiment. In other embodiments, the STA 1010 transmits the MAC frame at the same data rate or a lower data rate than the wake-up radio preamble 2065.

After transmission of the WUR packet the WUR circuitry of the PHY of the receiving device, which is the STA 1030 in this embodiment, may detect the preamble, decode the rate of transmission (if capable of multiple rates), and decode the receiver address.

FIG. 2G illustrates an embodiment of a wake-up receiver front end 2070 for WUR circuitry such as the WUR circuitry 1054 illustrated in FIG. 1A. The wake-up receiver front end 2070 may comprise logic circuitry to correlate and analyze an incoming wake-up radio preamble. The logic circuitry may comprise circuitry to perform the correlation and analysis or may comprise a combination of circuitry and logic circuitry such as a state machine, a specific purpose processor, a processor and code, or the like. The correlator 2072 may receive an incoming signal that includes a wake-up radio preamble 2025, 2045, 2055, or 2065.

The correlator 2072 may also receive or otherwise comprise a common preamble sequence for low data rate signals and high data rate signals such as a 15-bit PN sequence for correlating against the incoming signal. In some embodiments, the correlator 2072 may continually compare bits of an incoming signal until a portion of the signal matches the common preamble sequence.

In some embodiments, the common preamble sequence input is a series of repeated common preamble sequences such as 15-bit sequences or 31-bit sequences. In this embodiment, the common preamble sequence input is a zero-bit followed by a 15-bit PN sequence followed by the 15-bit PN sequence again and followed by a final zero-bit. The 15-bit PN sequence is included in both a wake-up radio preamble 2025 that signals a low data rate for the data portion of a WUR packet and a wake-up radio preamble 2055 or 2065 that signals a high data rate for the data portion of a WUR packet. For the purposes of this example, the low data rate wake-up radio preamble is the wake-up radio preamble 2025 and the high data rate wake-up radio preamble is the wake-up radio preamble 2055 or 2065. Also, for the purposes of this example, the 15-bit pn sequences in each of these wake-up radio preambles 2025, 2055, and 2065 are the same sequence.

In this embodiment, the wake-up receiver front end 2070 can distinguish between the low data rate wake-up radio preamble 2025 and the high data rate wake-up radio preamble 2055 or 2065 by correlating the incoming wake-up radio preamble against the common preamble sequence. In some embodiments, the wake-up receiver front end 2070 may include more than one correlator such as the correlator 2072 to compare the incoming wake-up radio preamble against multiple common preamble sequences and one or more analyzers 2074 to determine the rate associated with the incoming wake-up radio preamble based on the output of the correlators such as the correlator 2072.

The correlator 2072 may output peak correlations that have a peak value based on how closely a portion of the incoming signal matches the common preamble. If the incoming signal is the wake-up radio preamble 2025, as the preamble is correlated, the correlator 2072 may correlate portions of the incoming signal that are the same length as the common preamble sequence input. So as the incoming signal begins to enter the correlator 2072, the correlator 2072 will detect a first peak value when the first 15-bit sequence of the wake-up radio preamble 2025 is received. This first peak value will be based on the correlation of the one 15-bit PN sequence against the two repetitions of the 15-bit PN sequence in the common preamble sequence input. The second peak value will be larger due to the higher correlation of both 15-bit PN sequences in the incoming signal against both 15-bit PN sequences in the common preamble input. A third peak value will result from a correlation of the second 15-bit PN sequence and a portion of the MAC frame against the common preamble sequence input.

The analyzer 2074 may receive the peak values and determine that the incoming signal is the low data rate wake-up radio preamble 2025 sequence because the peak value followed by a large peak value followed by another peak value is characteristic of the low data rate wake-up radio preamble 2025. The analyzer 2074 may output an indication of the low data rate to a portion of the wake-up receiver front end 2070 to capture the MAC frame of the WUR packet at the low data rate of, e.g. 62.5 Kbps.

To further illustrate, the incoming signal may be a wake-up radio preamble that signals a high data rate for the MAC frame portion of the WUR packet such as the wake-up radio preambles 2055 or 2065. The correlator 2072 may compare the incoming signal, the wake-up radio preamble 2055 or 2065, against the common preamble sequence input that is the zero-bit followed by a 15-bit PN sequence, followed by another repetition of the 15-bit PN sequence, and followed by another zero-bit. The correlator 2072 may detect a first peak value when the 15-bit PN sequence of the incoming signal is compared against the first 15-bit PN sequence of the common preamble sequence input and may detect a second peak value that is approximately the same as the first peak value when part of the MAC frame and the 15-bit PN sequence of the incoming signal is compared against the common preamble sequence input.

The correlator 2072 may output the two peak values to the analyzer 2074 and the analyzer 2074 may determine that the incoming signal is a high data rate preamble such as the preamble 2055 or 2065 based on the magnitude of the two peak values and the timing between receipt of the two peak values. Thereafter, the analyzer 2074 may output an indication that the data rate for the incoming MAC frame of the WUR packet is the high data rate such as 250 Kbps so that the WURx can adjust the capture rate of samples from the incoming signal to detect bits in the incoming signal.

The WUR of each communications device may have a unique address. In some embodiments, the address of the WUR differs from the address assigned to main radio of the communications device, such as the MAC address or AID of an IEEE 802.11ax main radio. In other embodiments, the addresses of the main radio and the WUR is the same.

One challenge with multi-user transmission comprising a WUR packet along with IEEE 802.11ax packets is blocking the adjacent interference to WUR, which may be an inexpensive and low power consuming device. Also, the interference from WUR to the IEEE 802.11ax receiver should not cause any degradation in 802.11ax performance.

Some embodiments may populate 802.11ax OFDMA subcarriers of 4×Symbol duration to generate a WUR packet. By doing so, due to orthogonality of subcarriers, the WUR packet may not cause any interference to 802.11ax. Embodiments may also or alternatively leave adjacent resource units (RUs) blank, or without a data signal to reduce the interference from 802.11ax to the WUR. Note that using 802.11ax OFDMA numerology with 4×Symbol duration will generate lower data rate transmission for a WUR packet. As a result, many embodiments may also comprise an embedded encoder to avoid reducing the data rate to ¼th of 1×Sym duration.

Figure 2H:
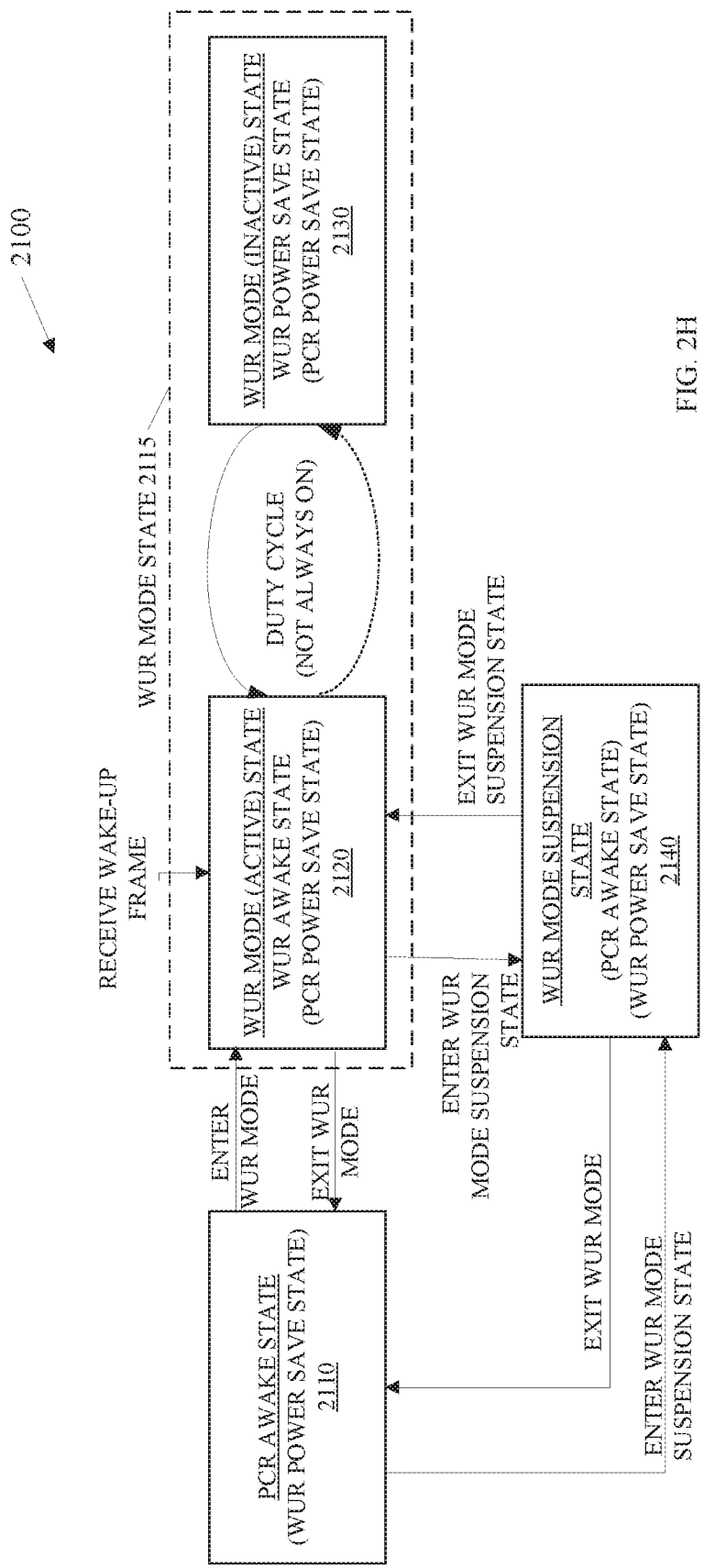

Referring now to FIGS. 1A and 2H, FIG. 2H illustrates a state diagram 2100 for a WUR suspension mode. The WUR suspension mode refers to a mode of the wake-up radio (WUR) or wake-up receiver (WURx) of a station such as the STA 1030. For instance, the WURx may be in a power save state or a WUR mode suspension state 2140 while the PCR is in an awake state 2110 and the WURx may operate in a WUR mode active state 2120 while the PCR is in a power save state. Furthermore, while the WURx is in a WUR mode state 2115, the WURx may cycle in and out of a power save state called a WUR mode inactive state 2130 in accordance with a duty cycle.

In many embodiments, a station such as the STA 1030 may determine, based on user, designer, or developer preferences, the state of the STA 1030 after receipt of the wake-up packet (WUP). For instance, the PCR 1082 may negotiate a default state for the STA 1030 by inclusion of a set of WUR mode parameters in a communication with the STA 1010. The STA 1030 may transmit a WUR request frame such as the WUR request frame 2160 illustrated in FIG. 2J with WUR mode parameter field(s) 2166. The WUR mode parameter field(s) 2166 may comprise a default state field 2168 that describes the default state in which both stations 1010 and 1030 agree that the STA 1030 will reside after the STA 1030 receives a WUP. The default state field 2168 may include a WUR mode state 2115, an exit from the WUR mode (which is a PCR awake state 2110), or a WUR mode suspension state 2140.

The WUR logic circuitry 1050 of the STA 1030 may choose as a default state field 2168, the WUR mode state 2115 that implements, e.g., a power save protocol like power save mode (PSM), an unscheduled automatic power save delivery (U-APSD) protocol, or a power save polling (PSP) protocol, where a station such as the STA 1030 can initiate an unscheduled service period to retrieve packets from the AP such as the STA 1010 and go back to a WUR mode state 2115 without an additional signaling exchange with the AP.

During the WUR mode state 2115, the station's WURx follows the duty cycle schedule (including WURx always on) while the PCR 1046 is in the doze state. The MAC logic circuitry 1018 of the STA 1010 and the MAC logic circuitry 1048 of the STA 1030 negotiate the duty cycle schedule along with other WUR mode state 2115 parameters prior to entry into the WUR mode state 2115. Furthermore, the STA 1010 and the STA 1030 suspend the existing negotiated service period for the PCR 1046 of the STA 1030. The negotiated service period may include, for instance, parameters such as the target wake time (TWT) and a schedule for wireless network management (WNM) Sleep Mode that the STA 1030 and the STA 1010 negotiate before the STA 1030 can enter the WUR mode.

While the service period is suspended, the PCR 1046 is not required to wake up during the service period. Furthermore, both the STA 1010 and the STA 1030 maintain or save the negotiated service period parameters in memory such as memories 1011 and 1041, respectively, so that the STA 1030 can resume services in accordance with the negotiated service period parameters when the PCR 1046 returns to a PCR awake state 2110.

The WUR logic circuitry 1050 may also select as a default state field 2168 value, the PCR awake state 2110. The PCR awake state 2110 terminates, or tears down, the WUR mode state 2115 and resumes services between the STA 1030 and the STA 1010 in accordance with the negotiated service period parameters. In such embodiments, the PCR 1046 may enter the PCR awake state 2110 more efficiently since an alternative way to exit the WUR mode state 2115 may require a two-way handshake. For example, a station that implements a scheduled power save protocol like TWT may determine that resumption of all negotiated TWT service periods is more useful than remaining in the WUR mode state 2115 after receipt of the WUP. On the other hand, the STA 1030 may have to perform a signaling exchange to enter WUR mode state 2115 again.

Furthermore, the WUR logic circuitry 1050 may choose as a default state field 2168 value, the WUR mode suspension state 2140. When entering the WUR mode suspension state 2140, the MAC logic circuitry 1048 may resume all the negotiated service period parameters of PCR 1046. The WUR mode suspension state 2140 may instruct both the MAC logic circuitry 1048 of the STA 1030 and the MAC logic circuitry 1018 of the STA 1010 to maintain negotiated WUR mode parameters such as the values included in the WUR mode parameter field(s) 2166 so that the STA 1030 may re-enter the WUR mode state 2115 without re-negotiating the WUR mode parameters. For instance, during an initial entry into the WUR mode state 2115, the STA 1010 may transmit a WUR request frame such as the WUR Request/Response frame 2150 shown in FIG. 2I. The WUR Request/Response frame 2150 may include a WUR mode suspension state field 2152 that includes a value that can indicate that the STA 1030 requests entry into a WUR mode suspension state 2140 as well as other fields. If the stations 1010 and 1030 have already negotiated the WUR mode parameters, the STA 1030 may enter the WUR mode suspension state 2140. On the other hand, if the stations 1010 and 1030 have not yet negotiated WUR mode parameters or no longer maintain negotiated WUR mode parameters, the stations 1010 and 1030 may negotiate the WUR mode parameters and then the STA 1030 may enter the WUR mode suspension state 2140.

The WUR mode suspension state 2140 advantageously reduces the overhead associated with entering and exiting the WUR mode state 2115. In particular, for instance, the STA 1030 may enter into the WUR mode by transmitting a WUR Request frame, such as the WUR Request/Response frame 2150 shown in FIG. 2I or the WUR request frame 2160 shown in FIG. 2J, to the STA 1010. The WUR Request/Response frames 2150 and 2160 may include a WUR mode suspension state field 2152 and 2172, respectively. The WUR mode suspension fields 2152 and 2172 may include one or more bits to indicate whether the STA 1030 is requesting entry into the WUR mode state 2115 or the WUR mode suspension state 2140. For example, a bit in the WUR mode suspension fields 2152 and 2172 may be set to a logical one if the STA 1030 is requesting entry into the WUR mode suspension state and may be set to a logical zero if the STA 1030 is requesting entry into the WUR mode state 2115. In this example, the STA 1030 is requesting entry into the WUR mode state 2115.

The WUR Request frame may be an action frame such as the WUR Request/Response frame 2160 illustrated in FIG. 2J or may be another type of frame such as the WUR Request/Response frame 2150 illustrated in FIG. 2I. The WUR Request/Response frame 2160 may include a MAC header, an action ID field 2162, an action field 2164, and a frame check sequence (FCS). In some embodiments, the MAC header may include a frame control field, a duration or network allocation vector (NAV), possibly other fields, and one or more addresses. Other WUR Request/Response frames may be frames such as the management frame 1400 shown in FIG. 1G.

The action ID field 2162 may include a value to identify the action element included as the action field 2164 and the action field 2164 may include a value to identify the action such as entering or exiting a WUR mode state 2115 or entering or exiting a WUR mode suspension state 2140. The action field 2164 may comprise the WUR mode parameter field(s) 2166 and a WUR mode suspension state field 2172. The WUR mode parameter field(s) 2166 may comprise the default state field 2168 and a WURx duty cycle field 2170. The default state field 2168 may indicate a default state such as the states described in the state diagram 2100 in FIG. 2H and may be the default state that the STA 1030 negotiates to be in after receipt of a WUP from the STA 1010.

The WURx duty cycle field 2170 may comprise a value indicative of a duty cycle. The duty cycle may describe a periodic switch by the WURx between a WUR mode active state 2120 and a WUR mode inactive state 2130. The WUR mode active state 2120 is the state during which the WURx may receive a WUP and the WUR mode inactive state 2130 is a power save state for the WURx during which the WURx is not able to receive a WUP. Furthermore, the WUR mode suspension state field 2172 may include a value to indicate if the STA 1030 is requesting to enter a WUR mode suspension state 2140 or requesting to exit a WUR mode suspension state 2140 rather than entering or exiting the WUR mode state 2115 with the WUR Request frame 2150 or 2160.

Note that the inclusion of an access point (AP) as the STA 1010 in FIG. 1A is one embodiment. In other embodiments, the STA 1030 may be a peer station rather than an AP.

The STA 1010 receives the WUR request frame from the PCR 1082 at the PCR 1080 and, in response, at a second time, PCR 1080 of the STA 1010 transmits an acknowledgement (ACK) such as the ACK 2180 illustrated in FIG. 2K. The ACK 2180 includes a MAC header and a frame check sequence (FCS). In other embodiments, the ACK may take other forms such as a physical layer ACK with no MAC payload such as the physical layer preamble 2190 illustrated in FIG. 2L, which includes a legacy preamble and a high efficiency preamble. In other embodiments, the physical layer preamble may only include a legacy preamble.

The PCR 1082 of the STA 1030 receives the ACK from the STA 1010 at the second time and the PCR 1080 of the STA 1010 transmits a WUR Response frame, such as the WUR Request/Response frame 2150 or 2160, an interframe space thereafter. In some embodiments, the WUR Response frame includes the WUR mode suspension state field 2152 or 2172 and, in other embodiments, the WUR Response frame does not include the WUR mode suspension state field 2152 or 2172. In some embodiments, the WUR Response frame includes the WUR mode parameter field(s) 2166 with values for the WUR mode parameters that are the negotiated WUR mode parameters. In other embodiments, the STA 1010 does not include the WUR mode parameter field(s) 2166 if the STA 1010 accepts the WUR mode parameters transmitted by the STA 1030 in the WUR Request frame.

The PCR 1082 of the STA 1030 receives the WUR Response frame from the STA 1010, which confirms the entry by the STA 1030 into the WUR mode state 2115 and confirms the negotiated WUR mode parameters. In response, the STA 1030 confirms receipt of the WUR Response frame and transmits an ACK to the STA 1010 prior to entering the WUR mode state 2115.

Note that exiting the WUR mode terminates the negotiated WUR mode parameters. As a result, when the STA 1030 determines to enter the WUR mode state 2115 again, the PCR 1082 of the STA 1030 re-negotiates the WUR mode parameters. Negotiating the WUR mode parameters may involve a two-way hand shake. Once the stations negotiate the WUR mode parameters, the STA 1030 can enter and exit the WUR mode state 2115 with a one-way handshake, advantageously reducing data traffic and power consumption expended by the stations 1010 and 1030. Furthermore, the STA 1030 may advantageously negotiate the WUR mode parameters without entering the WUR mode state 2115.

In some embodiments, the STA 1030 may enter the WUR mode suspension state 2140. For the purposes of this discussion, assume that the STA 1030 is in the PCR awake state 2110 and transmits a WUR Request frame to the STA 1010 to request entry into the WUR mode suspension state 2140. During the PCR awake state 2110, the PCR 1082 is awake and negotiates a service period with the STA 1010 for the STA 1010 to periodically transmit data, such as every 10 microseconds, to the STA 1030. The STA 1030 includes a WURx such as the WUR logic circuitry 1050 and the WUR circuitry 1054 in the wireless network I/F 1052 shown in FIG. 1A. At the PCR awake state 2110, the STA 1030 can enter a WUR mode state 2115 or enter the WUR mode suspension state 2140.

To reduce power consumption, the STA 1030 may determine to enter the WUR mode state 2115 periodically. The WUR Request frame may include a value in a WUR mode suspension state field 2172 that indicates that the request is to enter the WUR mode suspension state 2140 rather than the WUR mode state 2115 and includes a WURx duty cycle value such as 50 percent, or the equivalent in time units, to indicate that the WURx will remain in the WUR mode active state 2120 for half of the time in the WUR mode state 2115 and will remain in the WUR mode inactive state 2130 for the other half of the time in the WUR mode state 2115. The duty cycle may indicate, e.g., a periodic change of states between the WUR mode active state 2120 and the WUR mode inactive state 2130 every, e.g., 10 microseconds. In other embodiments, the WURx may always remain in the WUR mode active state 2120.

In response to receipt of the WUR Request frame, the PCR 1080 of the STA 1010 may respond with an ACK to confirm entry into the WUR mode suspension state 2140 by the STA 1030. In the present example, the STA 1030 has not negotiated WUR mode parameters yet so the STA 1010 may also respond with a WUR Response frame to confirm the negotiated parameters for entry into the WUR mode suspension state 2140. The STA 1030 may respond with an ACK and enter the WUR mode suspension state 2140.

During the WUR mode suspension state 2140, the PCR 1082 is awake, the WURx may be in a power save state, and the service period negotiated between the STA 1030 and the STA 1010 may remain active. In other words, the STA 1010 continues to transmit data to the PCR 1082 every 10 microseconds.

At the WUR mode suspension state 2140, the STA 1030 can exit the WUR mode or enter the WUR mode active state 2120 by exiting the WUR mode suspension state 2140.

After receipt of the ACK, the PCR 1082 of the STA 1030 may enter a sleep mode or other power save mode and the WURx may enter an awake mode to place the STA 1030 in the WUR mode active state 2120. At the WUR mode active state 2120, the WURx may periodically enter the WUR mode inactive state 2130 in accordance with the duty cycle negotiated in the WUR mode parameters with the STA 1010. As a result, the STA 1010 can determine when the WURx of the STA 1030 is active and inactive for the purposes of determining when to transmit a WUP to the STA 1030 to wake the PCR 1082 of the STA 1030.

The WUR mode parameters negotiated between the STA 1010 and the STA 1030 may also comprise a default state that indicates the state that the STA 1010 and the STA 1030 have agreed that the STA 1030 will be in at the receipt of the WUP from the STA 1010.

Some embodiments comprise stations such as the stations 1010 and 1030 shown in FIG. 1A that may generate, transmit, receive and interpret WUR discovery frames such as the WUR discovery frame 2200 illustrated in FIG. 2M. In some embodiments, the STA 1010 is an AP that comprises a WUR transceiver with both transmitting and receiving operation, a network I/F 1022 such as WUR logic circuitry 1020 of the medium access control (MAC) logic circuitry 1018, and the wireless network interface 1022 with WUR circuitry 1024. For an LP-WURx such as the STA 1030, the WUR logic circuitry 1050 and the WUR circuitry 1054 may only implement the receiving operation, and due to this reason, the STA 1030 is called a wake-up receiver (WURx). WURx may also refer to the receiver portion of a wake-up radio (WUR). In other embodiments, the STA 1030 may implement both the transmitting and receiving operation, and in such embodiments, the STA 1030 can more generally be referred to as a WUR.

A WUR discovery frame is a frame that advertises the service or service set of an AP or peer station and that the AP or peer station may transmit in a format that a WURx can receive. For instance, the STA 1010 may transmit a WUR discovery frame 2200 illustrated in FIG. 2M to the WURx of the STA 1030. The WUR circuitry 1054 may receive the WUR discovery frame 2200 as a physical layer (PHY) protocol data unit (PPDU), decode the MAC portion of the PPDU (which is the WUR discovery frame 2200), and pass the WUR discovery frame 2200 to the WUR logic circuitry 1050. The WUR logic circuitry 1050 may parse and decode the WUR discovery frame 2200 to provide the advertised service or service set identifier (SSID) to the PCR 1082. In other embodiments, the WURx awakes the PCR 1082 upon receipt of the WUR discovery frame 2200 and the MAC logic circuitry 1048 may parse and interpret the WUR discovery frame 2200.

The WUR discovery frame 2200 may include a MAC header, a frame body 2220, and a frame check sequence (FCS) 2290. The MAC header may include a frame control field 2205, an address field 2210, and a type dependent (TD) control field 2215. Other embodiments of the WUR discovery frame 2200 may include additional fields or may include less fields. For instance, the frame body 2220 may be an optional field.

The frame control field 2205 may include one or more values that identify the WUR discovery frame 2200. FIG. 2N illustrates an embodiment of a frame control field 2300 such as the frame control field 2205. The frame control field 2300 may include a type field 2310, a length field 2320, and possibly other fields 2330. The type field 2310 may include a value that identifies the type of the WUR frame as a discovery frame. Other types of WUR frames include, for example, a WUR beacon frame and a wake-up radio frame.

The length field 2320 may include a value that indicates a length of WUR parameter field(s) 2230 in the frame body 2220. In some embodiments, the length indicator(s) represent a number of octets. In further embodiments, the length indicator(s) indicate inclusion of a specific WUR parameter field or inclusion of specific WUR parameter fields in the frame body 2230. For instance, the value in the length field 2320 may associate the specific WUR parameter fields with the length as illustrated in the length table 2360 in FIG. 2P. The length table 2360 includes a column for length values and a column that associates specific fields with the length values such as the WUR parameter field(s) 2340 illustrated in FIG. 2O.

The WUR parameter field(s) 2340 in FIG. 2O is an embodiment of the WUR parameter field(s) 2230 illustrated in FIG. 2M. The WUR parameter field(s) 2340 may comprise an extended address field 2342, a channel information field 2344, a partial timing synchronization function (TSF) field 2350, and possibly other fields 2352. The extended address field 2342 may comprise a partial identifier (ID) of the ID field 2240 illustrated in FIG. 2M.

The channel information field 2344 may indicate a primary 20 MHz channel of a PCR 1080 of an AP or peer station such as the STA 1010 in FIG. 1A. This channel information may indicate to the PCR 1082 of the WURx, such as the STA 1030, the 20 MHz channel on which the STA 1030 can receive additional information from the STA 1010 via, e.g., a beacon frame broadcast by the STA 1010 or via a probe request and probe response protocol. The channel information field 2344 may comprise an operating class field 2346 that is one octet and a channel field 2348 that is one octet. The operating class field 2346 and the channel field 2348 include values to indicate an operating class and channel, respectively. The operating class may be interpreted in the context of a country specified in or designated for the WUR discovery frame. The channel is interpreted in the context of the indicated operating class. In some embodiments, the WUR discovery frame 2200 may also include a list of channel information fields that includes a value to indicate how many channel information fields are included in the WUR parameter field(s) 2230. For instance, the STA 1010 may operate on more than one channels such as a 2.4 Gigahertz (GHz) channel and 5 GHz channel. The STA 1010 may include channel information for each of the channels in the channel information field 2344.

The partial TSF field 2350 may comprise a part of a value from a TSF timer such as the TSF timer 1005 for the STA 1010. In other embodiments, the partial TSF may be the value in the TD control field 2215. The partial TSF field 2350 may include the same partial TSF value that may be included in a WUR beacon frame to facilitate timing synchronization function updates via the WUR discovery frames. Such embodiments may advantageously reduce traffic by transmitting a WUR discovery frame in lieu of transmission of both a WUR beacon frame and a WUR discovery frame, to perform synchronization and discovery operations with transmission and receipt of one frame, the WUR discovery frame 2200.

In some embodiments, the frame body 2220 includes the extended address field 2342 for all length indications, the channel information field 2344 only for some length indications, and the partial TSF field 2350 only for some length indications. In several embodiments, unused bits are reserved if the WUR parameter field(s) 2340 have a total length that is smaller than the indicated length in the length field 2320. In other words, when the length field 2320 indicates a length that is greater an actual length of one or more WUR parameter field(s) 2340 in the frame body 2220, the difference between the length in the length field 2320 and the actual length represents a set of reserved bits.

Referring again to FIG. 2M, the address field 2210 may comprise a value that is a partial ID of the ID 2240. The ID 2240 may be a ID for the STA 1010 such as a basic service set identifier (BSSID) for the STA 1010, a transmitted BSSID (virtual AP) for the STA 1010, a random number chosen by the STA 1010, a hashed value of a service set identifier (SSID) for the STA 1010, a hashed value of a service ID for the STA 1010, a hashed value of a BSSID for the STA 1010, a combination thereof, or the like. In some embodiments, the ID 2240 may comprise some bits to indicate the format of the ID. For example, the bits to indicate the format of the ID may indicate the type of the ID included and/or if the ID is hashed or is a partial ID.

In other embodiments, the format for the WUR discovery frame 2200 may redefine the fields that include partial IDs of the ID field 2240 as a single field designated as the ID field 2240. For instance, the address field 2210, the TD control field 2215, and part of the frame body 2220 such as the extended address field 2342 of the WUR parameter field(s) 2340 may be combined to form a single field designated as the ID field 2240. In another embodiment, the address field 2210 and part of the frame body 2220 may be designated as a first part and a second part of an ID field 2240 or as a most significant bits (MSBs) field and a least significant bits (LSBs) field of the ID field 2240.

The TD control field 2215 may include a control value for the WUR discovery frame or may comprise another partial ID of the ID field 2240. The frame body 2220 may comprise the WUR parameter field(s) 2230 and may comprise other fields. And the frame check sequence (FCS) 2290 field may include an error correction sequence. In one embodiment, the FCS 2290 field may comprise only the cyclic redundancy code (CRC) and may be, e.g., a nibble or four bits.

After the WURx of the STA 1030 receives a WUR discovery frame 2200, the PCR 1082 of the STA 1030 may determine the address and other capabilities and services of the STA 1010 by transmission of a probe request such as the probe request 2430 illustrated in FIG. 2Q. Some embodiments include a BSSID, an SSID, or a hash of the same, or the like in the WUR discovery frame 2200. In such embodiments, the STA 1030 may transmit a probe request frame to STA 1010 in a unicast format with the BSSID, an SSID, a service ID, a transmitted BSSID, a set of random bits to represent a BSSID, bits to indicate a format of the SSID element 2438, or a hash of the same, or a combination thereof, in the SSID element 2438. In other words, the STA 1030 may address the probe request to the one STA 1010.

In other embodiments, the WUR discovery frame 2200 does not include the BSSID, an SSID, or a hash of the same, or the like, or the STA 1030 receives multiple IDs and determines to transmit a multicast probe request to each of the corresponding stations or APs. The STA 1030 may broadcast the probe request frame to the multiple stations or APs. Broadcasting the probe request 2430 frame can trigger many probe response frames unless the STA 1030 otherwise limits the responses. In several embodiments, the STA 1030 may limit the probe responses by inclusion of a WUR element such as the WUR element 2432 in FIG. 2Q. In further embodiments, the STA 1030 may limit the probe responses by inclusion of a WUR SSID such as the WUR SSID 2440 in in the SSID element 2438 in FIG. 2Q. The WUR SSID 2440 may be an SSID that is reserved for WUR discovery operations or WUR operations more generally.

The WUR element 2432 in FIG. 2Q may include one or more IDs from WUR discovery frame 2200 such as an ID in the ID field 2240 in FIG. 2M. The WUR element 2432 shows an ID1 2434 and an ID2 2436 as an example. Based on the ID values of the ID1 2434 and the ID2 2436, the compatible APs, such as the STA 1010, that receive the broadcast probe request 2430 can determine whether to respond to the probe request. If one of the ID values in the WUR element 2432 is associated with the AP because the AP sent the value in a WUR discovery frame, then the AP can determine to respond to the probe request 2430. On the other hand, if none of the ID values in the WUR element 2432 are associated with the AP, then the AP may determine not to respond to the probe request 2430.

Each of the IDs 2434 and 2436 fields such as the ID 2240 field may comprise a partial SSID, a partial basic service set identifier (BSSID), a hash of an SSID, a hash of a BSSID, a partial transmitted BSSID, a random set of bits, a service ID, a hash of a service ID, bits to indicate a format of an ID in the WUR element field, or a combination thereof, or the like that can identify an AP or peer station. In other embodiments, each of the IDs 2434 and 2436 fields such as the ID 2240 field may comprise an SSID, a basic service set identifier (BSSID), a hash of an SSID, a hash of a BSSID, a transmitted BSSID, a random set of bits, a service ID, a hash of a service ID, bits to indicate a format of an ID in the SSID element field, or a combination thereof, that can identify an AP or peer station. Some embodiments include an ID in an SSID element 2438 field to identify a specific AP or peer station in the probe request 2430. Some embodiments include the ID in a WUR element field 2432 to identify a specific AP or peer station in the probe request 2430.

The WUR SSID 2440 may be an indicator that associates the probe request frame with WUR discovery operations or WUR operations. Compatible devices such as the STA 1010 may associate the WUR SSID 2440 with WUR operations and legacy devices may associate the WUR SSID 2440 of the probe request 2430 with an address or ID of another device. Thus, the legacy devices may not respond to the probe request 2430, advantageously reducing or limiting the number of probe responses received by the STA 1030 in response to transmission of the probe request 2430. In some embodiments, the probe request 2430 frame also includes one or more other fields 2442.

To illustrate further, the STA 1030 may include an SSID x in the SSID element 2438 field if the hash of the SSID is included in the ID field 2240 of the WUR discovery frame 2200 and matches the value of SSID x. The STA 1030 may include a service ID x in a defined WUR element 2432 if the hash of the service ID is included in the ID field 2240 of the WUR discovery frame 2200 and matches the value of service ID x.

The WUR element 2432 may carry the value in the ID field 2240 or the hashed value of the ID field 2240 of the received WUR discovery frame 2200 or a list of IDs, a hashed value of a list of IDs, or hashed values of the list of IDs received from a series of WUR discovery frames 2200.

The STA 1010 that sends WUR discovery frame 2200 only responds with a probe response frame such as the probe response frame 2452 with relevant information of the BSS in the PCR 1080 of the STA 1010 if the ID value or the hashed ID value in the WUR element 2432 of the probe request 2430 frame matches the ID value or hashed ID value used by the STA 1010 to send the WUR discovery frame 2200. This advantageously reduces the number of probe responses in the neighborhood.

The STA 1010 that sends WUR discovery frame 2200 and also responds with a probe response that carries a WUR element 2454 in the probe response 2452. The WUR element 2454 may carry the ID value or hashed value of the ID indicated in the ID field 2240 of the WUR discovery frame 2200. This helps the STA 1030 to figure out which station is associated with the ID value or hashed value of the ID.

A PCR protocol to minimize the probe responses from the legacy AP that do not recognize the WUR element 2432 may reserve the WUR SSID 2440 for WUR operations. In such embodiments, the STA 1030 that sends the probe request 2430 may include the SSID element 2438 field with the WUR SSID 2440. The STA 1010 that sends WUR discovery frame 2200 may only respond with a probe response 2452 if the SSID element 2438 field in the probe request 2430 carries the WUR SSID 2440. And the legacy AP may not respond with a probe response 2452 since the SSID in the SSID element 2438 field of the probe request 2430 does not match its SSID.

An example of the discovery procedure is shown in FIGS. 2Q and 2R. FIG. 2Q illustrates a neighborhood at a moment in time 2400 when the STA 2420 transmits a probe request 2430 and the FIG. 2R illustrates the neighborhood at a moment in time 2450 when the STA 2420 receives responses from the APs. In this example, the STA 2420 receives a WUR discovery frame 2200 from AP 2410 with ID1 2434 and a channel information field 2344 with channel information. The STA 2420 receives a WUR discovery frame 2200 from AP 2414 with ID3 2436 and a channel information field 2344 with channel information. There are four existing APs (2410, 2412, 2414, and 2416) operating in the channel indicated by the channel information in the WUR discovery frame 2200. The STA 2420 sends a broadcast probe request 2430 in the channel indicated by the channel information with WUR element 2432, carrying ID1 2434 and ID3 2436, and an SSID element 2438 field carrying the reserved SSID for WUR operation, WUR SSID 2440.

The legacy AP 2416 does not respond probe response because value in the SSID element 2438 field does not match the legacy AP's 2416 SSID. The AP 2412 does not respond with a probe response because neither of the IDs 2434 and 2436 in the WUR element 2432 match the ID of the AP 2412. The AP 2410 responds with probe response 2452 because ID 2434 in WUR element 2432 matches an ID transmitted by the AP 2410 in a WUR discovery frame 2200 and the SSID for WUR operation matches the WUR SSID 2440. The probe response 2452 carries the WUR element 2454 with ID1 2434 and possibly other fields 2456.

The AP 2414 responds with probe response 2460 because the ID 2436 in the WUR element 2432 matches an ID transmitted by the AP 2414 in a WUR discovery frame 2200 and the SSID for WUR operation matches the WUR SSID 2440. The probe response 2460 carries the WUR element 2462 with ID3 2436 and possibly other fields 2464.

The STA 2420 receives the probe responses 2452 and 2460 from AP 2410 and AP 2414 and identifies them as the requested probe responses 2452 and 2460 because the WUR elements 2454 of the probe responses 2452 and 2460 from AP 2410 and AP 2414 carry ID1 2434 and ID3 2436 respectively.

In some embodiments, the wake-up radio beacon, wake-up radio discovery frame, or wake-up packet may transmit with other packets such as IEEE 802.11 packets in a WUR PPDUs 1200, 1600, and 1700 illustrated in FIGS. 1E, 1I, and 1J. Some of these embodiments may facilitate transmission of the WUR PPDU in an IEEE 802.11ax multi-user, orthogonal frequency-division multiple access (OFDMA) packet format. The basic idea is shown by the examples given in FIGS. 1E, 1I, and 1J, where the PHY transmits the wake-up packet at the center of the band in a multi-user OFDMA transmission that multiplexes IEEE 802.11 transmissions in frequency within the same multi-user OFDMA packet (referenced herein as a WUR PPDU). In other words, the PHY transmits multiple different packets on different resource units or frequency sub-bands with the channel simultaneously. In other embodiments, the WUR circuitry may transmit a WUR frame in the WUR PPDU without transmitting packets in other sub-bands of the channel.

Many embodiments may transmit a Wake-up radio preamble of the WUR packet to synchronize with a WUR of another device. In some embodiments, the Wake-up radio preamble may also include a rate field or a signal field that includes a transmission rate for a medium access control (MAC) layer packet that follows the Wake-up radio preamble. Other embodiments may only be capable of receiving the WUR packet at one rate and, in such embodiments, the WUR packet may not include a rate field or signal field with a transmission rate.

After transmission of the WUP, the WUR circuitry 1054 of the PHY of the receiving device may decode the receiver address. Once the WUR circuitry 1054 decodes the receiver address, the MAC layer circuitry 1048 may determine if the receiver address is addressed to the WUR circuitry 1054. The receiver address may be a MAC address, a WUR address, an association identifier (AID), a broadcast address that identifies a group of receiving devices, or other address. The WUR packet may include a full address, a partial address, or a compressed address (such as a hash of the full or partial address).

The WUR (WUR logic circuitry and WUR circuitry) of each STA 1010 and 1030 may have a unique address. In some embodiments, the address of the WUR differs from the address assigned to the PCR 1080 and 1082 of the stations 1010 and 1030, respectively, such as the MAC address or AID of an IEEE 802.11 PCR. In other embodiments, the addresses of the PCR and the WUR are the same.

Figure 2S:
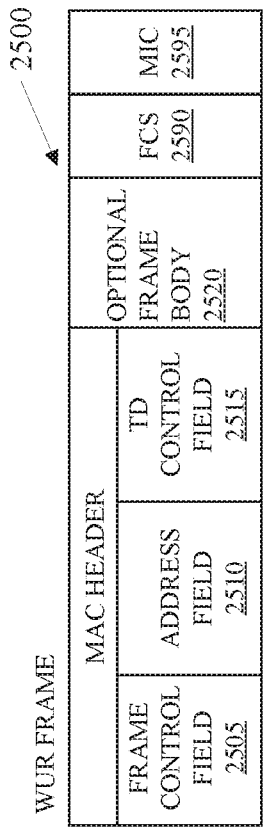
FIGS. 2S-W depict embodiments of wake-up radio (WUR) frame formats, a message, an extended message content, and an alternative extended message content.

Referring now to FIGS. 1A and 2S, FIG. 2S illustrates an embodiment of a WUR frame 2500 with the message integrity code (MIC) 2595 appended. The WUR frame 2500 may comprise a MAC header, an optional frame body 2520, a frame check sequence (FCS) 2590, and a MIC 2595. The MAC header may comprise a frame control field 2505, an address field 2510, and a type dependent (TD) control field 2515. Note that while the MIC 2595 is appended to the end of the WUR frame 2500, the MIC 2595 may be inserted at any location within or outside of the WUR frame 2500.

The system 1000 may perform WUR frame authentication. The STA 1010 may be an access point or a peer station and the STA 1030 may be a WUR receiver (WURx). The STA 1010 may determine to transmit a WUR frame 2500 to the STA 1030. The STA 1010 may calculate the MIC 2595, append the MIC 2595 to the WUR frame 2500 as illustrated in FIG. 2S, and transmit the WUR frame 2500 with the MIC 2595 to the STA 1030 so that the STA 1030 can authenticate the WUR frame 2500 with the MIC 2595. The STA 1030 may calculate the MIC 2595 by the same process used by the STA 1010 to create the MIC 2595 and may compare the MIC 2595 to the calculated MIC. If the MIC 2595 matches the calculated MIC then the WUR frame 2500 is authenticated and the STA 1030 may parse and interpret the WUR frame 2500. On the other hand, if the MIC 2595 does not match the MIC 2595, the STA 1030 may discard the WUR frame 2500.

In some embodiments, the stations 1010 and 1030 may determine the MIC based on a block cipher. In several embodiments, the stations 1010 and 1030 may determine the MIC based on a cipher-based message authentication code (CMAC) with an advanced encryption standard (AES) block cipher such as the CMACs 2800 and 2900 illustrated in FIGS. 2Y and 2Z. The AES block cipher may be, for example, 128 bits or 256 bits.

One issue in determining the MIC 2595 is that, in some embodiments, the WUR frame 2500 may be about 32 bits in length, with possibly just a MAC header. If the stations perform the CMAC illustrated in FIG. 2Z without further processing, an e.g., 96-bit message padding 2916 may be added to the one block of the message 2914, exclusive-ORed (XORed) with the key2 2930, and combined with the block cipher 2920 to generate the MIC 2595. In some embodiments, if the length of the computation output from the block cipher is too long, the output may be truncated by the MSB 2940 (most significant bits) to generate a MIC 2595 of the correct length.

The issue is that the protection of the message from tampering is reduced due the short length of the WUR frame 2500 and the length of message padding 2916 specified for the process. Some embodiments also address this tampering issue by determining or generating an extended message content such as the extended message content 2660 in FIG. 2V or the extended message content 2670 in FIG. 2W.

The STA 1010 may generate or determine the MIC 2595 by generating, calculating, and/or determining an extended message content 2660 or 2670. The extended message content 2660 may comprise a specification defined portion 2662 and a WUR transmitter (STA 1010) indicated portion 2664. The specification defined portion 2662 may comprise information such as part of or all of a MAC address for the PCR 1080 of the STA 1010, part of or all of the MAC address for the PCR 1082 of the STA 1030, a partial or complete MAC address for the WURx of the STA 1030, other information, a combination of one or more of these, a hash of the combination, a hash of one or more of these, or the like.

The a WUR transmitter (STA 1010) indicated portion 2664 may comprise any data that the STA 1010 determines to use for the extended message content 2660. For instance, the STA 1010 may generate a pseudorandom number, identify field values, indicate a calculation based on different field values or other data to include as the extended message content 2660. In many embodiments, the STA 1010 may transmit the WUR transmitter indicated portion 2664 in a WUR packet such as a WUR beacon or a WUR action frame like the WUR response 2730 illustrated in FIG. 2X.

FIG. 2X illustrates an embodiment of a frame exchange 2700 between a station such as the STA 1030 and an AP such as the STA 1010. The frame exchange may represent, e.g., a negotiation of WUR parameters between the STA 1010 and the STA 1030. The STA 1030 may transmit a WUR request 2710 to the STA 1010. The STA 1010 may acknowledge the WUR request 2710 by transmitting an ACK 2720 to the STA 1030. Thereafter, the STA 1010 may transmit a WUR response 2730 that includes the WUR transmitter indicated portion 2664. In some embodiments, the WUR transmitter indicated portion 2664 may be in the frame body 2520 and may include an element or an information element. The element may indicate a length of the information and may include a bit sequence that is the WUR transmitter indicated portion 2664 or indicate a process or procedure to determine the WUR transmitter indicated portion 2664. In some embodiments, the element may comprise a WUR mode element. In some embodiments, the size of the extended message content is indicated by the transmitter of the WUR (STA 1010) and, in other embodiments, the size is indicated in a standard or specification. The STA 1030 may respond by transmitting an ACK 2740 to the STA 1010.

Figure 2T:
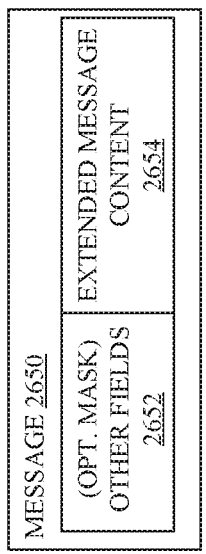
Figure 2U:
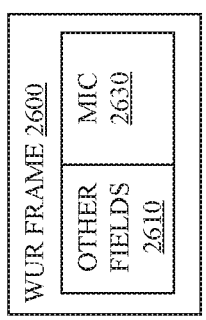
Figure 2V:
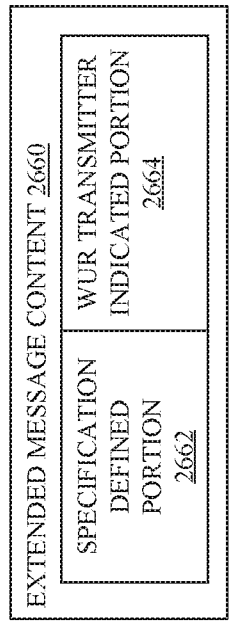
Figure 2W:
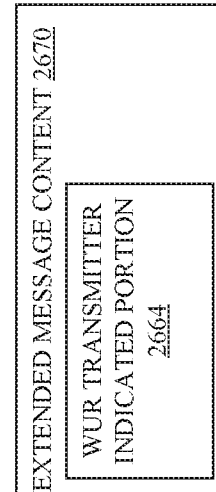

FIG. 2W illustrates an alternative embodiment of the extended message content 2670. The extended message content 2670 includes the WUR transmitter indicated portion 2664 and does not include the specification defined portion 2662. In other embodiments, the extended message content 2670 may only include the specification defined portion 2662.

Once the STA 1010 identifies the extended message content 2660 or 2670 to the PCR 1082 of the STA 1030, the STA 1010 may generate the MIC 2595. In other embodiments, the STA 1010 may identify the WUR transmitter indicated portion 2664 to the WURx of the STA 1030 in a WUR packet such as a wake-up frame or a WUR beacon.

FIG. 2T illustrates an alternative embodiment of a WUR frame 2600. The WUR frame 2600 comprises other fields 2610 and a MIC 2630. The other fields 2610 may include different fields or a different combination of the fields in WUR frame 2500 such as the frame control field 2505, a field such as the address field 2510 to identify the frame with a transmitting WUR or a receiving WUR, and/or other fields.

The STA 1010 may append the extended message content to the WUR frame 2500 to form a message such as the message 2650 illustrated in FIG. 2U. The message 2650 may include other fields 2652 and the extended message content 2654. The other fields 2652 may include fields included in the WUR frame such as the WUR frame 2500 or the WUR frame 2600.

The extended message content 2654 may be appended to the other fields 2652 of the WUR frame at any location within the WUR frame such as before the first field in the WUR frame, after the first field in the WUR frame, after the last field in the WUR frame, or the like. After appending the extended message content 2654 to the WUR frame, the STA 1010 may generate the MIC such as the MIC 2595 or the MIC 2630.

FIG. 2Y illustrates a cipher-based message authentication code (CMAC) 2800 for determining the MIC if the message 2650 can be split into an integer number of message blocks and FIG. 2Z illustrates a cipher-based message authentication code (CMAC) 2900 to generate the MIC if the last block has less bits than a full message block for the CMAC. In the present example, assume that the message can be split into exactly three 128-bit message blocks 2810, 2812, and 2814. First, a message 2650 is constructed and dissected into several blocks Mi with block size b (message blocks 2810, 2812, and 2814). The remaining bits become Mn*. If size of Mn* is less than the block size b, a message 2650 is constructed and dissected into several blocks Mi with block size b (message blocks 2910 and 2912) and message block 2914 is padded with 10 . . . 0 via message padding 2916 to meet the block size b and the computation uses subkey K2 2930 as shown in FIG. 2Z. If size of Mn* is equal to the block size b, the computation uses subkey K1 2830 as shown in FIG. 2Y.

Second, all the blocks then go through the computation as shown in FIG. 2Y or 2Z, where block cipher 2820 is an, e.g., AES block cipher operation with key K and the circle with the plus inside means an XOR operation. In particular, the message block 1 2810 is processed by the block cipher 2820 and XORed with the message block 2 2812. The result therefrom is processed by the block cipher 2820 and XORed with the message block 2814 and the key1 2830. The result therefrom is processed by the block cipher 2820 and, if necessary, truncated by the MSB 2840. Finally, most significant bits (MSB) 2840 truncates the computation result to size T by taking the T MSB's to determine the MIC such as the MIC 2595 or 2630.

The STA 1010 may append the MIC to the WUR frame such as is shown in WUR frame 2500 or WUR frame 2600 and pass the WUR frame with the MIC to a physical layer device such as the WUR circuitry 1024 in the wireless network interface 1022 to encode the WUR frame with the MIC and to transmit the WUR frame to the STA 1030 via an antenna array 1028.

The STA 1030 may receive the physical layer (PHY) frame via an antenna array 1058 of the WUR circuitry 1054 of the wireless network interface 1052 and decode the PHY frame to determine the WUR frame and MIC. Thereafter, the STA 1030 may determine if the WUR frame is valid by determining the extended message content in the same manner that the STA 1010 determined the extended message content such as the extended message content 2660 or 2670.

The STA 1030 may append the extended message content to the WUR frame received from the STA 1010. In some embodiments, the WUR frame may include reserved fields or unused fields that are known to the STA 1030. In such embodiments, the STA 1030 may mask the WUR frame received from the STA 1010 to correct any errors in such fields to create the optionally masked other fields 2652 in FIG. 2U.

The STA 1030 may generate or determine the MIC by the CMAC shown in FIG. 2Y or FIG. 2Z to determine the MIC based on the message 2650. Then the STA 1030 may compare the MIC received from the STA 1010 with the MIC determined from the message 2650 to determine if the WUR frame received from the STA 1010 is valid. If the determined MIC matches the MIC received with the WUR frame (the received MIC), the STA 1030 may determine that the WUR frame is valid and proceed to parse and interpret the WUR frame. If the STA 1030 determines that the WUR frame is invalid, the STA 1030 may, e.g., discard the WUR frame, respond to the STA 1010 with an indication that the WUR frame is invalid, perform additional error correction of the WUR frame, and/or the like.

Figure 3:
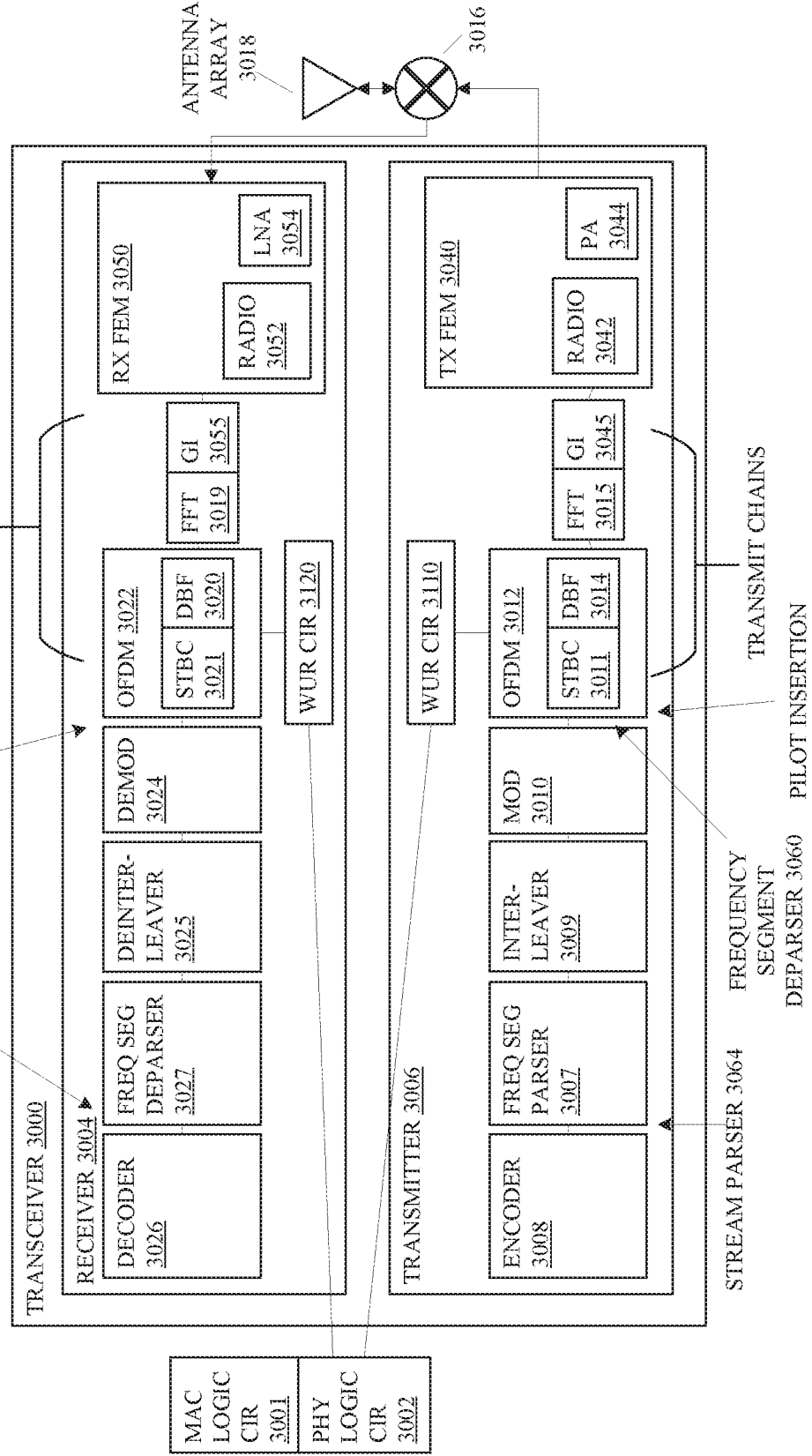
FIG. 3 depicts an embodiment of an apparatus to support compatible low rate for wake-up radio packet transmission.

FIG. 3 depicts an embodiment of an apparatus to generate, transmit, receive, and interpret or decode PHY frames and MAC frames with a WUR packet to support compatible low rate for wake-up radio packet transmission. The apparatus comprises a transceiver 3000 coupled with MAC logic circuitry 3001 and PHY logic circuitry 3002. The MAC logic circuitry 3001 and PHY logic circuitry 3002 may comprise code executing on processing circuitry of a baseband processor and/or other processor; circuitry to implement operations of functionality of the MAC or PHY; or a combination of both. The MAC logic circuitry 3001 may determine a frame such as a WUR frame and the PHY logic circuitry 3002 may determine the physical layer protocol data unit (PPDU) by prepending the frame or multiple frames, also called MAC protocol data units (MPDUs), with a preamble to transmit.

The transceiver 3000 comprises a receiver 3004 and a transmitter 3006. Embodiments have many different combinations of modules to process data because the configurations are deployment specific. FIG. 3 illustrates some of the modules that are common to many embodiments.

In the present embodiment, the transceiver 3000 includes WUR circuitry 3110 and 3120 such as the WUR circuitry 1024 and 1054, respectively, shown in FIG. 1A. The WUR circuitry 3110 may comprise circuitry to use portions of the transmitter 3006 (a transmitter of the PCR) to generate a WUR packet or a vendor-specific packet. For instance, the WUR circuitry 3110 may generate an OOK signal with OFDM symbols to generate a WUR discovery frame for transmission via the antenna array 3018. In many embodiments, the WUR circuitry 3110 may generate an OOK signal for a preamble associated with a low data rate that comprises twice the number of symbols as an OOK signal for a preamble associated with a high data rate. In several embodiments, the preamble may comprise 32 symbols. In some embodiments, the low data rate preamble may have a duration of 128 microseconds and the high data rate preamble may have a duration of 64 microseconds.

Note that a station such as the STA 1010 in FIG. 1A may comprise multiple transmitters to facilitate concurrent transmissions on multiple contiguous and/or non-contiguous carrier frequencies and WUR circuitry 3110 may couple with more than one of the transmitters or more than one of the transmitters may comprise instances of WUR circuitry to facilitate simultaneous WUR packet transmissions in one or multiple 802.11 packets (WUR PPDUs) on channels with bandwidths such as 40 MHz, 80 MHz, and 160 MHz. In other embodiments, the WUR may comprise an independent circuitry that does not use portions of the transmitter 3006.

The WUR circuitry 3120 may comprise circuitry to use portions of the receiver 3004 while in a WUR mode state in which the PCR is in a power save mode and the wake-up radio is in a WUR active mode or a WUR inactive mode. The WUR circuitry 3120 may comprise circuitry to use portions of the receiver 3004 (a receiver of the PCR) to receive a WUR packet such as a wake-up packet or a vendor-specific packet in the form of OFDM OOK symbols while the remainder of the receiver 3004 (the PCR) is in a power save mode.

The transmitter 3006 may comprise one or more of an encoder 3008, a stream deparser 3064, a frequency segment parser 3007, an interleaver 3009, a modulator 3010, a frequency segment deparser 3060, an OFDM 3012, an IFFT module 3015, a GI module 3045, and a transmitter front end 3040. The encoder 3008 of transmitter 3006 receives and encodes a data stream destined for transmission from the MAC logic circuitry 3001 with, e.g., a binary convolutional coding (BCC), a low-density parity check coding (LDPC), and/or the like. After coding, scrambling, puncturing and post-FEC (forward error correction) padding, a stream parser 3064 may optionally divide the data bit streams at the output of the FEC encoder into groups of bits. The frequency segment parser 3007 may receive data stream from encoder 3008 or streams from the stream parser 3064 and optionally parse each data stream into two or more frequency segments to build a contiguous or non-contiguous bandwidth based upon smaller bandwidth frequency segments. The interleaver 3009 may interleave rows and columns of bits to prevent long sequences of adjacent noisy bits from entering a BCC decoder of a receiver.

The modulator 3010 may receive the data stream from interleaver 3009 and may impress the received data blocks onto a sinusoid of a selected frequency for each stream via, e.g., mapping the data blocks into a corresponding set of discrete amplitudes of the sinusoid, or a set of discrete phases of the sinusoid, or a set of discrete frequency shifts relative to the frequency of the sinusoid. In some embodiments, the output of modulator 3010 may optionally be fed into the frequency segment deparser 3060 to combine frequency segments in a single, contiguous frequency bandwidth of, e.g., 160 MHz. Other embodiments may continue to process the frequency segments as separate data streams for, e.g. a non-contiguous 80+80 MHz bandwidth transmission.

After the modulator 3010, the data stream(s) are fed to an OFDM 3012. The OFDM 3012 may comprise a space-time block coding (STBC) module 3011, and a digital beamforming (DBF) module 3014. The STBC module 3011 may receive constellation points from the modulator 3010 corresponding to one or more spatial streams and may spread the spatial streams to a greater number of space-time streams. Further embodiments may omit the STBC.

The OFDM 3012 impresses or maps the modulated data formed as OFDM symbols onto a plurality of orthogonal subcarriers so the OFDM symbols are encoded with the subcarriers or tones. The OFDM symbols may be fed to the DBF module 3014. Generally, digital beam forming uses digital signal processing algorithms that operate on the signals received by, and transmitted from, an array of antenna elements. Transmit beamforming processes the channel state to compute a steering matrix that is applied to the transmitted signal to optimize reception at one or more receivers. This is achieved by combining elements in a phased antenna array in such a way that signals at particular angles experience constructive interference while others experience destructive interference.

The Inverse Fast Fourier Transform (IFFT) module 3015 may perform an inverse discrete Fourier transform (IDFT) on the OFDM symbols to map on the subcarriers. The guard interval (GI) module 3045 may insert guard intervals by prepending to the symbol a circular extension of itself. The GI module 3045 may also comprise windowing to optionally smooth the edges of each symbol to increase spectral decay.

The output of the GI module 3045 may enter the transmitter front end 3040. The transmitter front end 3040 may comprise a radio 3042 with a power amplifier (PA) 3044 to amplify the signal and prepare the signal for transmission via the antenna array 3018. In many embodiments, entrance into a spatial reuse mode by a communications device such as a station or AP may reduce the amplification by the PA 3044 to reduce channel interference caused by transmissions.

The transceiver 3000 may also comprise duplexers 3016 connected to antenna array 3018. The antenna array 3018 radiates the information bearing signals into a time-varying, spatial distribution of electromagnetic energy that can be received by an antenna of a receiver. In several embodiments, the receiver 3004 and the transmitter 3006 may each comprise its own antenna(s) or antenna array(s).

The transceiver 3000 may comprise a receiver 3004 for receiving, demodulating, and decoding information bearing communication signals. The receiver 3004 may comprise a receiver front-end to detect the signal, detect the start of the packet, remove the carrier frequency, and amplify the sub-carriers via a radio 3052 with a low noise amplifier (LNA) 3054. The receiver 3004 may comprise a GI module 3055 and a fast Fourier transform (FFT) module 3019. The GI module 3055 may remove the guard intervals and the windowing and the FFT module 3019 may transform the communication signals from the time domain to the frequency domain.

The receiver 3004 may also comprise an OFDM 3022, a frequency segment parser 3062, a demodulator 3024, a deinterleaver 3025, a frequency segment deparser 3027, a stream deparser 3066, and a decoder 3026. An equalizer may output the weighted data signals for the OFDM packet to the OFDM 3022. The OFDM 3022 extracts signal information as OFDM symbols from the plurality of subcarriers onto which information-bearing communication signals are modulated.

The OFDM 3022 may comprise a DBF module 3020, and an STBC module 3021. The received signals are fed from the equalizer to the DBF module 3020. The DBF module 3020 may comprise algorithms to process the received signals as a directional transmission directed toward to the receiver 3004. And the STBC module 3021 may transform the data streams from the space-time streams to spatial streams.

The output of the STBC module 3021 may enter a frequency segment parser 3062 if the communication signal is received as a single, contiguous bandwidth signal to parse the signal into, e.g., two or more frequency segments for demodulation and deinterleaving.

The demodulator 3024 demodulates the spatial streams. Demodulation is the process of extracting data from the spatial streams to produce demodulated spatial streams. The deinterleaver 3025 may deinterleave the sequence of bits of information. The frequency segment deparser 3027 may optionally deparse frequency segments as received if received as separate frequency segment signals, or may deparse the frequency segments determined by the optional frequency segment parser 3062. The decoder 3026 decodes the data from the demodulator 3024 and transmits the decoded information, the MPDU, to the MAC sublayer logic 3001.

The MAC logic circuitry 3001 may parse the MPDU based upon a format defined in the communications device for a frame to determine the particular type of frame by determining the type value and the subtype value. The MAC logic circuitry 3001 may then interpret the remainder of MPDU.

While the description of FIG. 3 focuses on a single spatial stream system for simplicity, many embodiments are capable of multiple spatial stream transmissions and use parallel data processing paths for multiple spatial streams from the PHY logic circuitry 3002 through to transmission. Further embodiments may include the use of multiple encoders to afford implementation flexibility.

FIGS. 4A-B depict embodiments of flowcharts 4000 and 4100 to transmit communications with a frame. Referring to FIG. 4A, the flowchart 4000 may begin with a wireless network interface of a communications device such as the stations 1010 and 1030 in FIG. 1A, generating an 802.11 preamble for transmission on a channel (element 4010) such as a high-efficiency preambles shown in FIG. 1E or the legacy 802.11 preamble shown in FIG. 1F. The legacy 802.11 preambles may include, for instance, 802.11a preambles, 802.11n preambles, 802.11ac preambles, and/or other older standard preambles. Many embodiments generate a BSK symbol (element 4012), such as the BPSK symbol(s) 1314 shown in FIG. 1F or the WUR marks shown in FIGS. 2B-F, to mark a start of a WUR packet for legacy devices (such as 802.11a/n/ac devices).

A MAC layer logic circuitry of the wireless network interface may generate a MAC frame as a wake-up radio (WUR) packet to transmit to other devices of a network, including a wake-up radio preamble (element 4015) and a frame body. The frame body may include, e.g., a receiver address and a frame body and the MAC layer logic circuitry may pass the MAC frame as an MAC protocol data unit (MPDU) to a PHY logic circuitry of the wireless network interface. The MAC frame may comprise a wake-up packet (WUP) to wake a PCR of a WURx or may comprise a vendor-specific (VS) packet such as a WUR discovery frame. The PHY logic circuitry may transform the data into a packet of on-off keying (OOK) orthogonal frequency division multiplexing (OFDM) symbols that can be transmitted to a STA after transmission of the 802.11 preamble.

The wireless network interface may transmit a wake-up radio preamble on a sub-band of the channel after transmission of the 802.11 preamble as OOK symbols and may transmit the remainder of the WUR packet after transmission of the wake-up radio preamble as one or more OOK symbols at a rate indicated by the WUR preamble for transmission on the sub-band (element 4020). For example, a PHY device of the wireless network interface may pass OOK symbols at a rate of 4 microseconds per symbol to the radio and antenna array for transmission. In several embodiments, a low data rate wake-up radio preamble transmits with a duration of 128 microseconds and a high data rate wake-up radio preamble transmits with a duration of 64 microseconds. In several embodiments, the low data rate preamble includes twice the number of symbols as the high data rate wake-up radio preamble and, conversely, the high data rate wake-up radio preamble includes half the number of symbols as the low data rate preamble.

Referring to FIG. 4B, the flowchart 4100 begins with a PCR of a device such as the PCR 1080 in FIG. 1A generating and transmitting, via an antenna array, an 802.11 preamble for an OFDMA packet on a channel (element 4110). The PCR may generate an 802.11 physical layer data unit (PPDU) as well as a wake-up radio (WUR) packet concurrently with transmission of the 802.11 preamble. After transmission of the 802.11 preamble, the PCR may transmit, via an antenna array, the remainder of the 802.11 PPDU on a first sub-band of the channel concurrently with transmission of the WUR packet on a second sub-band of the channel (element 4115). For example, the PCR may transmit the remainder of the 802.11 PPDU on a first sub-band of the channel at a high-efficiency transmission rate and WUR circuitry may transmit the WUR packet with the MAC frame of the WUR packet transmitting at a rate of 250 kbps or 62.5 kbps.

Referring to FIG. 4C, the flowchart 4250 begins with a wake-up radio logic circuitry of a wake-up radio receiver, such as the WUR logic circuitry 1050 and WUR circuitry 1054 in FIG. 1A, receiving and decoding, via an antenna array, a wake-up radio preamble for a wake-up radio frame on one of the sub-channels of a channel (element 4252). The wake-up radio logic circuitry may decode the preamble to determine the rate of the transmission of a MAC frame of the wake-up radio frame that follows the wake-up radio preamble (element 4254). For instance, in many embodiments, the configuration of the wake-up radio preamble may identify the rate of transmission of the MAC frame of the wake-up radio packet such as a data rate of 250 kbps or 62.5 kbps. In some embodiments, the wake-up radio preamble may comprise 32 bits or 32 symbols. In several embodiments, the number of bits in a wake-up radio preamble that identifies a low data rate MAC frame transmission, such as 62.5 kbps, has twice the number of bits or symbols as a wake-up radio preamble that identifies a high data rate MAC frame transmission, such as 250 kbps. In further embodiments, the different wake-up radio preambles may indicate a mode of operation such as a WURx mode or a vendor-specific mode (VSM).

After identifying the transmission rate of the MAC frame that follows the wake-up radio preamble, the WUR logic circuitry may receive the data from the PHY at the low or high data rate and decode the MAC frame based on the data transmission rate (element 4256).

Figure 4E:
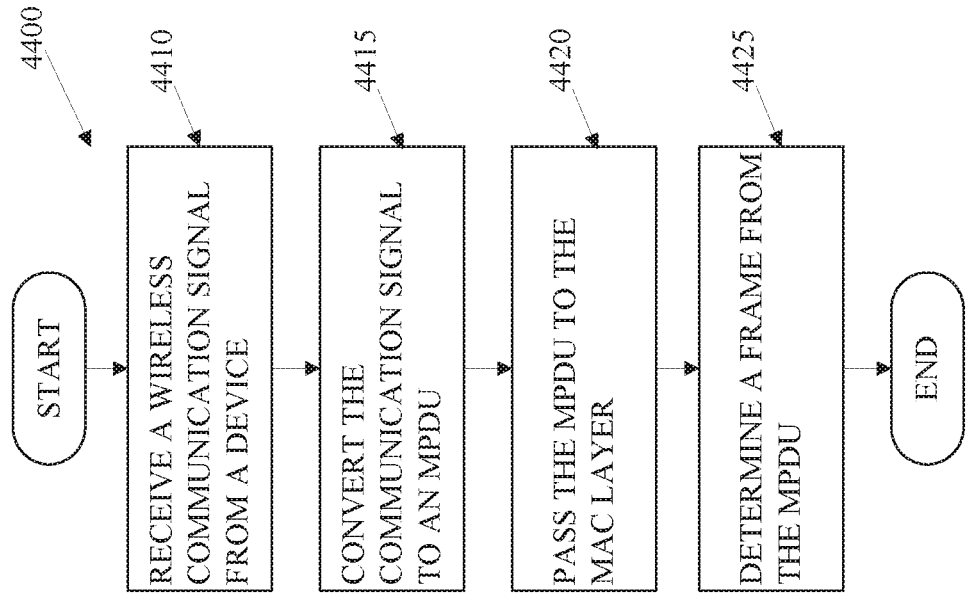
FIGS. 4D-E depict embodiments of flowcharts to generate and transmit frames and receive and interpret frames for communications between wireless communication devices.
Figure 4D:
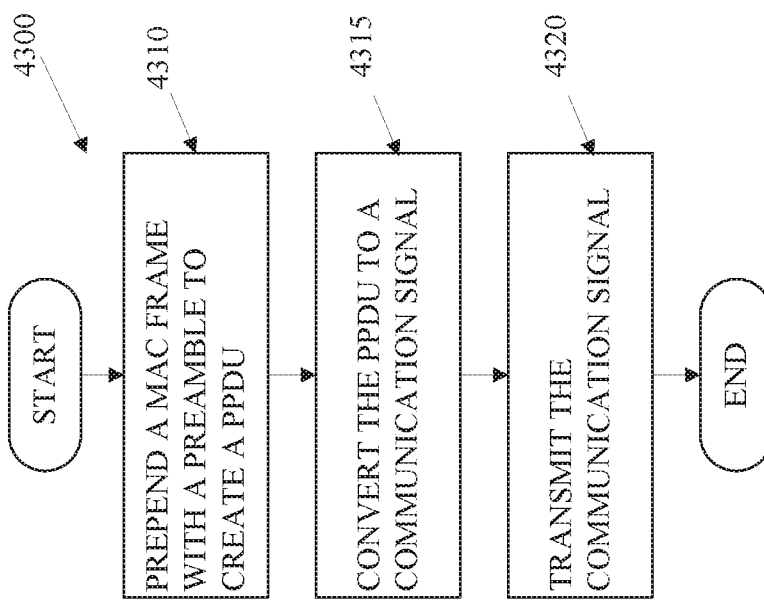

FIGS. 4D-E depict embodiments of flowcharts 4300 and 4400 to transmit, receive, and interpret communications with a frame. Referring to FIG. 4D, the flowchart 4300 may begin with receiving a WUR frame from the PCR 1080 (or the WUR circuitry 1024) of the STA 1010 by the PCR 1082 (or the WUR circuitry 1054) of the STA 1030. The MAC layer logic circuitry of the STA 1030 may generate a frame responsive to the WUR frame as an ACK frame to transmit to the STA 1010 and may pass the frame as an MAC protocol data unit (MPDU) to a PHY logic circuitry. The PHY logic circuitry may transform encode and transform the data into OFDM symbols to transmit to the STA 1010. The PHY logic circuitry may generate a preamble to prepend the PHY service data unit (PSDU) (the MPDU) to form a PHY protocol data unit (PPDU) for transmission (element 4310). In some embodiments, more than one MPDU may be included in a PPDU.

The physical layer device such as the transmitter 3006 in FIG. 3 or the wireless network interfaces 1022 and 1052 in FIG. 1A may convert the PPDU to a communication signal (element 4315). The transmitter may then transmit the communication signal via the antenna (element 4320).

Referring to FIG. 4E, the flowchart 4400 begins with a receiver of a device such as the receiver 3004 in FIG. 3 receiving a communication signal via one or more antenna(s) such as an antenna element of antenna array 3018 (element 4410). The receiver may convert the communication signal into an MPDU in accordance with the process described in the preamble (element 4415). More specifically, the received signal is fed from the one or more antennas to a DBF such as the DBF 220. The DBF transforms the antenna signals into information signals. The output of the DBF is fed to OFDM such as the OFDM 3022 in FIG. 3. The OFDM extracts signal information from the plurality of subcarriers onto which information-bearing signals are modulated. Then, the demodulator such as the demodulator 3024 demodulates the signal information via, e.g., BPSK, 16-QAM, 64-QAM, 256-QAM, quadrature phase shift keying (QPSK), or staggered quadrature phase shift keying (SQPSK). And the decoder such as the decoder 3026 decodes the signal information from the demodulator via, e.g., BCC or LDPC, to extract the MPDU and pass or communicate the MPDU to MAC layer logic such as MAC logic circuitry 3001 (element 4420).

The MAC logic circuitry may determine frame field values from the MPDU (element 4425) such as the management frame fields in the management frame 1400 shown in FIG. 1G. For instance, the MAC logic circuitry may determine frame field values such as the type and subtype field values of the synch frame. The MAC sublayer logic may determine that the MPDU comprises a WUR beacon frame so the MAC logic circuitry may generate a response frame.

FIGS. 4F-H depict embodiments of flowcharts 4500, 4530, and 4550 to transmit communications with a frame. Referring to FIG. 4F, the flowchart 4500 may begin with a PCR of a station, such as the STA 1010 shown in FIG. 1A, generating one or more 802.11 preambles for transmission in a WUR PPDU on a channel (element 4510) such as a legacy preamble and high-efficiency preambles shown in FIG. 1E or the legacy 802.11 preamble shown in FIG. 1F. For embodiments that include legacy preambles followed by one or more WUR packets on one or more sub-channels, the WUR (WUR logic circuitry 1050 and/or WUR circuitry 1054) of the STA 1030 may generate one or more BPSK-modulation OFDM symbols (element 4512) to demark the start of a WUR packet transmission at the bandwidth of the channel rather than the bandwidth of the sub-channel of the corresponding WUR packet. For instance, an 80 MHz OFDMA transmission may include four contiguous channels and one 20 MHz bandwidth OFDMA packet transmission (a WUR PPDU) on each of the four contiguous channels. Furthermore, each 20 MHz OFDMA transmission may include a WUR packet transmission on one or more of the center RUs of each of the four channels. In other embodiments, the 80 MHz OFDMA transmission may include two contiguous channels and one 40 MHz bandwidth OFDMA packet transmission (WUR PPDU) on each of the two contiguous channels.

A MAC logic circuitry 1018 of the PCR 1080 of the STA 1010 may generate the WUR PPDU with an orthogonal frequency division multiple access (OFDMA), multicarrier frame including one or more wake-up radio (WUR) packets on one or more sub-channels or RUs of the channel to transmit to other devices of a network concurrently. Each wake-up radio (WUR) packet may include the wake-up radio preamble (element 4515) and a frame body. The wake-up radio preamble may be a low data rate (LDR) wake-up radio preamble to identify a data rate for transmission of a MAC frame in the WUR packet as 62.5 kbps or a high data rate (HDR) preamble to identify a data rate for transmission of a MAC frame in the WUR packet as 250 kbps. The frame body may be the MAC frame and may include, e.g., a frame control field, an address or other value in a field to identify the source or destination device, a payload, and an FCS, MIC, and/or CRC. In some embodiments, the wake-up radio preamble or the MAC frame may indicate a mode of operation such as a WURx mode or a VSM.

The MAC logic circuitry 1018 may pass the MAC frame as an MAC protocol data unit (MPDU) to a PHY logic circuitry 1053 and the WUR circuitry 1054. The WUR circuitry 1054 in conjunction with portions of the PHY logic circuitry 1053 may transform the MPDU into a packet of OFDM symbols that can transmit to the STA 1010 via the RX/TX circuitry 1055 after transmission of the one or more 802.11 preambles.

The wireless network interface 1052 may transmit a wake-up radio preamble on a sub-band of the channel after transmission of the one or more 802.11 preambles across the bandwidth of the channel. The wireless network interface 1052 may transmit the remainder of the WUR packet after transmission of the wake-up radio preamble as one or more OOK symbols at a rate associated with the wake-up radio preamble for transmission on the sub-band (element 4520). In several embodiments, the wake-up radio preamble transmits at a fixed rate such as 2 microseconds per symbol, wherein a symbol is one bit.

Referring to FIG. 4G, the flowchart 4530 begins with a WUR of a station such as the WUR logic circuitry 1020 and/or WUR circuitry 1024 of the STA 1010 in FIG. 1A determining a MAC frame to transmit a wake-up packet (WUP) or a vendor-specific (VS) packet to a WURx of a station such as the STA 1030 in FIG. 1A (element 4532) in a WUR PPDU such as the WUR PPDU discussed in conjunction with the flowchart 4500. The WUR may generate the MAC frame as a WUP in a WURx mode as a WURx operation or generate the MAC frame as a VS packet in a VSM as a VS operation. For example, the WUR may generate a VS packet to perform a vendor-specific use of a WURx such as passing information to/from the WURx without waking the PCR associated with the WURx or such as passing information to the WURx in addition to waking the PCR associated with the WURx. In another embodiment, the WURx may scan channels for use or activity while the PCR associated with the WURx remains in an active state.

After generation of the MAC frame, the WUR may pass the MAC frame to the PHY to generate OOK OFDM symbols for transmission in the OFDMA packet on a sub-band of the channel (element 4534). For example, the PHY may transmit the MAC frame on a center sub-band of a 20 MHz channel at a high data rate of 250 kbps.

Referring to FIG. 4H, the flowchart 4550 begins with a WUR of a station such as the WUR logic circuitry 1020 and/or WUR circuitry 1024 of the STA 1010 in FIG. 1A determining a wake-up radio preamble to transmit in a wake-up packet (WUP) or a vendor-specific (VS) packet to a WURx of a station such as the STA 1030 in FIG. 1A (element 4552) in an OFDMA packet such as the OFDMA packet discussed in conjunction with the flowchart 4500. The WUR may generate the wake-up radio preamble as a low data rate preamble or a high data rate preamble. Some embodiments may generate a low data rate preamble for a WUP and a high data rate preamble for a VS packet. Other embodiments may generate a low data rate preamble for a WUP and a low data rate preamble or a high data rate preamble for a VS packet. Still other embodiments may generate a low data rate preamble or a high data rate preamble for a WUP and a low data rate preamble or a high data rate preamble for a VS packet. And one embodiment may generate a high data rate preamble for a WUP and a low data rate preamble or a high data rate preamble for a VS packet. Many embodiments are not limited on assignment of the low and high data rate preamble to a particular type packet. In several embodiments, the MAC frame or the preamble may indicate the mode of operation as a WURx mode or a VS mode.

After generation of the wake-up radio preamble, the WUR may pass the wake-up radio preamble to the PHY to generate OOK OFDM symbols for transmission in the OFDMA packet on a sub-band of the channel (element 4554). For example, the PHY may transmit the wake-up radio preamble on a center sub-band of a 20 MHz channel with a duration of 2 microseconds.

Referring to FIG. 4I, the flowchart 4600 begins with a WUR of a station such as the WUR logic circuitry 1020 and/or WUR circuitry 1024 of the STA 1010 in FIG. 1A associating a first resource unit with wake-up packet (WUP) transmissions (element 4610) and associating a second resource unit with vendor-specific (VS) packets (element 4612). For instance, the STA 1010 may associate with more than one stations that include stations capable of VSM operation and WURx operation. In response, the STA 1010 may associate at least a first resource unit on a first channel with a WURX mode operation and at least a second resource unit on the first channel or a different channel with VSM operation.

Thereafter, the STA 1010 may generate the WUPs for transmission on the at least the first RU of the first channel and VS packets for transmission on the at least the second RU (element 4615). For instance, the STA 1010 may generate a WUP with a wake-up radio preamble to indicate a data rate of the WUP as a low data rate such as 62.5 kbps or a high data rate such as 250 kbps. The station may also generate a MAC frame to transmit at the data rate and pass the MAC frame to a PHY to generate OOK OFDM symbols to transmit on the first RU (element 4620).

As another example, the STA 1010 may generate a VS packet with a wake-up radio preamble to indicate a data rate of the VS packet as a low data rate such as 62.5 kbps or a high data rate such as 250 kbps. The station may also generate a MAC frame to transmit at the data rate and pass the MAC frame to a PHY to generate OOK OFDM symbols to transmit on the second RU (element 4620).

Referring to FIG. 4J, the flowchart 4630 begins with a WUR of a station such as the WUR logic circuitry 1050 and/or WUR circuitry 1054 of the STA 1030 in FIG. 1A associating with a station such as the STA 1010 in FIG. 1A (element 4632). During association the STA 1030 may indicate a capability for WURx mode operations and VSM operations and the STA 1010 may assign a first RU to WURx mode operations and a second RU to VSM operations.

After association with the STA 1010, the PCR 1082 of the STA 1030 may enter a power save mode and the WUR of the STA 1030 may enter an active mode (element 4634). During the WUR active mode, the STA 1030 may monitor more than one resource unit including the first RU to monitor for WUPs and the second RU to monitor for VS packets (element 4636). In several embodiments, if the WUR of the STA 1030 is capable of more than one data rates, the WUR of the STA 1030 may also monitor for more than one preambles wherein the different preambles indicate different data rates (element 4636). For example, the WUR of the STA 1030 may switch between the first RU and the second RU periodically to monitor for WURx mode operations and VS mode operations. The WUR of the STA 1030 may also switch the preambles that the WUR monitors to monitor for WUPs and/or VS packets with different data rates.

In other embodiments, the STA 1010 may assign different preambles to low data rate WUPs, high data rate WUPs, low data rate VS packets, and high data rate packets. In other words, the STA 1010 may assign the low data rate WUPs to a first wake-up radio preamble, high data rate WUPs to a second wake-up radio preamble, low data rate VS packets to a third wake-up radio preamble, and high data rate packets to a fourth wake-up radio preamble. Thereafter, the WUR of the STA 1030 may also monitor for more than one preambles to monitor for WUPs and VS packets with the different data rates (element 4636) by switching the preamble sequence that the WUR compares or correlates against sequences via an antenna. The wake-up radio preamble sequences may be a pseudo-random noise (PN) sequence, a Walsh-Hadamard sequence, a quasi-orthogonal sequence, or other sequence has good correlation properties for detection in noise.

Upon identifying a preamble for which the WUR is monitoring, the WUR may receive a transmission on one or more resource units (element 4638). For instance, upon detection of the preamble, the WUR may continue to receive the preamble, determine a data rate for a MAC frame that follows the preamble, and receive the MAC frame at that data rate. In many embodiments, the data rate may be an LDR of 62.5 kbps or an HDR of 250 kbps.

Figure 5:
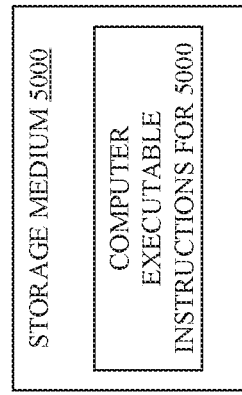
FIGS. 5-6 depict a computer-readable storage medium and a computing platform to support compatible low rate for wake-up radio packet transmission.

FIG. 5 illustrates an example of a storage medium 5000 to store pre-population logic such as one or more pre-population executables. Storage medium 5000 may comprise an article of manufacture. In some examples, storage medium 5000 may include any non-transitory computer readable medium or machine-readable medium, such as an optical, magnetic or semiconductor storage. Storage medium 5000 may store diverse types of computer executable instructions, such as instructions to implement logic flows and/or techniques described herein. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like.

Figure 6:
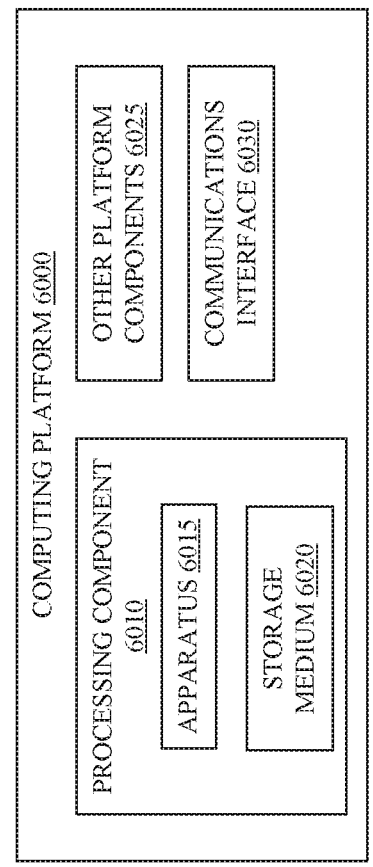

FIG. 6 illustrates an example computing platform 6000 such as the STAs 1010, 1030, 1090, 1092, 1094, 1096, and 1098 in FIG. 1A. In some examples, as shown in FIG. 6, computing platform 6000 may include a processing component 6010, other platform components or a communications interface 6030 such as the wireless network interfaces 1022 and 1052 shown in FIG. 1A. According to some examples, computing platform 6000 may be a computing device such as a server in a system such as a data center or server farm that supports a manager or controller for managing configurable computing resources as mentioned above. Furthermore, the communications interface 6030 may comprise a wake-up radio (WUR) and may be capable of waking up a primary connectivity radio (PCR) of the computing platform 6000.

According to some examples, processing component 6010 may execute processing operations or logic for apparatus 6015 described herein. Processing component 6010 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits (ICs), application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements, which may reside in the storage medium 6020, may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. While discussions herein describe elements of embodiments as software elements and/or hardware elements, decisions to implement an embodiment using hardware elements and/or software elements may vary in accordance with any number of design considerations or factors, such as desired computational rate, power levels, heat tolerances, processing cycle budget, input data rates, output data rates, memory resources, data bus speeds and other design or performance constraints.

In some examples, other platform components 6025 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., universal serial bus (USB) memory), solid state drives (SSD) and any other type of storage media suitable for storing information.

In some examples, communications interface 6030 may include logic and/or features to support a communication interface. For these examples, communications interface 6030 may include one or more communication interfaces that operate according to various communication protocols or standards to communicate over direct or network communication links. Direct communications may occur via use of communication protocols or standards described in one or more industry standards (including progenies and variants) such as those associated with the Peripheral Component Interconnect (PCI) Express specification. Network communications may occur via use of communication protocols or standards such as those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 6000 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, various embodiments of the computing platform 6000 may include or exclude functions and/or specific configurations of the computing platform 6000 described herein.

The components and features of computing platform 6000 may comprise any combination of discrete circuitry, ASICs, logic gates and/or single chip architectures. Further, the features of computing platform 6000 may comprise microcontrollers, programmable logic arrays and/or microprocessors or any combination of the foregoing where suitably appropriate. Note that hardware, firmware and/or software elements may be collectively or individually referred to herein as "logic".

One or more aspects of at least one example may comprise representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that make the logic or processor.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner, or syntax, for instructing a machine, computing device or system to perform a certain function. The instructions may be implemented using any suitable high-level, low-level, object-oriented, visual, compiled and/or interpreted programming language.

Figure 7:
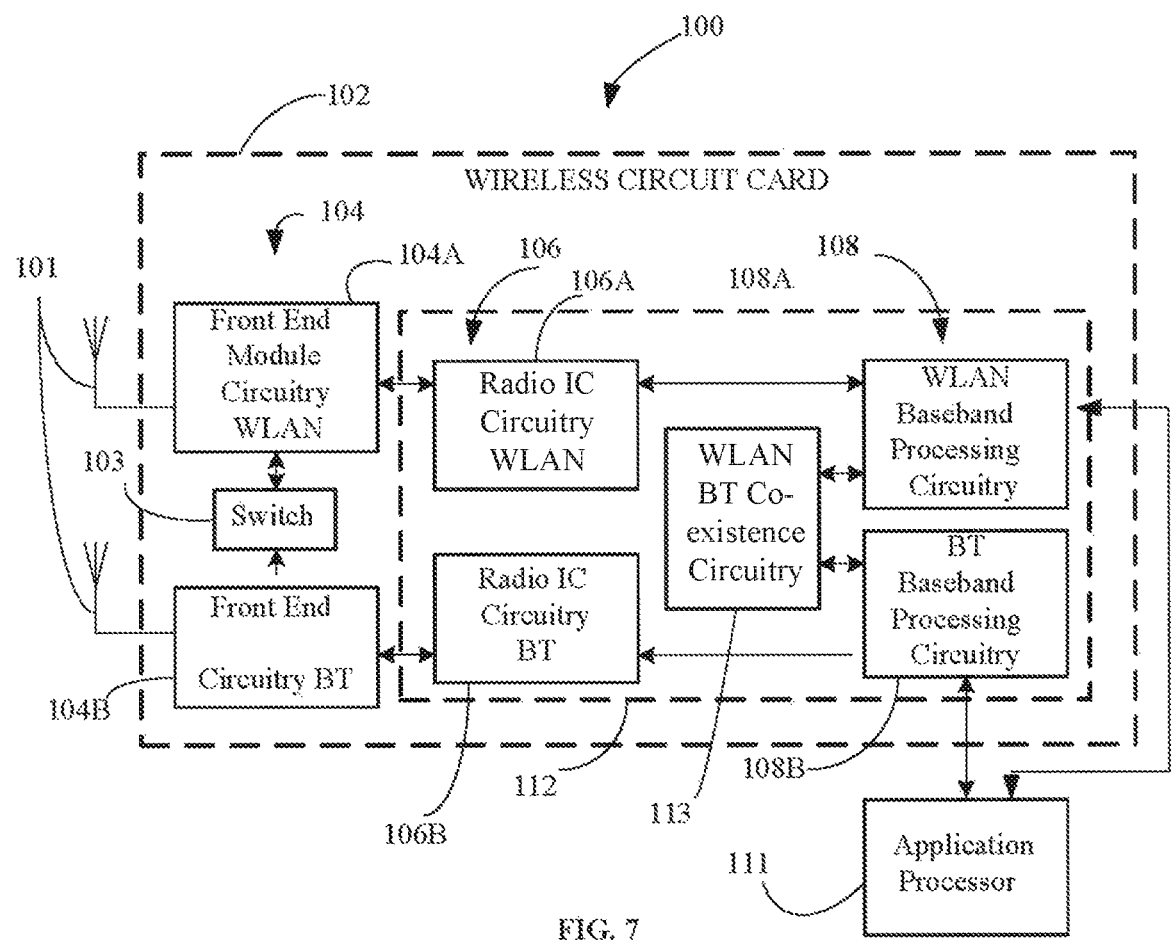
FIG. 7 depicts an embodiment of a block diagram of a radio architecture.

FIG. 7 illustrates an embodiment of a block diagram of a radio architecture 100 such as the wireless network interfaces 1022 and 1052 shown in FIG. 1A. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. WLAN FEM circuitry 104A may also include a transmit signal path which may include circuitry configured to amplify WLAN signals provided by the WLAN radio IC circuitry 106A for wireless transmission by one or more of the antennas 101. In addition, BT FEM circuitry 104B may also include a transmit signal path which may include circuitry configured to amplify BT signals provided by the BT radio IC circuitry 106B for wireless transmission by the one or more antennas. In the embodiment of FIG. 7, although WLAN FEM circuitry 104A and BT FEM circuitry 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the WLAN FEM circuitry 104A and provide baseband signals to WLAN baseband processing circuitry 108A. BT radio IC circuitry 106B may in turn include a receive signal path which may include circuitry to down-convert BT RF signals received from the BT FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the WLAN FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the BT FEM circuitry 104B for subsequent wireless transmission by the one or more antennas 101. In the embodiment of FIG. 7, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 7, according to the shown embodiment, WLAN-BT coexistence circuitry 113 may include logic providing an interface between the WLAN baseband circuitry 108A and the BT baseband processing circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of WLAN FEM circuitry 104A or BT FEM circuitry 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, and/or IEEE 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 7, the BT baseband processing circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 7, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 7, the functions of a BT radio card and WLAN radio card may be combined on a single wireless radio card, such as single wireless radio card 102, although embodiments are not so limited, and include within their scope discrete WLAN and BT radio cards In some embodiments, the radio architecture 100 may include other radio cards, such as a cellular radio card configured for cellular (e.g., 3rd Generation Partnership Project (3GPP) such as long-term evolution (LTE), LTE-Advanced or $5^{th}$ Generation (5G) communications).

In some IEEE 802.11 embodiments, the radio architecture 100 may be configured for communication over various channel bandwidths including bandwidths having center frequencies of about 900 MHz, 2.4 gigahertz (GHz), 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 8:
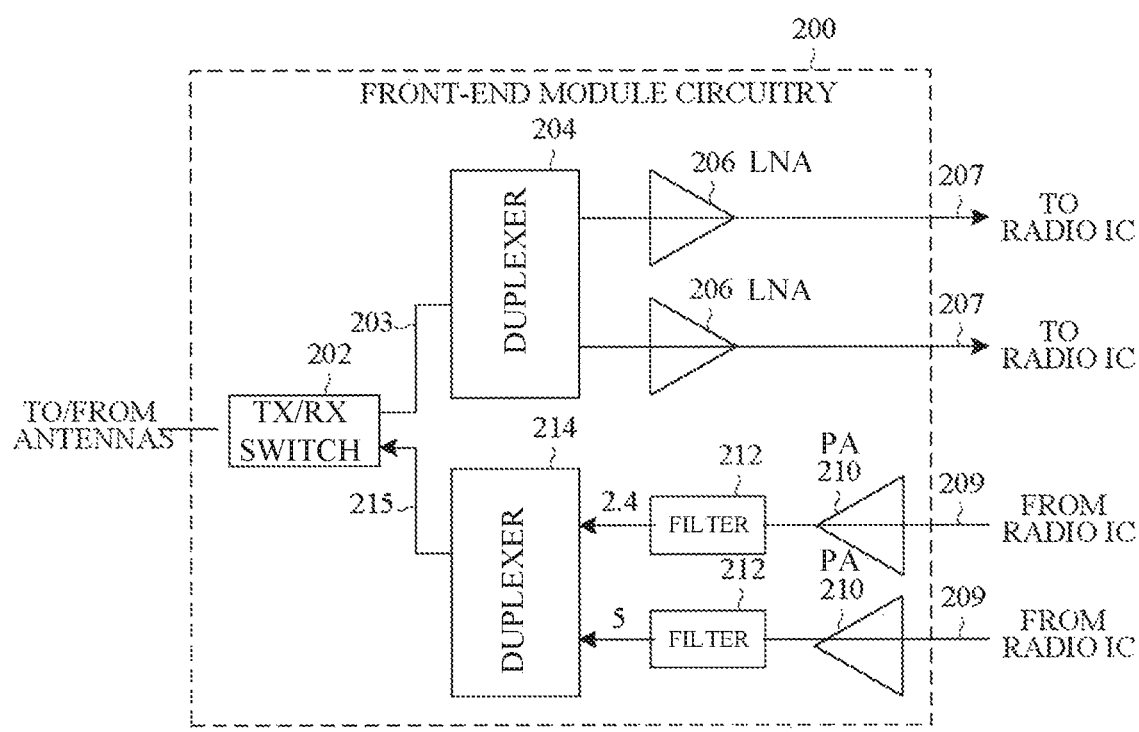
FIG. 8 depicts an embodiment of a front-end module circuitry for use in the radio architecture of FIG. 7.

FIG. 8 illustrates FEM circuitry 200 such as the front-end modules 3040 and 3050 shown in FIG. 3 and the front-end module 104 shown in FIG. 7. The FEM circuitry 200 is one example of circuitry that may be suitable for use as the WLAN and/or BT FEM circuitry 104A/104B (FIG. 7), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 7)). The transmit signal path of the FEM circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 7)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 7). In some embodiments, BT communications may utilize the 2.4 GHZ signal paths and may utilize the same FEM circuitry 200 as the one used for WLAN communications.

Figure 9:
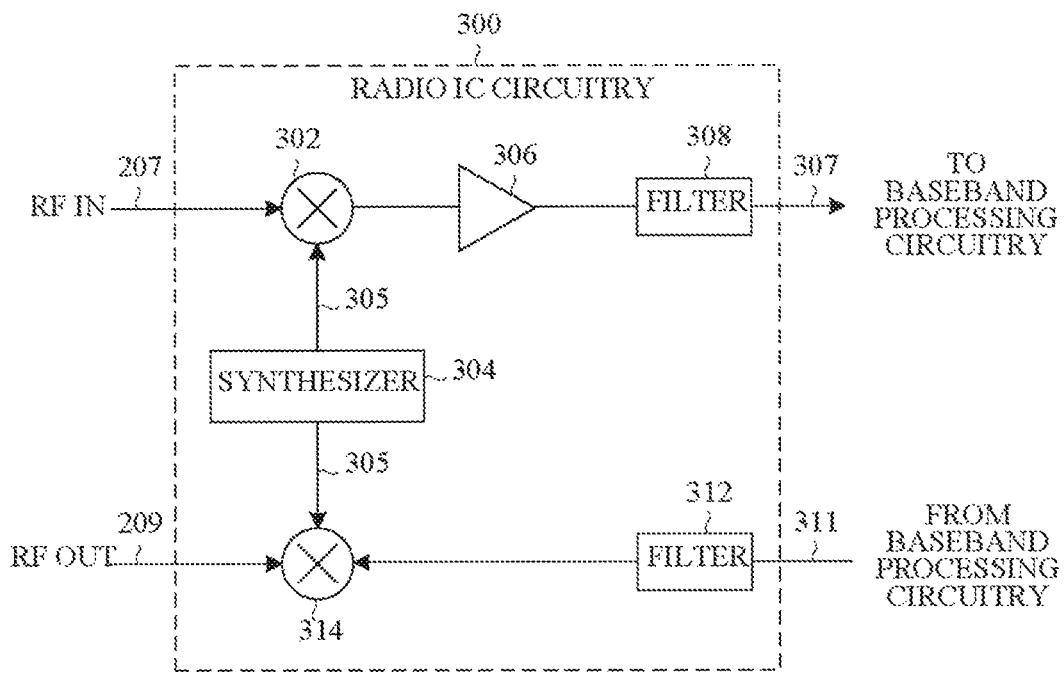
FIG. 9 depicts an embodiment of a radio IC circuitry for use in the radio architecture of FIG. 7.

FIG. 9 illustrates an embodiment of radio IC circuitry 300 such as the radios 1026 and 1056 shown in FIG. 1A and the radio IC circuitry 106 shown in FIG. 7. The radio IC circuitry 300 is one example of circuitry that may be suitable for use as the WLAN or BT radio IC circuitry 106A/106B (FIG. 7), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 9 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 7) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 7) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer circuitry 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF signals 207 from FIG. 9 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency (fLO) from a local oscillator or a synthesizer, such as the frequency 305 of synthesizer circuitry 304 (FIG. 9). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF signals 207 (FIG. 8) may comprise a balanced signal, although the scope of the embodiments is not limited in this respect. The I and Q baseband output signals may be provided to low-nose amplifier, such as amplifier circuitry 306 (FIG. 9) or to filter circuitry 308 (FIG. 9).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage-controlled oscillator (VCO), although that is not a requirement. A divider control input may further be provided by either the baseband processing circuitry 108 (FIG. 7) or the application processor 111 (FIG. 7) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency (fLO).

Figure 10:
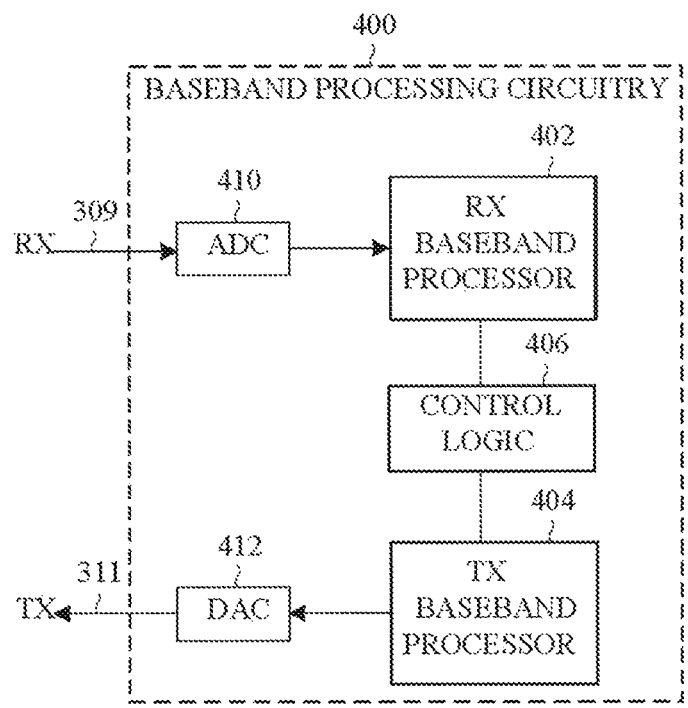
FIG. 10 depicts an embodiment of a baseband processing circuitry for use in the radio architecture of FIG. 7.

FIG. 10 illustrates an embodiment of a functional block diagram of baseband processing circuitry 400 such as the MAC logic circuitry 1018 and 1048 shown in FIG. 1A. The baseband processing circuitry 400 is one example of circuitry that may be suitable for use as the baseband processing circuitry 108 (FIG. 7), although other circuitry configurations may also be suitable. The baseband processing circuitry 400 may include a receive baseband processor (RX BBP) 402 for processing receive baseband signals 309 provided by the radio IC circuitry 106 (FIG. 7) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor of the WLAN baseband processing circuitry 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 7, in some embodiments, the antennas 101 (FIG. 7) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

As used herein, the term "circuitry" may refer to, be part of, or include an Application-Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions which, when executed by a processing system, perform a desired operation or operations.

Logic circuitry, devices, and interfaces herein described may perform functions implemented in hardware and also implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chip set, memory, or the like. Integrated circuits include circuits created on a substrate such as a silicon wafer and may comprise components. And integrated circuits, processor packages, chip packages, and chipsets may comprise one or more processors.

Processors may receive signals such as instructions and/or data at the input(s) and process the signals to generate the at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language, and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher-level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

Several embodiments have one or more potentially advantages effects. For instance, generating an OOK OFDM signal to transmit a wake-up radio packet, advantageously facilitates a low power, low cost wake-up radio and wake-up radio packet transmissions as part of OFDMA transmissions to increase spectral utilization. Generating a OFDM symbols of an IEEE 802.11 preamble on a channel followed by OOK symbols of the wake-up radio packet on a sub-band of the channel advantageously facilitates a low power, low cost wake-up radio and wake-up radio packet transmissions as part of OFDMA transmissions to increase spectral utilization. Generating at least a second wake-up radio packet to transmit on a contiguous channel bandwidth with OOK OFDM symbols on a sub-band of the contiguous channel bandwidth advantageously facilitates a low power, low cost wake-up radio and wake-up radio packet transmissions as part of OFDMA transmissions to increase spectral utilization. Assigning modes of operation to different preambles advantageously facilitates a low power, low cost wake-up radio and wake-up radio packet transmissions as part of OFDMA transmissions to increase spectral utilization. Assigning modes of operation to different resource units in one or more different contiguous channels of a bandwidth advantageously facilitates a low power, low cost wake-up radio and wake-up radio packet transmissions as part of OFDMA transmissions to increase spectral utilization. Monitoring preambles on different resource units in one or more different contiguous channels of a bandwidth advantageously facilitates a low power, low cost wake-up radio and wake-up radio packet transmissions as part of OFDMA transmissions to increase spectral utilization. Monitoring for different preambles on a resource unit advantageously facilitates a low power, low cost wake-up radio and wake-up radio packet transmissions as part of OFDMA transmissions to increase spectral utilization.

EXAMPLES OF FURTHER EMBODIMENTS

The following examples pertain to further embodiments. Specifics in the examples may be used anywhere in one or more embodiments.

Example 1 is an apparatus to communicate a wake-up radio packet, the apparatus comprising: medium access control (MAC) logic circuitry to generate a wake-up radio packet, wherein the wake-up radio packet comprises an on-off keying (OOK) signal, a sequence of a preamble of the wake-up radio packet to indicate a rate of transmission of one or more OOK orthogonal frequency-division multiplexing (OFDM) symbols of a medium access control (MAC) frame of the wake-up radio packet, wherein a duration of transmission of the preamble is 128 microseconds for a low data rate and a duration of transmission of the preamble is 64 microseconds for a low data rate; and a physical layer device coupled with the MAC logic circuitry to transmit OFDM symbols of an IEEE 802.11 preamble on a channel followed by OOK OFDM symbols of the wake-up radio packet on a sub-band of the channel. In Example 2, the apparatus of Example 1, further comprising a processor, a memory coupled with the processor, a radio coupled with the physical layer device, and one or more antennas coupled with the radio to transmit an orthogonal frequency-division multiple access (OFDMA) modulated signal. In Example 3, the apparatus of Example 1, wherein the wake-up radio packet comprises one or more resource units at a center of a multi-user, orthogonal frequency-division multiple access (OFDMA) modulated signal, at least a second wake-up radio packet to transmit on a contiguous channel bandwidth with OOK OFDM symbols on a sub-band of the contiguous channel bandwidth. In Example 4, the apparatus of Example 1, wherein the rate of transmission of one OOK OFDM symbol of the MAC frame of the wake-up radio packet is set to the rate of transmission of 62.5 kilobits per second for the low data rate. In Example 5, the apparatus of Example 1, wherein the rate of transmission of one OOK OFDM symbol of the MAC frame of the wake-up radio packet is set to the rate of transmission of 250 kilobits per second for the high data rate. In Example 6, the apparatus of Example 1, the MAC logic circuitry to assign a first wake-up radio preamble to a vendor-specific mode of operation and a second wake-up radio preamble to a wake-up receiver mode of operation. In Example 7, the apparatus of Example 6, the MAC logic circuitry to assign the first wake-up radio preamble to a low data rate and the second wake-up radio preamble to a high data rate. In Example 8, the apparatus of Example 1, the MAC logic circuitry to assign a first resource unit to a vendor-specific mode of operation and a second resource unit to a wake-up receiver mode of operation. In Example 9, the apparatus of Example 8, wherein the first resource unit is in a first channel and the second resource unit is in a second channel. In Example 10, the apparatus of Example 8, wherein the first resource unit is in a first channel and the second resource unit is in the first channel.

Example 11 is a method to communicate a wake-up radio packet, the method comprising: generating, by medium access control (MAC) logic circuitry, a wake-up radio packet, wherein the wake-up radio packet comprises an on-off keying (OOK) signal, a sequence of a preamble of the wake-up radio packet to indicate a rate of transmission of one or more OOK orthogonal frequency-division multiplexing (OFDM) symbols of a medium access control (MAC) frame of the wake-up radio packet, wherein a duration of transmission of the preamble is 128 microseconds for a low data rate and a duration of transmission of the preamble is 64 microseconds for a low data rate; and communicating the wake-up radio packet to a physical layer device coupled with the MAC logic circuitry to transmit OFDM symbols of an IEEE 802.11 preamble on a channel followed by OOK OFDM symbols of the wake-up radio packet on a sub-band of the channel. In Example 12, the method of Example 11, wherein the wake-up radio packet comprises one or more resource units at a center of a multi-user, orthogonal frequency-division multiple access (OFDMA) modulated signal, at least a second wake-up radio packet to transmit on a contiguous channel bandwidth with OOK OFDM symbols on a sub-band of the contiguous channel bandwidth. In Example 13, the method of Example 11, wherein the rate of transmission of one OOK OFDM symbol of the MAC frame of the wake-up radio packet is set to the rate of transmission of 62.5 kilobits per second for the low data rate. In Example 14, the method of Example 11, wherein the rate of transmission of one OOK OFDM symbol of the MAC frame of the wake-up radio packet is set to the rate of transmission of 250 kilobits per second for the high data rate. In Example 15, the method of Example 11, the MAC logic circuitry to assign a first wake-up radio preamble to a vendor-specific mode of operation and a second wake-up radio preamble to a wake-up receiver mode of operation. In Example 16, the method of Example 15, the MAC logic circuitry to assign the first wake-up radio preamble to a low data rate and the second wake-up radio preamble to a high data rate. In Example 17, the method of Example 11, the MAC logic circuitry to assign a first resource unit to a vendor-specific mode of operation and a second resource unit to a wake-up receiver mode of operation. In Example 18, the method of Example 17, wherein the first resource unit is in a first channel and the second resource unit is in a second channel. In Example 19, the method of Example 17, wherein the first resource unit is in a first channel and the second resource unit is in the first channel.

Example 20 is a system to communicate a wake-up radio packet, the apparatus comprising: one or more antennas; a radio coupled with the one or more antennas; a baseband processor to generate a wake-up radio packet, wherein the wake-up radio packet comprises an on-off keying (OOK) signal, a sequence of a preamble of the wake-up radio packet to indicate a rate of transmission of one or more OOK orthogonal frequency-division multiplexing (OFDM) symbols of a medium access control (MAC) frame of the wake-up radio packet, wherein a duration of transmission of the preamble is 128 microseconds for a low data rate and a duration of transmission of the preamble is 64 microseconds for a low data rate; and a physical layer device coupled with the baseband processor to generate OFDM symbols of an IEEE 802.11 preamble for transmission on a channel followed by generation of OOK OFDM symbols of the wake-up radio packet for transmission on a sub-band of the channel. In Example 21, the system of Example 20, further comprising a memory coupled with the baseband processor, a radio coupled with the physical layer device, and one or more antennas coupled with the radio to transmit an orthogonal frequency-division multiple access (OFDMA) modulated signal. In Example 22, the system of Example 20, wherein the wake-up radio packet comprises one or more resource units at a center of a multi-user, orthogonal frequency-division multiple access (OFDMA) modulated signal, at least a second wake-up radio packet to transmit on a contiguous channel bandwidth with OOK OFDM symbols on a sub-band of the contiguous channel bandwidth. In Example 23, the system of Example 20, wherein the rate of transmission of one OOK OFDM symbol of the MAC frame of the wake-up radio packet is set to the rate of transmission of 62.5 kilobits per second for the low data rate. In Example 24, the system of Example 20, wherein the rate of transmission of one OOK OFDM symbol of the MAC frame of the wake-up radio packet is set to the rate of transmission of 250 kilobits per second for the high data rate. In Example 25, the system of Example 20, the baseband processor to assign a first wake-up radio preamble to a vendor-specific mode of operation and a second wake-up radio preamble to a wake-up receiver mode of operation. In Example 26, the system of Example 25, the baseband processor to assign the first wake-up radio preamble to a low data rate and the second wake-up radio preamble to a high data rate. In Example 27, the system of Example 20, the baseband processor to assign a first resource unit to a vendor-specific mode of operation and a second resource unit to a wake-up receiver mode of operation. In Example 28, the system of Example 27, wherein the first resource unit is in a first channel and the second resource unit is in a second channel. In Example 29, the system of Example 27, wherein the first resource unit is in a first channel and the second resource unit is in the first channel.

Example 30 is a non-transitory computer-readable medium, comprising instructions to communicate a wake-up radio packet, which when executed by a processor, cause the processor to perform operations to: generate, by medium access control (MAC) logic circuitry, a wake-up radio packet, wherein the wake-up radio packet comprises an on-off keying (OOK) signal, a sequence of a preamble of the wake-up radio packet to indicate a rate of transmission of one or more OOK orthogonal frequency-division multiplexing (OFDM) symbols of a medium access control (MAC) frame of the wake-up radio packet, wherein a duration of transmission of the preamble is 128 microseconds for a low data rate and a duration of transmission of the preamble is 64 microseconds for a low data rate; and communicate the wake-up radio packet to a physical layer device coupled with the MAC logic circuitry to generate OFDM symbols of an IEEE 802.11 preamble for transmission on a channel followed by generation of OOK OFDM symbols of the wake-up radio packet for transmission on a sub-band of the channel. In Example 31, the non-transitory computer-readable medium of Example 30, wherein the wake-up radio packet comprises one or more resource units at a center of a multi-user, orthogonal frequency-division multiple access (OFDMA) modulated signal, at least a second wake-up radio packet to transmit on a contiguous channel bandwidth with OOK OFDM symbols on a sub-band of the contiguous channel bandwidth. In Example 32, the non-transitory computer-readable medium of Example 30, wherein the rate of transmission of one OOK OFDM symbol of the MAC frame of the wake-up radio packet is set to the rate of transmission of 62.5 kilobits per second for the low data rate. In Example 33, the non-transitory computer-readable medium of Example 30, wherein the rate of transmission of one OOK OFDM symbol of the MAC frame of the wake-up radio packet is set to the rate of transmission of 250 kilobits per second for the high data rate. In Example 34, the non-transitory computer-readable medium of Example 30, the MAC logic circuitry to assign a first wake-up radio preamble to a vendor-specific mode of operation and a second wake-up radio preamble to a wake-up receiver mode of operation. In Example 35, the non-transitory computer-readable medium of Example 34, the MAC logic circuitry to assign the first wake-up radio preamble to a low data rate and the second wake-up radio preamble to a high data rate. In Example 36, the non-transitory computer-readable medium of Example 30, the MAC logic circuitry to assign a first resource unit to a vendor-specific mode of operation and a second resource unit to a wake-up receiver mode of operation. In Example 37, the non-transitory computer-readable medium of Example 36, wherein the first resource unit is in a first channel and the second resource unit is in a second channel. In Example 38, the non-transitory computer-readable medium of Example 36, wherein the first resource unit is in a first channel and the second resource unit is in the first channel.

Example 39 is an apparatus to communicate a wake-up radio packet, the apparatus comprising: a means for generating generate a wake-up radio packet, wherein the wake-up radio packet comprises an on-off keying (OOK) signal, a sequence of a preamble of the wake-up radio packet to indicate a rate of transmission of one or more OOK orthogonal frequency-division multiplexing (OFDM) symbols of a medium access control (MAC) frame of the wake-up radio packet, wherein a duration of transmission of the preamble is 128 microseconds for a low data rate and a duration of transmission of the preamble is 64 microseconds for a low data rate; and a means for communicating the wake-up radio packet to a physical layer device coupled with the means for generating a wake-up radio packet, to generate OFDM symbols of an IEEE 802.11 preamble for transmission on a channel followed by generation of OOK OFDM symbols of the wake-up radio packet for transmission on a sub-band of the channel. In Example 40, the apparatus of Example 39, further comprising a processor, a memory coupled with the processor, a radio coupled with the physical layer device, and one or more antennas coupled with the radio to transmit an orthogonal frequency-division multiple access (OFDMA) modulated signal. In Example 41, the apparatus of Example 39, wherein the wake-up radio packet comprises one or more resource units at a center of a multi-user, orthogonal frequency-division multiple access (OFDMA) modulated signal, at least a second wake-up radio packet to transmit on a contiguous channel bandwidth with OOK OFDM symbols on a sub-band of the contiguous channel bandwidth. In Example 42, the apparatus of Example 39, wherein the rate of transmission of one OOK OFDM symbol of the MAC frame of the wake-up radio packet is set to the rate of transmission of 62.5 kilobits per second for the low data rate. In Example 43, the apparatus of Example 39, wherein the rate of transmission of one OOK OFDM symbol of the MAC frame of the wake-up radio packet is set to the rate of transmission of 250 kilobits per second for the high data rate. In Example 44, the apparatus of Example 39, the MAC logic circuitry to assign a first wake-up radio preamble to a vendor-specific mode of operation and a second wake-up radio preamble to a wake-up receiver mode of operation. In Example 45, the apparatus of Example 44, the MAC logic circuitry to assign the first wake-up radio preamble to a low data rate and the second wake-up radio preamble to a high data rate. In Example 46, the apparatus of Example 39, the MAC logic circuitry to assign a first resource unit to a vendor-specific mode of operation and a second resource unit to a wake-up receiver mode of operation. In Example 47, the apparatus of Example 46, wherein the first resource unit is in a first channel and the second resource unit is in a second channel. In Example 48, the apparatus of Example 46, wherein the first resource unit is in a first channel and the second resource unit is in the first channel.

Example 49 is an apparatus to communicate a wake-up radio packet, the apparatus comprising: a physical layer device to decode an on-off keying (OOK) OOK orthogonal frequency-division multiplexing (OFDM) symbols of the wake-up radio packet on a sub-band of the channel, a sequence of a preamble of the wake-up radio packet to indicate a rate of transmission of one or more OOK OFDM symbols of a medium access control (MAC) frame of the wake-up radio packet, wherein a duration of transmission of the preamble is 128 microseconds for a low data rate and a duration of transmission of the preamble is 64 microseconds for a low data rate; and medium access control (MAC) logic circuitry coupled with the physical layer device to parse the MAC frame to interpret the MAC frame. In Example 50, the apparatus of Example 49, further comprising a processor, a memory coupled with the processor, a radio coupled with the physical layer device, and one or more antennas coupled with the radio to transmit an orthogonal frequency-division multiple access (OFDMA) modulated signal. In Example 51, the apparatus of Example 49, wherein the wake-up radio packet comprises one or more resource units at a center of a multi-user, orthogonal frequency-division multiple access (OFDMA) modulated signal. In Example 52, the apparatus of Example 49, wherein the rate of transmission of one OOK OFDM symbol of the MAC frame of the wake-up radio packet is set to the rate of transmission of 62.5 kilobits per second for the low data rate. In Example 53, the apparatus of Example 49, wherein the rate of transmission of one OOK OFDM symbol of the MAC frame of the wake-up radio packet is set to the rate of transmission of 250 kilobits per second for the high data rate. In Example 54, the apparatus of Example 49, the MAC logic circuitry to monitor for a first wake-up radio preamble associated with a vendor-specific mode of operation and a second wake-up radio preamble associated with a wake-up receiver mode of operation. In Example 55, the apparatus of Example 54, the MAC logic circuitry to assign the first wake-up radio preamble to a low data rate and the second wake-up radio preamble to a high data rate. In Example 56, the apparatus of Example 49, the MAC logic circuitry to monitor a first resource unit for a vendor-specific mode of operation and a second resource unit for a wake-up receiver mode of operation. In Example 57, the apparatus of Example 56, wherein the first resource unit is in a first channel and the second resource unit is in a second channel. In Example 58, the apparatus of Example 56, wherein the first resource unit is in a first channel and the second resource unit is in the first channel.

Example 59 is a method to communicate a wake-up radio packet, the method comprising: decoding, by a physical layer device, an on-off keying (OOK) OOK orthogonal frequency-division multiplexing (OFDM) symbols of the wake-up radio packet on a sub-band of the channel, a sequence of a preamble of the wake-up radio packet to indicate a rate of transmission of one or more OOK OFDM symbols of a medium access control (MAC) frame of the wake-up radio packet, wherein a duration of transmission of the preamble is 128 microseconds for a low data rate and a duration of transmission of the preamble is 64 microseconds for a low data rate; and parsing, by a medium access control (MAC) logic circuitry coupled with the physical layer device, the MAC frame to interpret the MAC frame. In Example 60, the method of Example 59, wherein the wake-up radio packet comprises one or more resource units at a center of a multi-user, orthogonal frequency-division multiple access (OFDMA) modulated signal. In Example 61, the method of Example 59, wherein the rate of transmission of one OOK OFDM symbol of the MAC frame of the wake-up radio packet is set to the rate of transmission of 62.5 kilobits per second for the low data rate. In Example 62, the method of Example 59, wherein the rate of transmission of one OOK OFDM symbol of the MAC frame of the wake-up radio packet is set to the rate of transmission of 250 kilobits per second for the high data rate. In Example 63, the method of Example 59, the MAC logic circuitry to monitor for a first wake-up radio preamble associated with a vendor-specific mode of operation and a second wake-up radio preamble associated with a wake-up receiver mode of operation. In Example 64, the method of Example 63, the MAC logic circuitry to assign the first wake-up radio preamble to a low data rate and the second wake-up radio preamble to a high data rate. In Example 65, the method of Example 59, the MAC logic circuitry to monitor a first resource unit for a vendor-specific mode of operation and a second resource unit for a wake-up receiver mode of operation. In Example 66, the method of Example 65, wherein the first resource unit is in a first channel and the second resource unit is in a second channel. In Example 67, the method of Example 65, wherein the first resource unit is in a first channel and the second resource unit is in the first channel.

Example 68 is a system to communicate a wake-up radio packet, the apparatus comprising: one or more antennas; a radio coupled with the one or more antennas; a physical layer device coupled with the radio to decode an on-off keying (OOK) OOK orthogonal frequency-division multiplexing (OFDM) symbols of the wake-up radio packet on a sub-band of the channel, a sequence of a preamble of the wake-up radio packet to indicate a rate of transmission of one or more OOK OFDM symbols of a medium access control (MAC) frame of the wake-up radio packet, wherein a duration of transmission of the preamble is 128 microseconds for a low data rate and a duration of transmission of the preamble is 64 microseconds for a low data rate; and a baseband processor coupled with the physical layer device parse the MAC frame to interpret the MAC frame. In Example 69, the system of Example 68, wherein the wake-up radio packet comprises one or more resource units at a center of a multi-user, orthogonal frequency-division multiple access (OFDMA) modulated signal. In Example 70, the system of Example 68, wherein the rate of transmission of one OOK OFDM symbol of the MAC frame of the wake-up radio packet is set to the rate of transmission of 62.5 kilobits per second for the low data rate. In Example 71, the system of Example 68, wherein the rate of transmission of one OOK OFDM symbol of the MAC frame of the wake-up radio packet is set to the rate of transmission of 250 kilobits per second for the high data rate. In Example 72, the system of Example 68, the MAC logic circuitry to monitor for a first wake-up radio preamble associated with a vendor-specific mode of operation and a second wake-up radio preamble associated with a wake-up receiver mode of operation. In Example 73, the system of Example 72, the MAC logic circuitry to assign the first wake-up radio preamble to a low data rate and the second wake-up radio preamble to a high data rate. In Example 74, the system of Example 68, the MAC logic circuitry to monitor a first resource unit for a vendor-specific mode of operation and a second resource unit for a wake-up receiver mode of operation. In Example 75, the system of Example 68, wherein the first resource unit is in a first channel and the second resource unit is in a second channel. In Example 76, the system of Example 68, wherein the first resource unit is in a first channel and the second resource unit is in the first channel.

Example 77 is a non-transitory computer-readable medium, comprising instructions to communicate a wake-up radio packet, which when executed by a processor, cause the processor to perform operations to: decode, by a physical layer device, an on-off keying (OOK) OOK orthogonal frequency-division multiplexing (OFDM) symbols of the wake-up radio packet on a sub-band of the channel, a sequence of a preamble of the wake-up radio packet to indicate a rate of transmission of one or more OOK OFDM symbols of a medium access control (MAC) frame of the wake-up radio packet, wherein a duration of transmission of the preamble is 128 microseconds for a low data rate and a duration of transmission of the preamble is 64 microseconds for a low data rate; and parse, by a medium access control (MAC) logic circuitry coupled with the physical layer device, the MAC frame to interpret the MAC frame. In Example 78, the non-transitory computer-readable medium of Example 77, wherein the wake-up radio packet comprises one or more resource units at a center of a multi-user, orthogonal frequency-division multiple access (OFDMA) modulated signal. In Example 79, the non-transitory computer-readable medium of Example 77, wherein the rate of transmission of one OOK OFDM symbol of the MAC frame of the wake-up radio packet is set to the rate of transmission of 62.5 kilobits per second for the low data rate. In Example 80, the non-transitory computer-readable medium of Example 77, wherein the rate of transmission of one OOK OFDM symbol of the MAC frame of the wake-up radio packet is set to the rate of transmission of 250 kilobits per second for the high data rate. In Example 81, the non-transitory computer-readable medium of Example 77, the MAC logic circuitry to monitor for a first wake-up radio preamble associated with a vendor-specific mode of operation and a second wake-up radio preamble associated with a wake-up receiver mode of operation. In Example 82, the non-transitory computer-readable medium of Example 81, the MAC logic circuitry to assign the first wake-up radio preamble to a low data rate and the second wake-up radio preamble to a high data rate. In Example 83, the non-transitory computer-readable medium of Example 77, the MAC logic circuitry to monitor a first resource unit for a vendor-specific mode of operation and a second resource unit for a wake-up receiver mode of operation. In Example 84, the non-transitory computer-readable medium of Example 83, wherein the first resource unit is in a first channel and the second resource unit is in a second channel. In Example 85, the non-transitory computer-readable medium of Example 83, wherein the first resource unit is in a first channel and the second resource unit is in the first channel.

Example 86 is an apparatus to communicate a wake-up radio packet, the apparatus comprising: a means for decoding an on-off keying (OOK) OOK orthogonal frequency-division multiplexing (OFDM) symbols of the wake-up radio packet on a sub-band of the channel, a sequence of a preamble of the wake-up radio packet to indicate a rate of transmission of one or more OOK OFDM symbols of a medium access control (MAC) frame of the wake-up radio packet, wherein a duration of transmission of the preamble is 128 microseconds for a low data rate and a duration of transmission of the preamble is 64 microseconds for a low data rate; and a means for parsing the MAC frame to interpret the MAC frame. In Example 87, the apparatus of Example 86, wherein the wake-up radio packet comprises one or more resource units at a center of a multi-user, orthogonal frequency-division multiple access (OFDMA) modulated signal. In Example 88, the apparatus of Example 86, wherein the rate of transmission of one OOK OFDM symbol of the MAC frame of the wake-up radio packet is set to the rate of transmission of 62.5 kilobits per second for the low data rate. In Example 89, the apparatus of Example 86, wherein the rate of transmission of one OOK OFDM symbol of the MAC frame of the wake-up radio packet is set to the rate of transmission of 250 kilobits per second for the high data rate. In Example 90, the apparatus of Example 86, the MAC logic circuitry to monitor for a first wake-up radio preamble associated with a vendor-specific mode of operation and a second wake-up radio preamble associated with a wake-up receiver mode of operation. In Example 91, the apparatus of Example 90, the MAC logic circuitry to assign the first wake-up radio preamble to a low data rate and the second wake-up radio preamble to a high data rate. In Example 92, the apparatus of Example 86, the MAC logic circuitry to monitor a first resource unit for a vendor-specific mode of operation and a second resource unit for a wake-up receiver mode of operation. In Example 93, the apparatus of Example 92, wherein the first resource unit is in a first channel and the second resource unit is in a second channel. In Example 94, the apparatus of Example 92, wherein the first resource unit is in a first channel and the second resource unit is in the first channel.

What is claimed is:

1. An apparatus to communicate a wake-up radio (WUR) frame, the apparatus comprising:
    a memory; and
    logic circuitry coupled with the memory to generate a WUR physical layer protocol data unit (PPDU) comprising a legacy preamble followed by more than one binary phase-shift keying (BPSK) modulated orthogonal frequency-division multiplexing (OFDM) symbols having a 20 megahertz (MHz) bandwidth and the WUR frame, each BPSK symbol having a 4 microsecond duration, wherein the WUR PPDU comprises an on-off keying (OOK) signal, a sequence of a WUR preamble to indicate a data rate of transmission of one or more OOK OFDM symbols of a medium access control (MAC) frame of the WUR frame, wherein a duration of transmission of the WUR preamble is 128 microseconds for a low data rate, wherein each bit in the WUR preamble for the low data rate is mapped to an OOK symbol of a two microsecond duration, and a duration of transmission of the WUR preamble is 64 microseconds for a high data rate, wherein the MAC frame comprises an action frame and a message integrity check (MIC).

2. The apparatus of claim 1, further comprising a processor, the processor comprising the logic circuitry, a radio coupled with the processor, and one or more antennas coupled with the radio to transmit the WUR PPDU with an orthogonal frequency-division multiple access (OFDMA) modulated signal with OFDM symbols of an IEEE 802.11 preamble on a channel followed by OOK OFDM symbols of the WUR frame on a sub-band of the channel.

3. The apparatus of claim 1, wherein the WUR frame comprises one or more resource units at a center of a multi-user, orthogonal frequency-division multiple access (OFDMA) modulated signal, at least a second WUR frame to transmit on a contiguous channel bandwidth with OOK OFDM symbols on a sub-band of the contiguous channel bandwidth.

4. The apparatus of claim 1, wherein the action frame comprises a WUR parameters field to comprise one or more parameters related to WUR operation.

5. The apparatus of claim 4, wherein the WUR parameters field comprises a duty cycle field.

6. The apparatus of claim 5, the duty cycle field to comprises a value indicative of a duty cycle.

7. The apparatus of claim 1, wherein the action frame comprises a WUR mode element.

8. A method to communicate a wake-up radio (WUR) frame, the method comprising:
generating, by logic circuitry, a WUR physical layer protocol data unit (PPDU) comprising a legacy preamble followed by more than one binary phase-shift keying (BPSK) modulated orthogonal frequency-division multiplexing (OFDM) symbols having a 20 megahertz (MHz) bandwidth and the WUR frame, each BPSK symbol having a 4 microsecond duration, wherein the WUR PPDU comprises an on-off keying (OOK) signal, a sequence of a WUR preamble to indicate a data rate of transmission of one or more OOK orthogonal frequency-division multiplexing (OFDM) symbols of a medium access control (MAC) frame of the WUR frame, wherein a duration of transmission of the WUR preamble is 128 microseconds for a low data rate, wherein each bit in the WUR preamble for the low data rate is mapped to an OOK symbol of a two microsecond duration, and a duration of transmission of the WUR preamble is 64 microseconds for a high data rate, wherein the MAC frame comprises an action frame and a message integrity check (MIC); and
communicating the WUR frame.

9. The method of claim 8, wherein the WUR frame comprises one or more resource units at a center of a multi-user, orthogonal frequency-division multiple access (OFDMA) modulated signal, at least a second WUR frame to transmit on a contiguous channel bandwidth with OOK OFDM symbols on a sub-band of the contiguous channel bandwidth.

10. The method of claim 8, wherein the action frame comprises a WUR parameters field to comprise one or more parameters related to WUR operation.

11. The method of claim 10, wherein the WUR parameters field comprises a duty cycle field with a value associated with a duty cycle.

12. The method of claim 8, wherein the action frame comprises a WUR mode element.

13. A non-transitory computer-readable medium, comprising instructions to communicate a wake-up radio (WUR) frame, which when executed by a processor, cause the processor to perform operations to:
generate a WUR physical layer protocol data unit (PPDU) comprising a legacy preamble followed by more than one binary phase-shift keying (BPSK) modulated orthogonal frequency-division multiplexing (OFDM) symbols having a 20 megahertz (MHz) bandwidth and the WUR frame, each BPSK symbol having a 4 microsecond duration, wherein the WUR PPDU comprises an on-off keying (OOK) signal, a sequence of a WUR preamble to indicate a data rate of transmission of one or more OOK orthogonal frequency-division multiplexing (OFDM) symbols of a medium access control (MAC) frame of the WUR frame, wherein a duration of transmission of the WUR preamble is 128 microseconds for a low data rate, wherein each bit in the WUR preamble for the low data rate is mapped to an OOK symbol of a two microsecond duration, and a duration of transmission of the WUR preamble is 64 microseconds for a high data rate, wherein the MAC frame comprises an action frame and a message integrity check (MIC); and
communicate the WUR frame.

14. The non-transitory computer-readable medium of claim 13, wherein the action frame comprises a WUR parameters field to comprise one or more parameters related to WUR operation.

15. The non-transitory computer-readable medium of claim 14, wherein the WUR parameters field comprises a duty cycle field with a value associated with a duty cycle.

16. The non-transitory computer-readable medium of claim 13, wherein the action frame comprises a WUR mode element.

17. An apparatus to communicate a wake-up radio (WUR) frame, the apparatus comprising:
memory; and
logic circuitry coupled with the memory to decode an on-off keying (OOK) orthogonal frequency-division multiplexing (OFDM) symbols of the WUR frame on a sub-band of a channel, wherein the WUR frame is part of a WUR PPDU and is preceded by more than one binary phase-shift keying (BPSK) modulated orthogonal frequency-division multiplexing (OFDM) symbols having a 20 megahertz (MHz) bandwidth, each BPSK symbol having a 4 microsecond duration, a sequence of a WUR preamble of the WUR frame to indicate a rate of transmission of one or more OOK OFDM symbols of a medium access control (MAC) frame of the WUR frame, wherein a duration of transmission of the WUR preamble is 128 microseconds for a low data rate, wherein each bit in the WUR preamble for the low data rate is mapped to an OOK symbol of a two microsecond duration, and a duration of transmission of the WUR preamble is 64 microseconds for a high data rate, wherein the MAC frame comprises an action frame and a message integrity check (MIC).

18. The apparatus of claim 17, wherein the action frame comprises a WUR parameters field to comprise one or more parameters related to WUR operation.

19. The apparatus of claim 18, wherein the WUR parameters field comprises a duty cycle field with a value associated with a duty cycle.

20. The apparatus of claim 17, wherein the action frame comprises a WUR mode element.

21. A method to communicate a wake-up radio (WUR) frame, the method comprising:
decoding, by a physical layer device, an on-off keying (OOK) orthogonal frequency-division multiplexing (OFDM) symbols of the WUR frame on a sub-band of a channel, wherein the WUR frame is part of a WUR PPDU and is preceded by more than one binary phase-shift keying (BPSK) modulated OFDM symbols having a 20 megahertz (MHz) bandwidth, each BPSK symbol having a 4 microsecond duration, a sequence of a WUR preamble of the WUR frame to indicate a rate of transmission of one or more OOK OFDM symbols of a medium access control (MAC) frame of the WUR frame, wherein a duration of transmission of the WUR preamble is 128 microseconds for a low data rate, wherein each bit in the WUR preamble for the low data rate is mapped to an OOK symbol of a two microsecond duration, and a duration of transmission of the WUR preamble is 64 microseconds for a high data rate, wherein the MAC frame comprises an action frame and a message integrity check (MIC); and pass the MAC frame to a MAC logic circuitry.

22. The method of claim 21, wherein the action frame comprises a WUR parameters field to comprise one or more parameters related to WUR operation.

23. The method of claim 22, wherein the WUR parameters field comprises a duty cycle field with a value associated with a duty cycle.

24. The method of claim 21, wherein the action frame comprises a WUR mode element.

25. A non-transitory computer-readable medium, comprising instructions to communicate a wake-up radio (WUR) frame, which when executed by a processor, cause the processor to perform operations to:

decode, by a physical layer device, an on-off keying (OOK) orthogonal frequency-division multiplexing (OFDM) symbols of the WUR frame on a sub-band of a channel, wherein the WUR frame is part of a WUR PPDU and is preceded by more than one binary phase-shift keying (BPSK) modulated OFDM symbols having a 20 megahertz (MHz) bandwidth, each BPSK symbol having a 4 microsecond duration, a sequence of a WUR preamble of the WUR frame to indicate a rate of transmission of one or more OOK OFDM symbols of a medium access control (MAC) frame of the WUR frame, wherein a duration of transmission of the WUR preamble is 128 microseconds for a low data rate, wherein each bit in the WUR preamble for the low data rate is mapped to an OOK symbol of a two microsecond duration, and a duration of transmission of the WUR preamble is 64 microseconds for a high data rate, wherein the MAC frame comprises an action frame and a message integrity check (MIC); and pass the MAC frame to a MAC logic circuitry.

26. The non-transitory computer-readable medium of claim 25, wherein the WUR frame comprises one or more resource units at a center of a multi-user, orthogonal frequency-division multiple access (OFDMA) modulated signal.

27. The non-transitory computer-readable medium of claim 25, wherein the rate of transmission of one OOK OFDM symbol of the MAC frame of the WUR frame is set to the rate of transmission of 62.5 kilobits per second for the low data rate and the rate of transmission of 250 kilobits per second for the high data rate.

28. The non-transitory computer-readable medium of claim 25, wherein the action frame comprises a WUR parameters field to comprise one or more parameters related to WUR operation.

29. The non-transitory computer-readable medium of claim 28, wherein the WUR parameters field comprises a duty cycle field with a value associated with a duty cycle.

30. The non-transitory computer-readable medium of claim 25, wherein the action frame comprises a WUR mode element.

* * * * *